United States Patent

Hammack

[15] 3,691,560

[45] Sept. 12, 1972

[54] METHOD AND APPARATUS FOR GEOMETRICAL DETERMINATION

[72] Inventor: Calvin M. Hammack, P.O. Box 516, Los Gatos, Calif. 95030

[22] Filed: April 21, 1969

[21] Appl. No.: 817,765

Related U.S. Application Data

[60] Division of Ser. No. 420,623, Dec. 23, 1964, Pat. No. 3,445,847, and a continuation-in-part of Ser. Nos. 86,770, Feb. 2, 1961, Ser. No. 278,191, May 6, 1963, abandoned, Ser. No. 335,454, Dec. 5, 1963, Pat. No. 3,242,487, Ser. No. 289,609, June 21, 1963, Pat. No. 3,286,263, and Ser. No. 312,598, Sept. 30, 1963, Pat. No. 3,270,340.

[52] U.S. Cl. .......343/113 R, 343/106 D, 343/112 R, 343/113 DE, 343/115, 343/118
[51] Int. Cl. ..............................................G01s 3/46
[58] Field of Search.....................343/113 DE, 106 D

[56] References Cited

UNITED STATES PATENTS

| | | |
|---|---|---|
| 3,090,957 | 5/1963 | Albanese et al.....343/113 DE |
| 3,181,159 | 4/1965 | Kramar et al..........343/106 D |
| 3,273,152 | 9/1966 | Earp..........................343/108 |

Primary Examiner—Benjamin A. Borchelt
Assistant Examiner—Richard E. Berger
Attorney—Victor R. Beckman

[57] ABSTRACT

This invention relates to a method and means of determining at least one dimension of the position-motion state of one or more points relative to a number of reference points by performing measurements of angular variations or angular differences, or of functions of such angular variations or angular differences. The position-motion state of said point or points is unknown and unbounded by any "a priori" information. The apexs of such angular variations or differences are located at the reference points.

67 Claims, 18 Drawing Figures

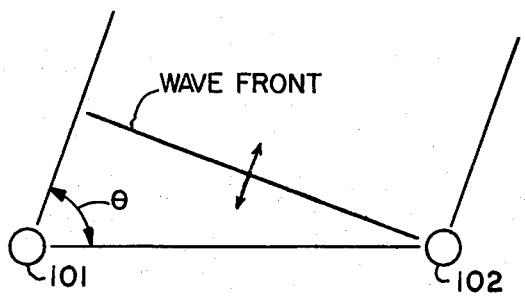
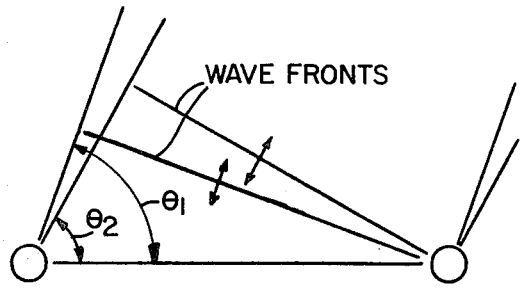
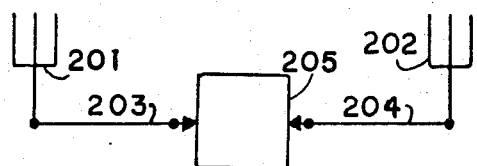
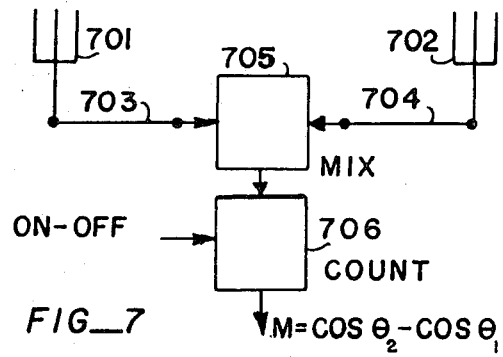
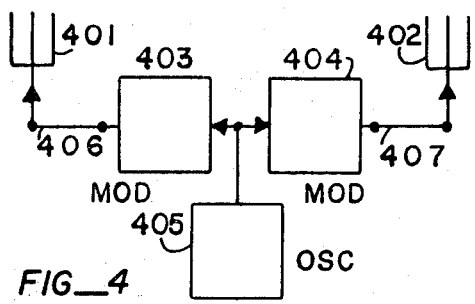
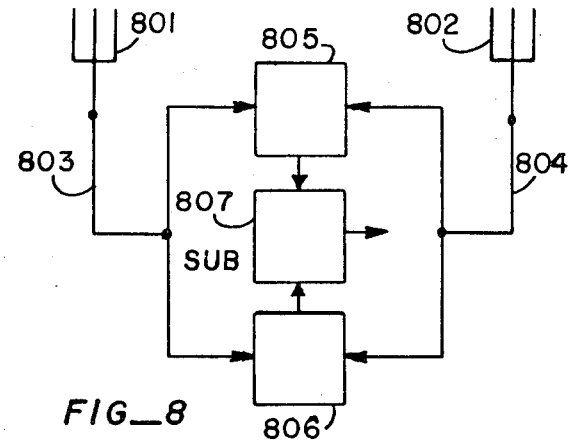
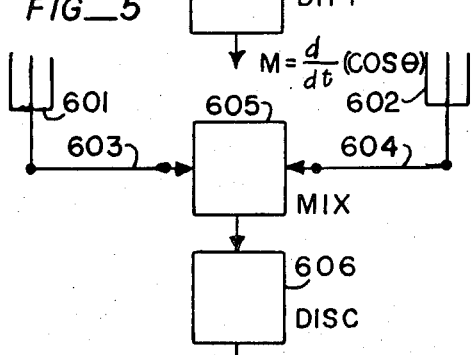
M INDICATES MEASURED QUANTITY
INDICATES APERTURE
INVENTOR.
CALVIN M. HAMMACK
BY Victor R. Beckman

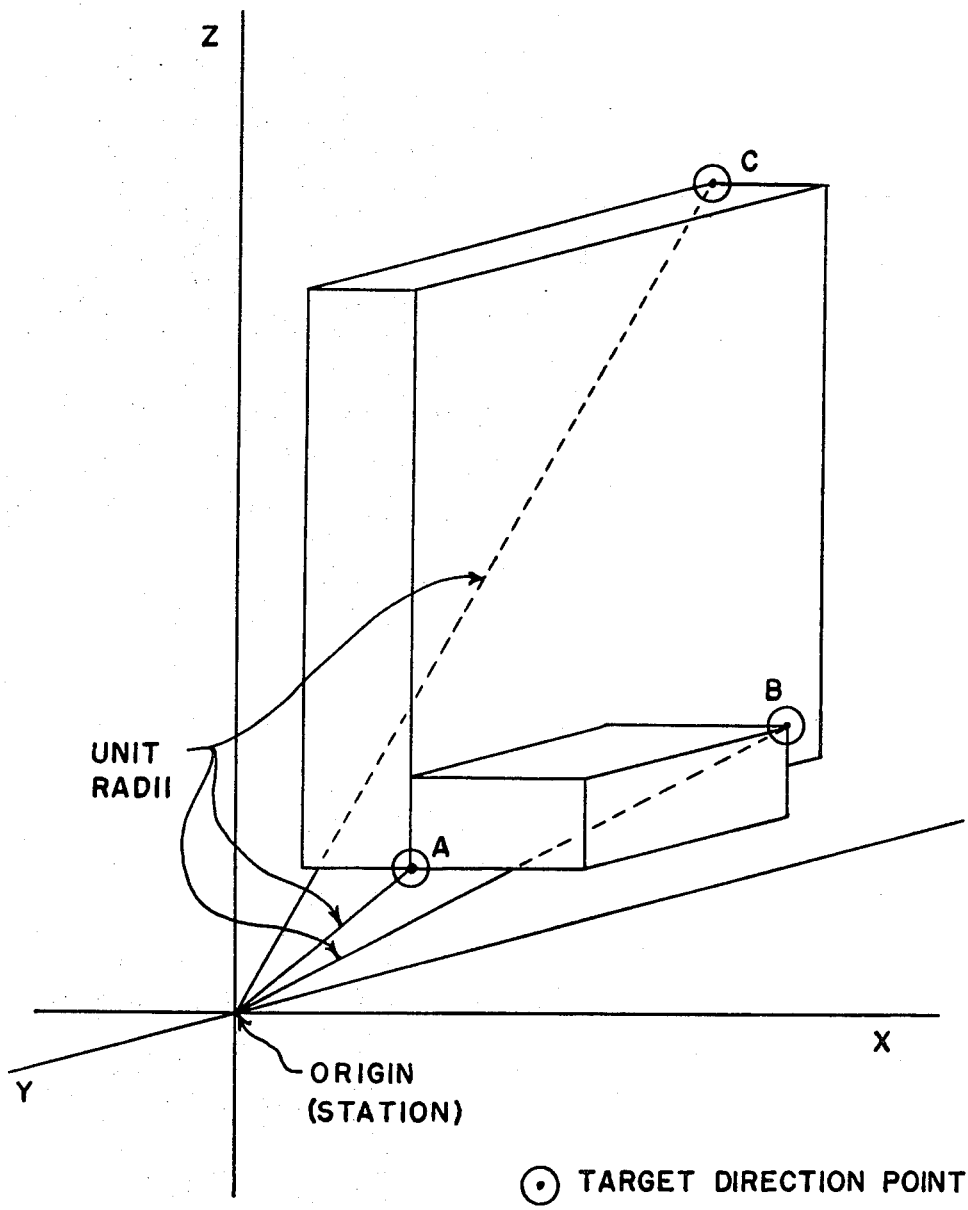
FIG—9

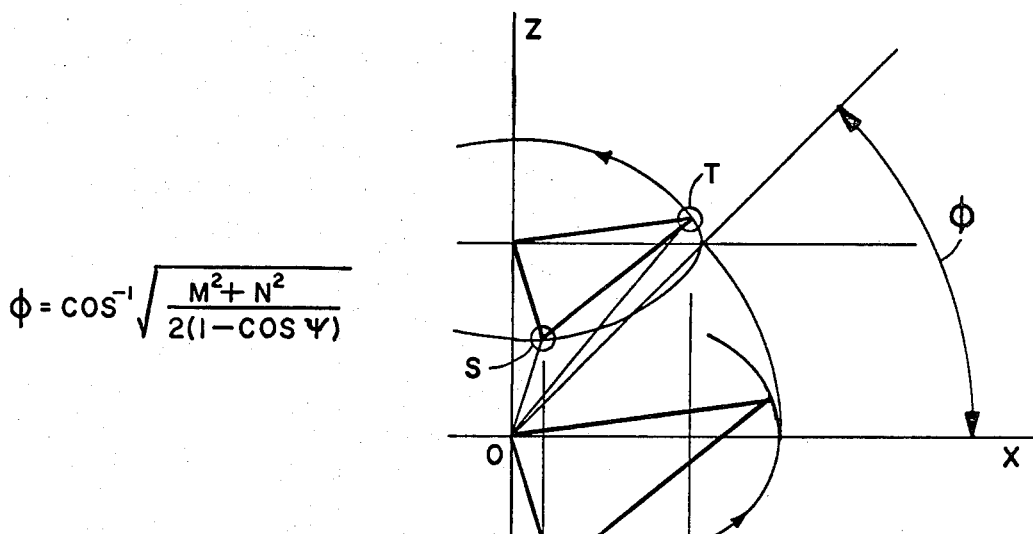
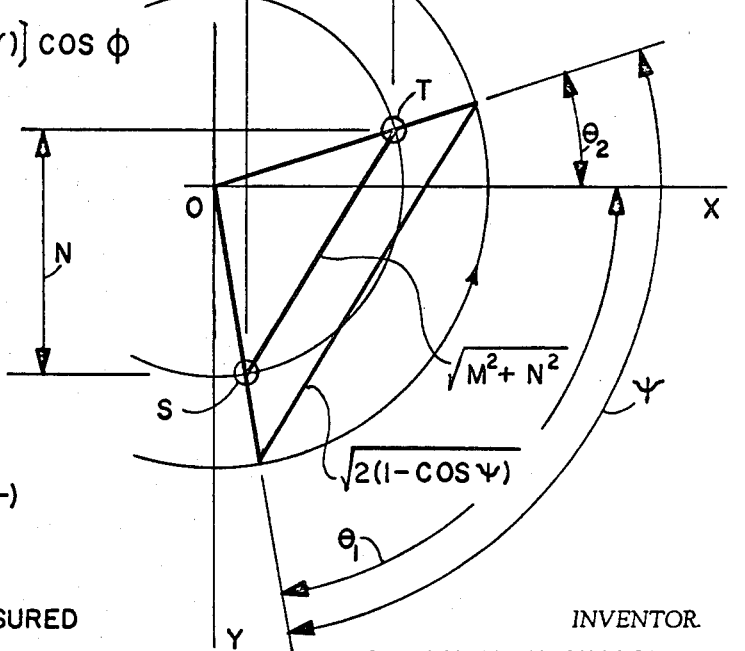
FIG__10A
$$\phi = \cos^{-1}\sqrt{\frac{M^2 + N^2}{2(1 - \cos \psi)}}$$
$$M = \left[\cos \theta_2 - \cos(\theta_2 - \psi)\right] \cos \phi$$
$$N = \left[\sin \theta_2 - \sin(\theta_2 - \psi)\right] \cos \phi$$
$$\psi = \theta_2 - \theta_1$$
$$\theta_2 - \tfrac{1}{2}\psi = \tan^{-1}\left(-\frac{M}{N}\right)$$
M AND N ARE MEASURED
FIG__10

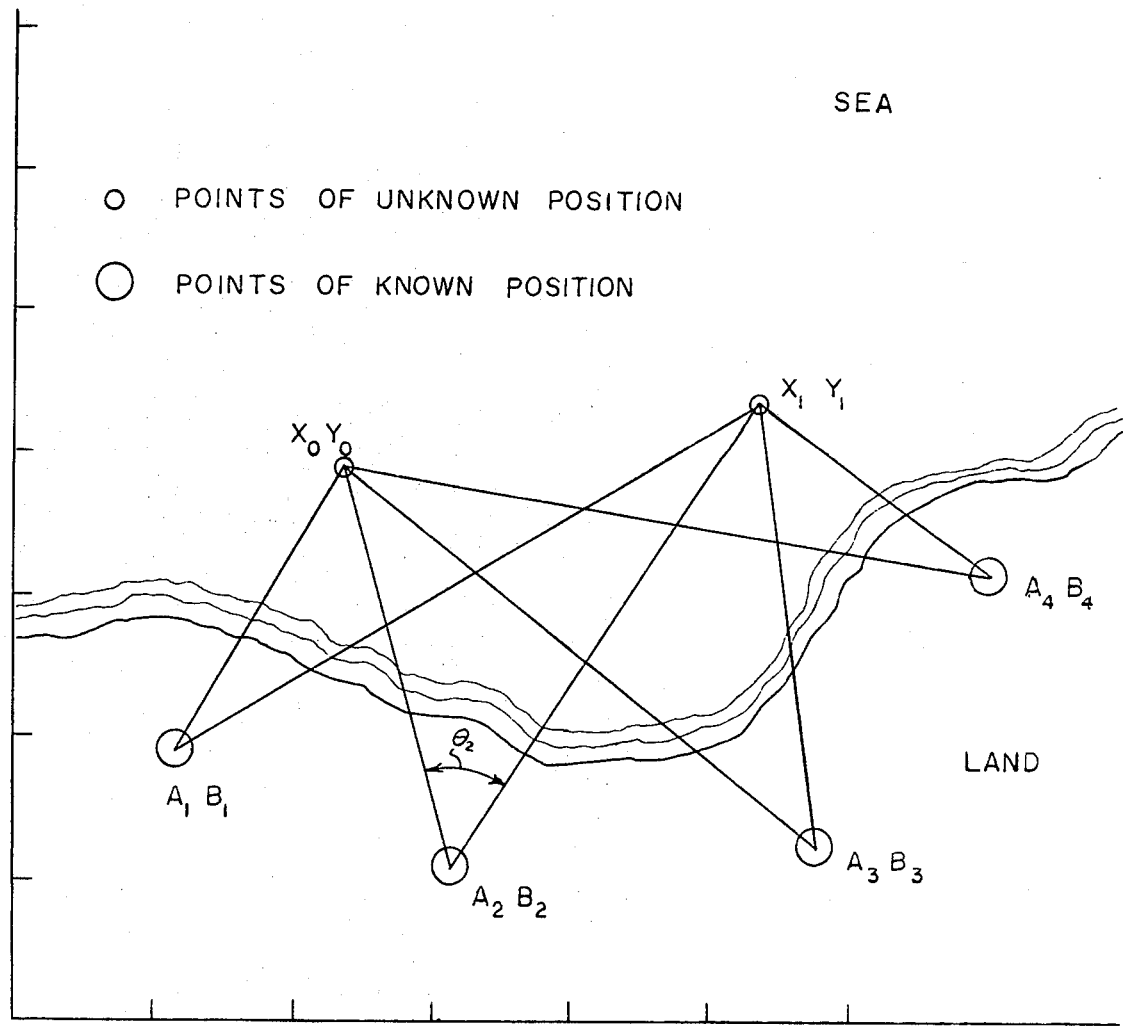
FIG—11
$$(X_1 - X_0)^2 + (Y_1 - Y_0)^2 = (X_1 - A_2)^2 + (Y_1 - B_2)^2 + (X_0 + A_2)^2 + (Y_0 - B_2)^2$$
$$- 2\sqrt{(X_1 - A_2)^2 + (Y_1 - B_2)^2} \sqrt{(X_0 - A_2)^2 + (Y_0 - B_2)^2} \cos \theta_2$$

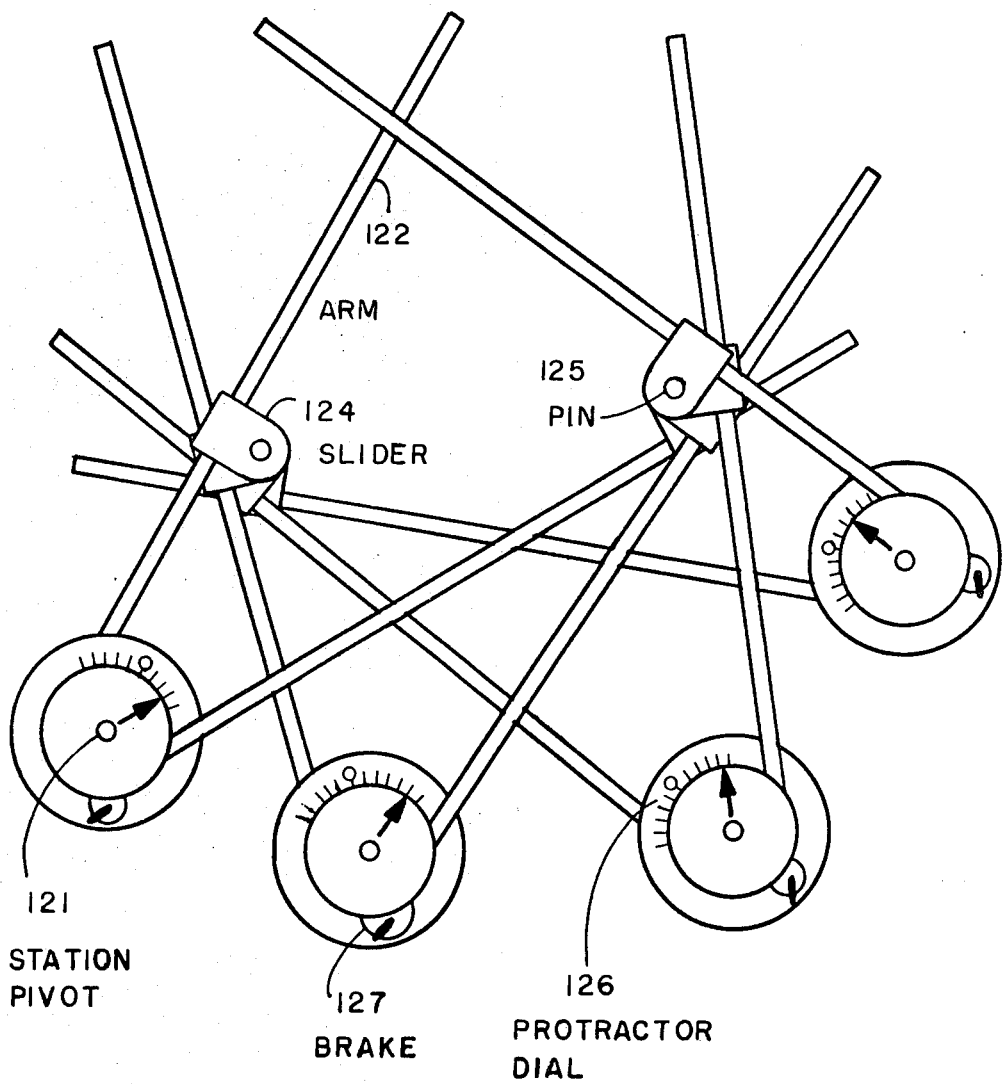
FIG—12

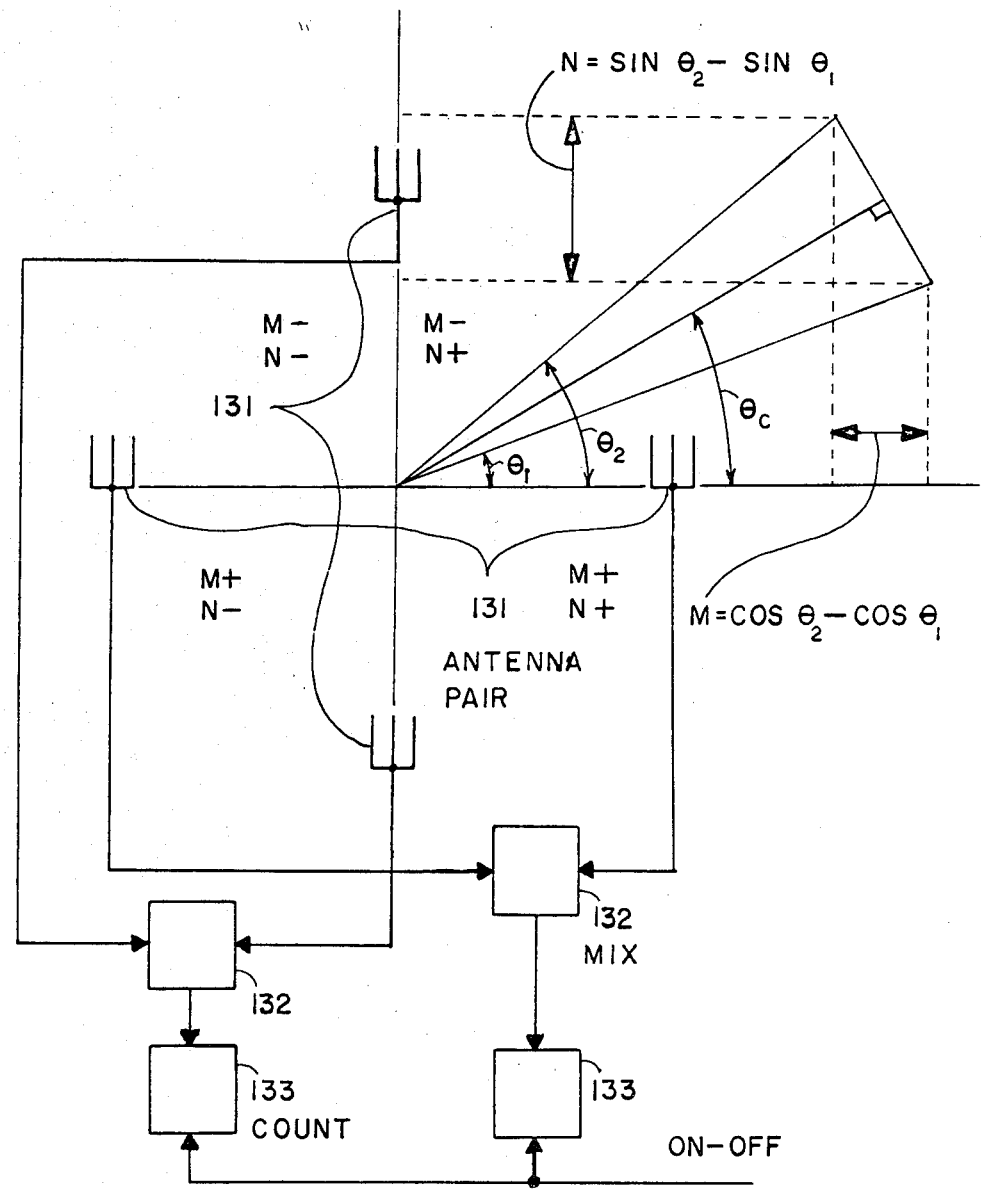
FIG__13

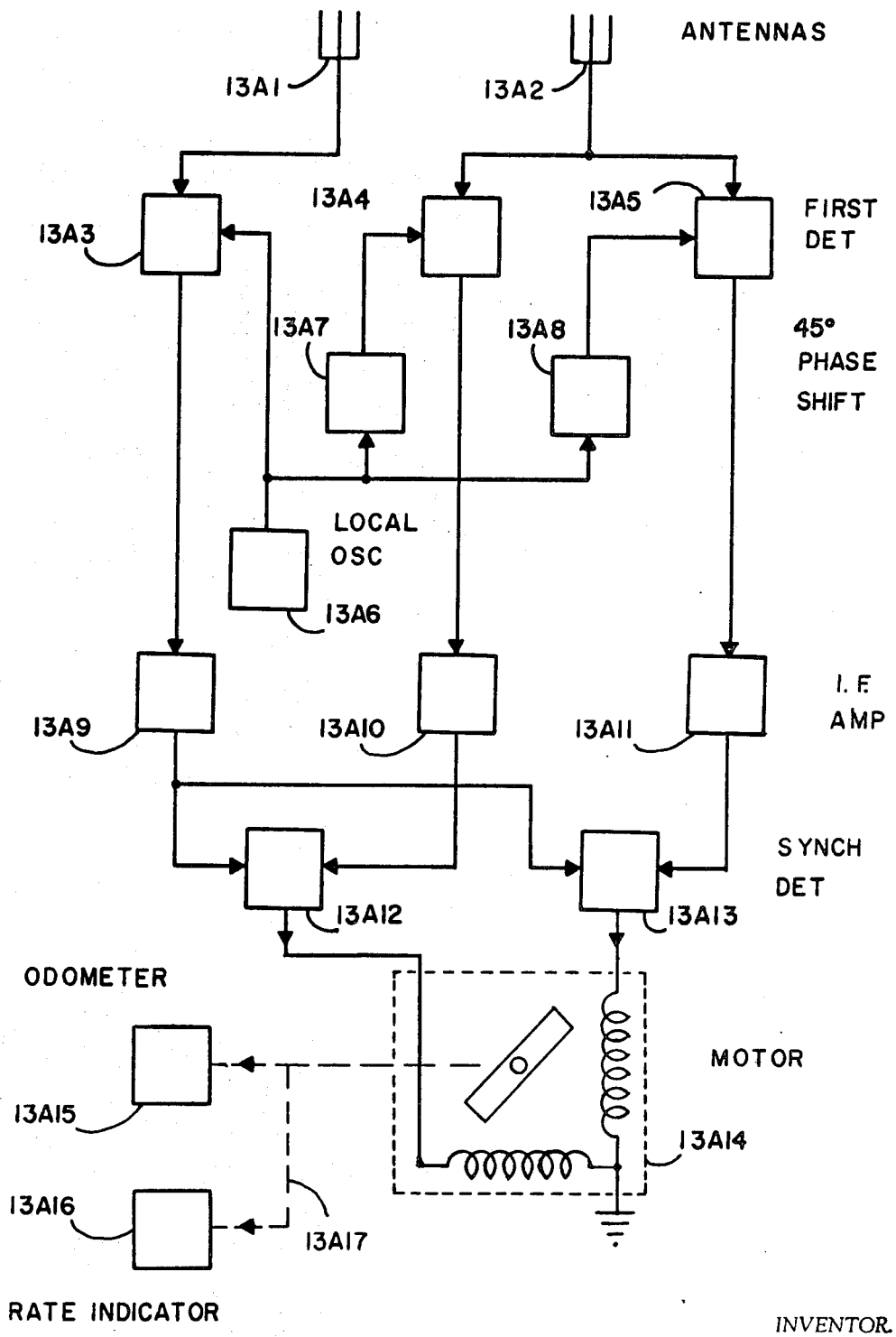
FIG_13A

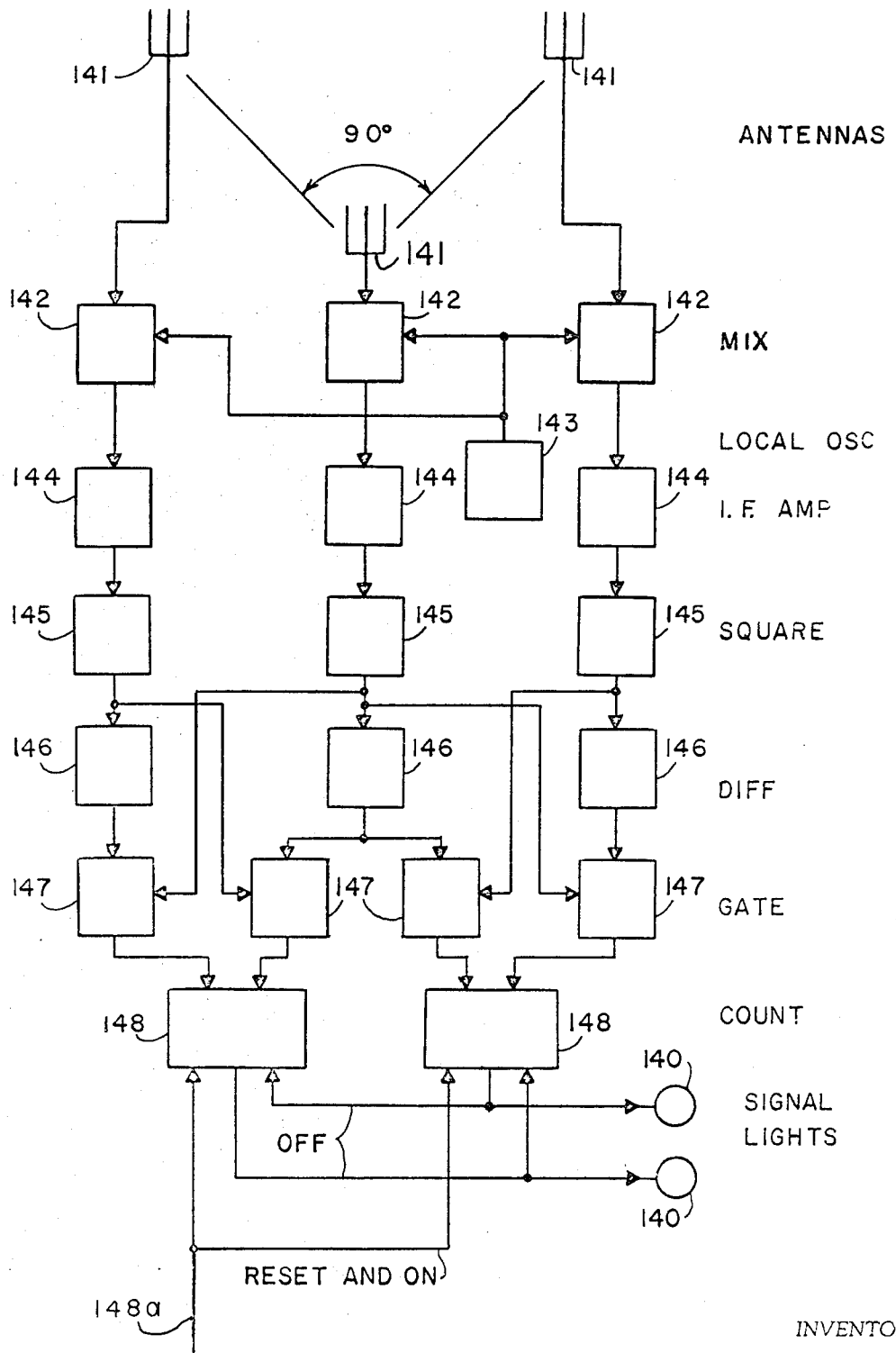
FIG_14

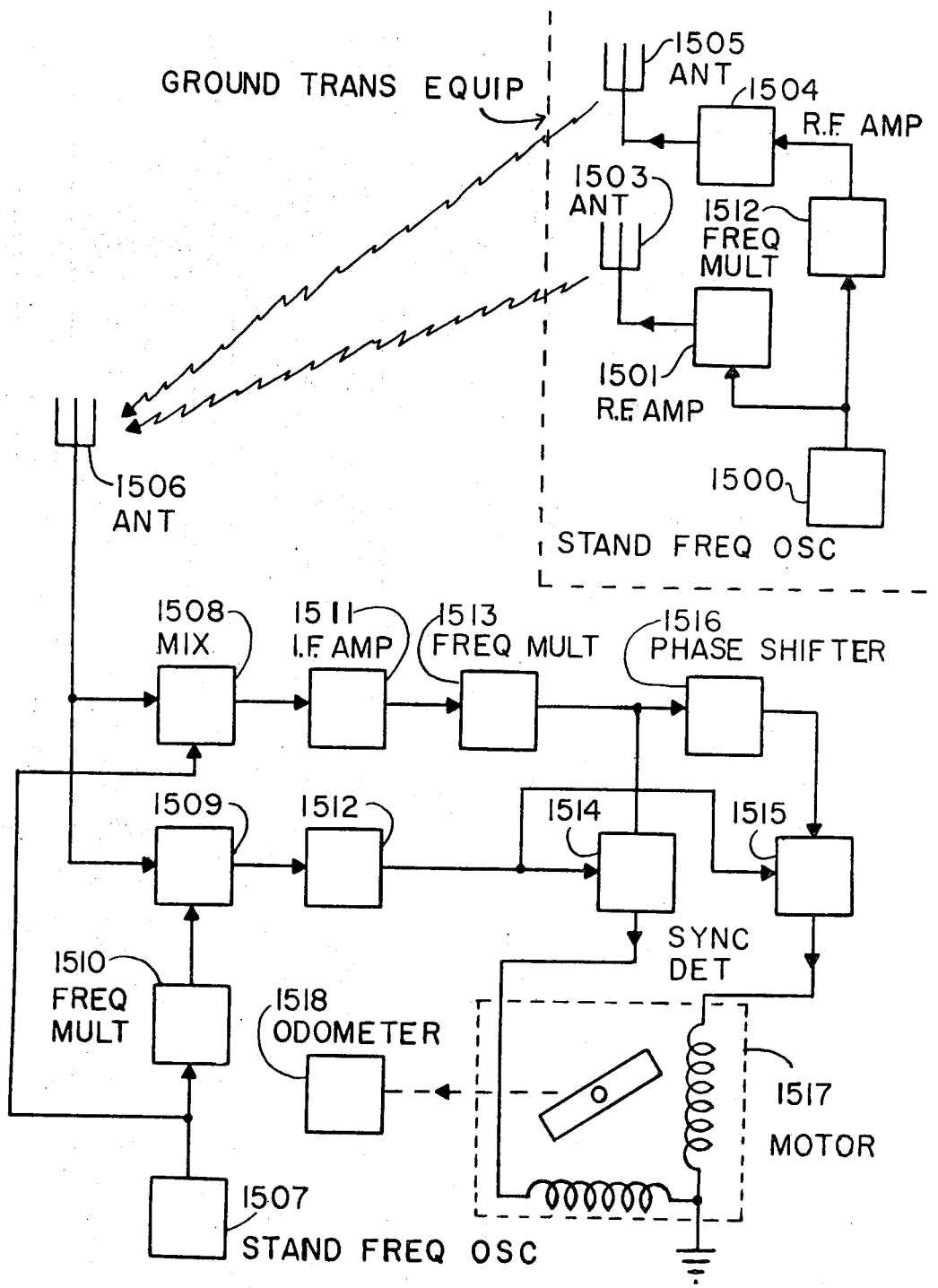
FIG—15

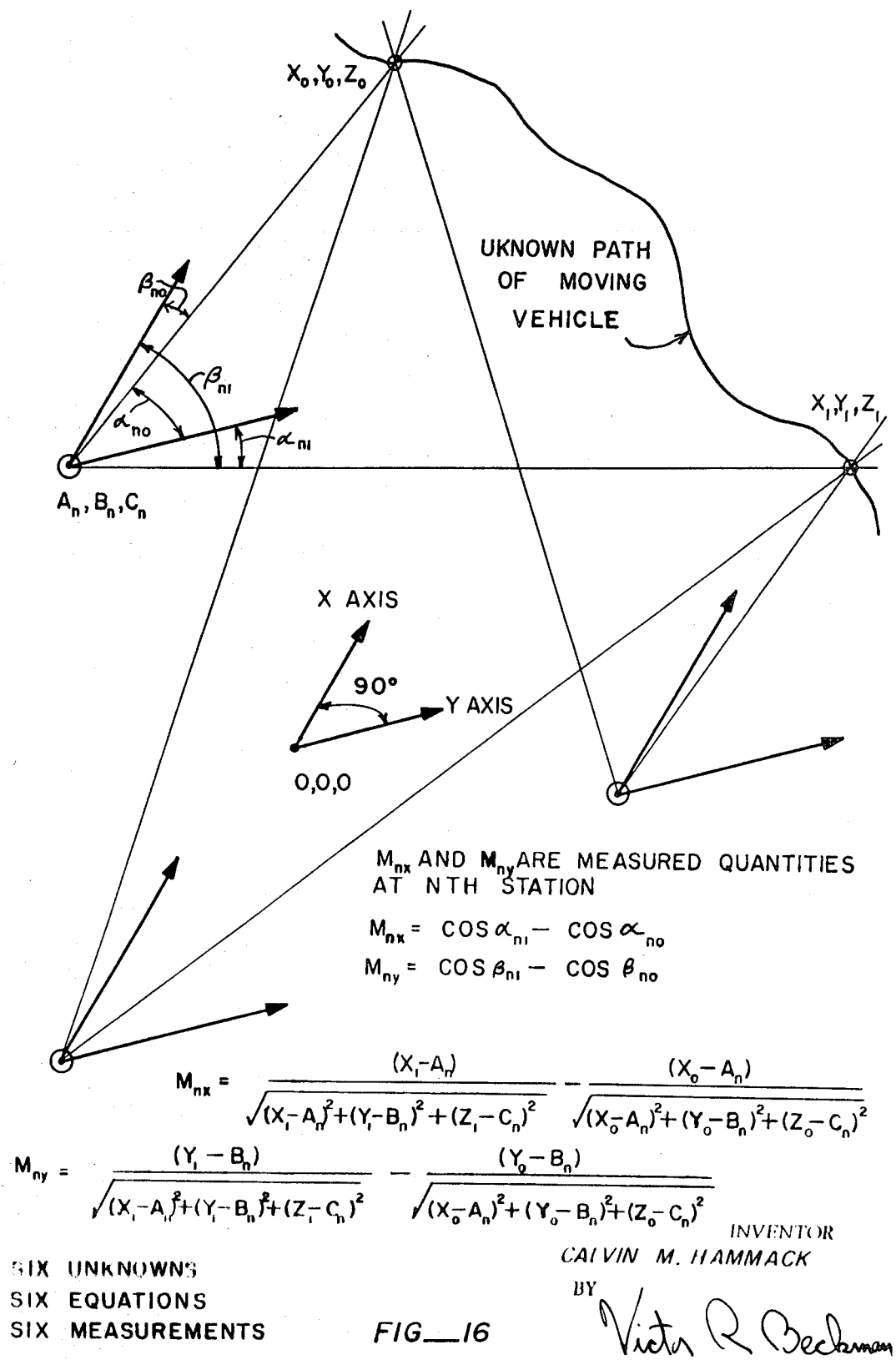
FIG—16

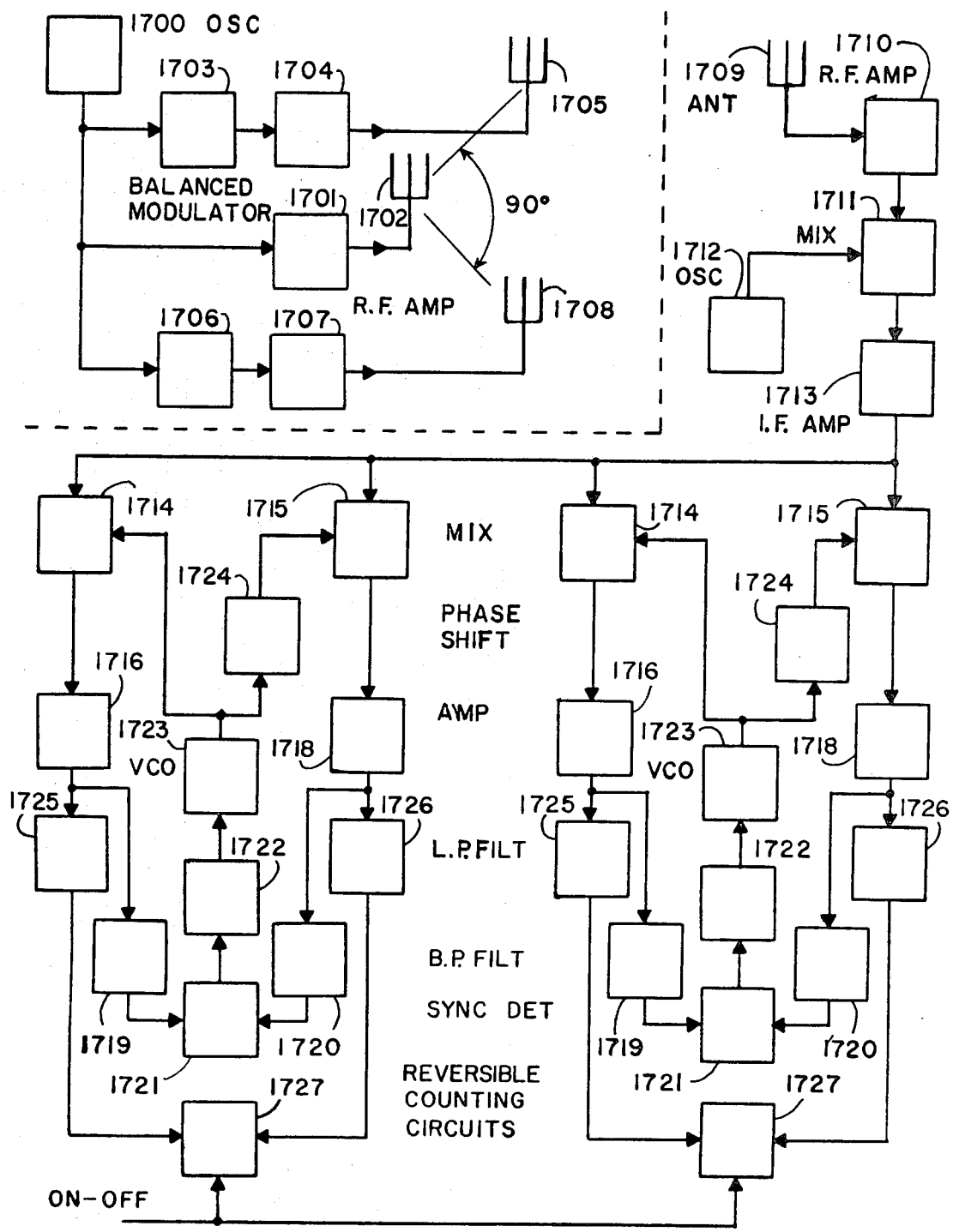
FIG—17

METHOD AND APPARATUS FOR GEOMETRICAL DETERMINATION

CROSS REFERENCES TO RELATED APPLICATIONS

This is a divisional application of copending patent application Ser. No. 420,623 filed Dec. 23, 1964, now U.S. Pat. No. 3,445,847, and is a continuation-in-part of copending patent applications Ser. No. 86,770 filed Feb. 2, 1961; Ser. No. 278,191, filed May 6, 1963, now abandoned; Ser. No. 335,454, filed Dec. 5, 1963, now U.S. Pat. No. 3,242,487, issued Mar. 22, 1966; Ser. No. 289,609, filed June 21, 1953, now U.S. Pat. No. 3,286,263, issued Nov. 15, 1966; and Ser. No. 312,598, filed Sept. 30, 1963, now U.S. Pat. No. 3,270,340, issued Aug. 30, 1966.

BACKGROUND OF THE INVENTION

My invention relates to the art of geometrical measurement and the determination therefrom of geometrical elements. There are many applications of my invention and some of these applications will be described in this specification. However, the underlying principles of my invention are distinct from the particular techniques which must be employed in each application of the invention. Furthermore, my invention is distinct from the ends served by the particular embodiments that are employed to illustrate the working principles. For example, my invention may be applied equally well for any of the following purposes;

1. indicating the direction of a transmitter whose position is known from a receiver whose position is otherwise unknown;
2. indicating the direction of a transmitter whose position is otherwise unknown from a receiver whose position is known;
3. indicating the direction from a transmitter whose position is known of a receiver whose position is unknown;
4. indicating the direction from a transmitter whose position is unknown of a receiver whose position is known.

It will be clear that my invention is not concerned with the particular medium through which the waves utilized by my method are propagated. My invention is in no way conditioned by the nature of the particular choice of the wide variety of uses to which it may be put.

My invention may be embodied in systems employing a single station or a multiplicity of stations. Any single station may possess a plurality of apertures if the particular embodiment employs wave phenomenon in the performance of the measurement function. These apertures are employed in the performance of measurement of angles, functions of angles, or variation thereof. In hybrid systems one or more of the apertures may be employed to measure range or variation of range or linear combinations thereof. When there are a plurality of apertures at the stations of the system the geometrical properties of the overall system are not affected by the separation distance of the apertures. The accuracy of a particular type of measurement may be affected by the spacing of the apertures but the essential geometrical characteristics of the system remain unchanged. Thus my invention differs completely from any system in which there is interference established between apertures that must be separated by distances that are appreciable relative to the distances between stations. My invention is distinct from the socalled hyperbolic or "Loran type" systems. In my invention there is no beating or interference established between the signals received at separate stations. To aid in this delineation, stations are referred to as points in discussing the geometrical aspects of my invention. Whereas separate apertures may or may not be space-separated at a given station, this separation, if it exists, is a factor only of the measurement performed and is not a factor in the significant geometrical principle of my invention. The entire measurement equipment at a given station is included in a volume of space of such small diameter as to be negligible relative to the distances between stations, or between stations and other points of the system.

Introduction

In my copending applications Ser. Nos. 86,770, 278,191, 298,609, now U.S. Pat. No. 3,286,263 dated Nov. 15, 1966, 312,598, now U.S. Pat. No. 3,270,340 dated Aug. 30, 1966, and 335,454, now U.S. Pat. No. 3,242,487 dated Mar. 22, 1966, it has been shown that it is possible to determine the position of one or more points relative to the positions of other points by measuring changes or rates of change in the geometrical relationships of the points in question. The principle of determining an instantaneous geometrical condition by measuring only the changes or the rates of change of some of the geometrical properties is far reaching in its practical consequences. It is not necessary to obtain in some manner an initial or preexisting geometrical condition to which the measured changes may be added to obtain the final geometrical condition; but one may obtain both the initial condition, the final condition, and conditions in between by only measuring, or otherwise knowing, the changes occurring in the geometrical condition between the epochs of successive geometrical conditions. Analysis and computation of dynamic relationships of my method are often expressed in terms of static geometry; and indeed, it is sometimes from these static relationships that one gains a first insight into the dynamics of my invention. The static relationships of my methods also apply to essentially static methods in surveying, navigation, and other activities related to geometry.

In my copending application Ser. No. 335,454, U.S. Pat. No. 3,242,487, it is shown that it is possible to determine the relative position of several different moving objects by measuring differences in the changes or rates of change in geometrical relationships between the moving objects of unknown position and points whose positions are known.

The various principles of my other inventions are specifically applicable to the determination of position or direction by measuring angles, functions of angles, changes of angles, changes of functions of angles, rates of change of angles, rates of change of functions of angles, the differences of functions of angles, and the differences of angles. Furthermore, these specific embodiments may be combined with other methods to provide improved methods suitable in certain areas. The simultaneous measurement of the change in the direction cosines of waves arriving at a station and the doppler phenomenon relative to such waves is a sample of such combination.

Definitions

In this application the words "measurement", "measured quantity" and the like will be reserved for quantities that are in direct proportion to the magnitude of the reaction produced directly on the sensitive measuring device. The word "determination" is employed to indicate, in addition to measurement, the process of finding the value of an unknown dimension or quantity through the combined processes of measurement and computation, the computation being accomplished by digital or analogue or any other means.

In many of the systems described in this application, simultaneous measurements of a number of quantities are made. Such a group of simultaneous measurements is called a "system measurement".

The word "reading" is reserved for the value of the measured quantity at the termination of the individual measurement, not necessarily at the termination of the measurement sequence. "Measurement" may be employed to indicate the process resulting in a reading.

The "changes" and "rates of change" referred to in this application are changes and rates of change occurring with respect to time, unless otherwise stated.

The words "measurement group" refer to the totality of all of the measurements required for the complete determination of a position or dimension.

The words "reference frame", sometimes just the word "frame", in this application denotes a system of orthogonal coordinates relative to which a point or a line, or both, may be specified in such a manner that other lines and other points specified in terms of the same reference frame have a geometrical relationship relative to the first point and the first line and relative to each other that is fully described by the specifications and invariant with the position or motion of the frame. The various lines and points need not exist simultaneously, and in fact, the various lines and points may be several successive positions or orientations of the same line or point.

The practical embodiment of a frame may be the mechanical structure supporting the measuring equipment and mechanical continuations thereof that remain without geometrical change relative to the mechanical supporting structure. Inertial means may provide such a reference frame.

The word "bearing" is used in this application to designate an angle located at a point of the system, one arm of the angle containing another point of the system, the other arm lying along an axis through the point at which the said angle is located. The point at which the bearing is located is called, in this application, an apex point. The point contained in the arm of the bearing is called, in this application, an arm point. There are also angles in this application not called bearings and which angles contain a different arm point in each arm and which angles are located at apex points.

The words "bearing functions" are employed in this application to describe some function of the bearing such as a sine or cosine or other transcendental function or linear combinations thereof.

The words "distributed system" are employed in this application to describe a system in which there are a plurality of points at which there are one or more angles that are measured or whose variations are measured or functions of which are measured or variations of such functions. Points of the said plurality of points are called apex points in this application.

The word "variation" in this application is employed to mean incremental changes or rates of changes, either of which variations occur with respect to time.

The words "a priori" are used to designate known information other than that of the dimensions or measurements of the system that may be employed to aid in position bounding or determination or resolution of ambiguities. Such information may concern the characteristics of the motion of a moving object.

The word "bound" is position in this application to indicate the partial determination of position or motion, the restriction thereof, or the determination of one or more coordinates of position or motion.

The word "hybrid" is employed in this application to describe systems in which measurements of ranges or variations of ranges or linear combinations of these ranges or changes of ranges are employed along with simultaneous measurements of angles, changes of angles, functions of angles, or variations of functions of angles to bound, determine, describe or specify the position of a point.

A "significant point" or a "significant epoch" is that point or epoch at or corresponding to the initiation or termination of a measurement of incremental change.

In describing the method of my invention, the word "action" is employed sometime rather than the word "step" where it is desired to indicate that the operations are not necessarily performed in time sequence.

THE POSITION-MOTION STATE

It is common practice to determine by measurement and computation both the position and motion of a moving object. Frequently the position and motion are interrelated, as by the affect of gravity. It is frequently convenient to refer to the state of the position and motion of an object or of a point in space. This state of position and motion of an object, or of a point, generally has a number of dimensions depending upon the character of the motion. The position-motion state of a stationary point in space is generally expressed in three non-zero dimensions. The position-motion state of a stationary object of finite size is generally expressed in six dimensions, three dimensions of location and three dimensions of attitude or angular orientation. Of course, any of the above dimensions may be zero under special circumstances just as the dimensions expressing the motion are zero in thus expressing the position-motion state of a stationary object. The dimensions are of course expressed relative to a particular reference frame having three orthogonal axes although the dimensions need not be expressed as distances along these axes, and the object is said to be stationary with respect to this frame if there is no variation of the point relative to this frame.

If the point or object in space is in motion with respect to the reference frame, there is no upper limit to the number of dimensions that may be comprised in the position-motion state of the particular point or object in space. It is sometimes, but not always, convenient to express the motion dimensions of the position-motion state in terms of the vector components of velocity, acceleration, jerk, and any number of higher time derivatives of rotation and translation. The totality of the dimensions of the position-motion state include both dimensions of motion and dimensions of position. If an object is travelling at constant speed in a straight line relative to a reference frame and is not rotating relative to that frame the general position-motion state of the object may be expressed in six-dimensions.

It may be required for a particular purpose to determine only a single dimension of the position-motion state, and my invention may be employed to determine any one or more of such dimensions.

It is understood that the dimensions of the position-motion state as determined by my invention may be instantaneous values or may be averaged values in a given interval of time. Average values of velocity components and the time derivatives thereof may be expressed as finite differences.

SUMMARY OF THE INVENTION

It is an object of my invention to determine the direction of propagation of waves with high accuracy.

It is another object of my invention to provide a mechanically motionless means of direction finding and beaconing.

It is another object of my invention to provide a method of determining the direction of propagation of waves in which the accuracy of the system is not dependent upon the establishment and the maintenance of precise phase conditions between the various critical parts of the system.

It is a further object of my invention to provide a means of determining the direction of propagation of waves that is independent of the medium through which the waves are propagated so long as there exists in the art adequate means for the generation and detection of such waves.

It is a further object of my invention to provide a means of determining the direction of propagation of waves in which the wave propagating medium is coupled to the electrical system through space-separated apertures at at least one of the stations of the system.

It is a further object of my invention to provide a method of determining the direction of propagation of waves that is dependent upon the measurement of change of phase and independent of phase.

It is a further object of my invention to determine position in terms of instantaneous coexisting coordinates of position by measuring only variation of geometric quantities such as angles, or the transcendental functions thereof, and calculating the desired positional data from the measured data.

It is a further object of my invention to provide a method of determining any of the mutual angular relationships desired of a group of points whose relative positions are fixed but are completely unknown and otherwise unknowable, by measuring at each of the points of the group of points variations of angle of an object moving relative to the group of points.

It is an object of my invention to employ the rotation of an array of apertures to secure the relative angular motion between the array and a distant target relative to which it is desired to determine the orientation of the array. Equivalently, one map employ the rotation of the array to determine the direction of the target relative to the array. In connection with the use of such arrays, it is a further object of my invention to perform measurements of variations of direction cosines resulting from this rotation, eliminating the need for directly measuring at any time the actual value of any direction cosine itself.

It is a further object of my invention to provide a means and method for the determination of the attitude of a missile or aircraft by mounting thereon an array of apertures which is caused to tumble or rotate and by performing measurements of the variations of direction cosines relative to the various axes of the array owing to this rotation or tumbling to determine the attitude of the missile or aircraft relative to one or more ground stations.

It is a further object of my invention to provide a method of determining the relative angular relationships among points of a first group of points by measuring at each of said points the angles subtended by a second group of points, the angular relations of the points of neither group of points being otherwise known or knowable.

It is a further object of my invention to determine the angular relationships between the points of a group of points by measuring at some of the points of the group of points the angles between other points of the group of points at which points no measurements are made.

It is another object of my invention to reduce problems of navigation, position finding, surveying and direction finding that are dynamic in character to problems of static geometry, thereby simplifying the processes of analysis and computation.

It is also an object of my invention to employ my methods of static geometry in conjunction with measurements of static geometrical quantities or elements.

It is a further object of my invention to provide a method of determining the shapes of a changing geometrical configuration existing at selected epochs by measuring changes in geometrical properties of the configuration occurring between these epochs, and calculating the desired information from the measured data without reference to or knowledge of preexisting, or subsequently existing, shapes or other geometrical properties or conditions.

It is an object of my invention to achieve improved accuracy in the determination of angles and positions by employing, as fundamental measurements, measurements of changes and differences which can be performed with great accuracy.

It is an object of my invention to provide a method of improved practicality and applicability by eliminating in some applications certain items difficult of achievement and maintenance in the field, including boresighting and including accurate maintenance of phase (timing) between stations.

It is an object of my invention to provide a method of eliminating the problems caused by phase ambiguity in cosine type measurements.

It is a further object of my invention to provide a method of determining the position of a moving object relative to a single station and relative to a set of axes through that station without measuring the distance to said moving object nor the bearing of the moving object relative to the station, but instead, determining these quantities, if they are desired, by coordinate conversion computation from other measurements which, in themselves, are sufficient to define the position of the moving object.

It is a further object of my invention to employ redundant data where needed to improve the accuracy of the determination of position of a point or the variation of the position of a point by statistical methods.

It is a further object of my invention to resolve ambiguous determinations of position or variations of position where these occur owing to geometrical conditions or a plurality of simultaneous targets by performing a redundancy of measurements.

It is a further object of my invention to employ known characteristics of the motion of a moving object in conjunction with determinations of angles, functions of angles or variations thereof to determine or bound the position or variation of position of a point in space.

It is a further object of my invention to employ gyroscopic or laser gyro means mounted on a mechanically pointed angle tracking antenna or other sensor to indicate the rate or magnitude of variation of pointing direction of such angle tracking antenna, thereby avoiding the complexities and difficulties associated with obtaining suitable angular references through the swivels and gimbals of the mount of the antenna or other sensor.

It is a further object of my invention to employ coherent light waves such as can be produced by laser means to measure changes of cosines of bearing angles, thus obtaining great accuracy of the fundamental measurements in certain of the embodiments of my invention.

It is a further object of my invention to employ interference methods with coherent light wave, acoustical waves, or radio waves to measure changes of cosine of bearing angles.

It is a further object of my invention to combine measurements of angles and/or functions of, or variations of, such angles and/or functions of angles with ranges, or linear combinations of ranges, or variations of such ranges, or variations of linear combinations of ranges, to determine position or variation of position of points in space relative to other points in space.

There is in the measurement art a wide variety of photographic techniques and devices for determining angles and functions of angles, and variations of these quantities, and it is an object of my invention to provide a method of employing these techniques for the bounding or complete determination of the position or variation of position of one or more moving objects, or a plurality of stationary objects.

There are in the radar and optical tracking art wide varieties of self-tracking devices, tracking antennas, tracking theodolites, which devices can be used to measure variation of the angular position of a moving object relative to the station where such means are located. It is an object of my invention to employ such means to determine or bound the position of a moving object.

In some embodiments of my invention the position or variation of position of a point is not completely determined, and it is the object of my invention in these applications to merely "bound" the position of said point, such as defining the bearing of a point relative to another point and its associated system of one or more axes.

It is a further object of my invention to specify or describe the position or variation in position of a point in space in terms of a set of measurable quantities, which measurable quantities need not consist of orthogonal coordinates but constitute a set of coordinates that are not orthogonal, the set of nonorthogonal coordinates so formed completely and uniquely defining the position or variation of position of the point in space.

The position or variation of position of a point in space may be determined in terms of a set of nonorthogonal coordinates, and it is an object of my invention to provide a method of determining the position or variation of position of such a point in terms of orthogonal coordinates employing the first determined nonorthogonal data.

It is a further object of my invention to provide a method of position determination, direction finding, or other position bounding, which method may be accomplished by employing light waves, acoustical waves, or radio waves.

It is a further object of my invention to provide a method of bounding or determining the position of a moving object wherein a source of coherent light, such as may be achieved by laser means, is placed on the moving object and interference measurement means are provided at one or more points for measuring quantities that constitute the information necessary for said bounding or said determination.

Another object of my invention is to provide an improved method of determining the positions of objects in orbit that is simple in its operation and requires a minimum of computer capacity and speed.

Another object of my invention is to provide a system for determining the direction and position of a moving object relative to one or more fixed stations that is incapable of being affected by reflections from fixed objects.

My invention may be employed using any number of measuring stations, depending on the particular degree of position bounding that it is desired to obtain and the amount of other data available, and it is an object of my invention to provide a position bounding method that employs one or more measuring stations which perform simultaneous measurements, said measurements being combined to obtain a bounding of the position of one or more objects.

Position bounding or determination may be performed relative to axes through one or more stations; and it is an object of my invention to provide a method of bounding or determining the position of an object or each of several objects dependent upon measurements of changes or differences of cosines of bearings from these axes or measurements of other such functions of the bearings relative to these axes or of measuring differences or changes of the bearings themselves.

It is a further object of my invention to determine the position of axes relative to which measurements are performed at each of one or more stations by performing measurements of the changes or differences of the bearings relative to these axes of one or more objects, or performing measurements of the changes or differences of the cosines or other functions of the bearings relative to these axes.

It is also an object of my invention to determine or bound the position of one or more objects by performing measurements relative to axes that are known.

It is a further object of my invention to determine or bound the position of one or more objects by performing measurements relative to a plurality of axes through one or more stations.

The method of my invention may be employed for determining or bounding the position of a single moving object or a group of stationary objects without modification, except in the manner of performing the necessary measurements. The geometrical relationships involved are the same relative to the several points in space whose position is to be bounded or determined regardless of whether these points represent the moving object at several points along its path or the simultaneous positions in space of a number of objects. It is therefore an object of my invention to provide a method of position bounding or determination that has wide application for both stationary and moving objects.

Simultaneous measurement of the doppler effect is frequently convenient to perform along with measurements of variation of bearing or other angles, or functions of these angles, and it is a further object of my invention to determine or bound the position of one or more moving objects by performing these measurements simultaneously at one or more points.

It is a further object of my invention to resolve ambiguities that may occur through geometric characteristics of a particular system or the occurrence of more than one object in the field of the system simultaneously by employing other information available besides that which is contained in the system dimensions and the system measurements. Such information may be called "a priori" information. An obvious example of such use of "a priori" information is ruling out determination or bounding that indicate location of the object at an impossible position such as underground.

It is frequently desired to determine the positions of a plurality of points relative to each other using measurements performed at other points or relative to other points. The points whose positions it is desired to determine thus may be points along the path of one object, or along the paths of each of several objects, or they may be the simultaneous positions of several objects. Such points are called arm points elsewhere in this application, and the other points employed for measurement are elsewhere called apex points. It is therefore an object of my invention to provide a method of bounding or determining the positions of a plurality of such arm points relative to each other that is usable in a wide variety of applications with both still and moving objects.

It is frequently desired to determine the positions of a plurality of stationary points relative to each other using measurements performed relative to angles at such points, one or both arms of which angles each include one of a number of other points. The points at which the angles are located and which points it is desired to locate relative to each other are called apex points elsewhere in this application. The other points, which may be moving or fixed, are elsewhere called arm points. It is therefore an object of my invention to provide a method of measurement of the angles, or variation of the angles, or functions of these angles, or functions or variations of functions of such angles, for determining or bounding the positions of the "B" points relative to each other.

It is a further object of my invention to provide an improved method of determining the motion of one or more moving objects.

It is a further object of my invention to provide an improved method of determining the motion of two or more moving objects relative to each other.

In reflective systems wherein a plurality of moving objects whose position it is desired to determine are illuminated by a common source of waves, there sometimes results ambiguity in the association of the signals of the various reflectors at the several apertures of a multi-aperture receiver. It is therefore an object of my invention to provide a method of grouping the signals from a given reflector together by observing the doppler effect. Signals from each aperture corresponding to a given target will indicate the same doppler shift and are thus separable from the signals of other reflecting objects having different doppler modulation.

It is a further object of my invention to employ doppler tracking filters to narrow the detection spectrum around each signal for improved sensitivity and/or for signal grouping.

Other objects and advantages will be apparent from the following description of a preferred embodiment of the invention made with reference to the accompanying drawings.

BRIEF DESCRIPTION OF THE DRAWINGS

FIG. 1 is a diagram showing two-aperture geometry;

FIG. 2 is a diagram showing two-aperture circuit using phase measuring device;

FIG. 3 is a diagram showing two-aperture geometry for difference measurement;

FIG. 4 is a diagram showing two-aperture circuit for transmitting, using wave modulation for identification of apertures;

FIG. 5 is a diagram showing two-aperture receiving circuit for measuring rate of change of direction cosine using differentiator;

FIG. 6 is a diagram showing two-aperture circuit for measuring rate of change of direction cosine using frequency discriminator;

FIG. 7 is a diagram showing two-aperture circuit for measuring change of direction cosine using counter;

FIG. 8 is a diagram showing two-aperture circuit for measuring the difference of the direction cosines of two different simultaneous wave fronts;

FIG. 9 is a diagram showing the geometry of direction finding in three-space in accordance with this invention;

FIG. 10 is a diagram showing a rotating direction finder;

FIG. 11 is a diagram showing the geometry of four-station position determination;

FIG. 12 is a diagram illustrating the apparatus for four-station position determination;

FIG. 13 is a diagram illustrating a circuit for finding direction using four apertures;

FIG. 13A is a diagram illustrating a circuit for finding increments and rates of change of direction cosines;

FIG. 14 is a diagram illustrating a circuit for finding direction of moving receiver from beacon transmitter;

FIG. 15 is a diagram illustrating a circuit for finding direction of moving receiver from beacon transmitter;

FIG. 16 is a diagram showing the geometry of a method for finding position in three dimensions using three stations; and FIG. 17 is a diagram showing a circuit using three transmitting apertures for finding direction of receiver relative to transmitter axes.

KINDS OF MEASUREMENTS

In the use of my invention it is necessary to perform geometrical measurements related to angles. In some instances angles are measured directly, in other instances it is the change of angle that is measured, and in still other instances it is the rate of change of angle that is measured. In other applications of my invention some function of an angle is measured or the change in some function of an angle. In several embodiments it is the change in the cosine of an angle that is measured; and in other embodiments it is the difference in the cosines of two simultaneous angles that is measured.

Embodiments of my invention include, along with measurements of angles and functions of angles and variations thereof, the simultaneous measurement of other phenomenon. One such phenomenon that is particularly suitable for measurement simultaneously with that of change in cosine is the doppler effect. Measurement of the change of range or propagation path distance may be performed using equipment similar to some of the equipment that may be employed for the measurement of the change of cosine of angles. It is a part of my invention to perform such measurements in combination with measurements performed relative to the cosines of angles.

An advantage of my invention in several of its embodiments lies in the simplicity of the instrumentation required for the performance of the necessary measurements. One underlying reason for this simplicity is that changes and differences of quantities are measured rather than the absolute total values of the quantities. The mathematical and geometrical relationships that are part of my invention make the use of such information possible in the determination of the desired information. Consequently, it is of importance to have an understanding of the theoretical and practical relationships between these various types of measurement, measurement of the absolute value of a geometrical quantity, measurement of the difference between two values of such a quantity, measurement of the change in the value, and measurement of the rate of change of the value of such a quantity.

In the practice of my methods, changes and differences are often measured directly rather than being derived indirectly by the performance of two measurements of the absolute or total value of the phenomenon under observation and subtraction to finally achieve the desired data. However, some embodiments of my invention employ the latter process. A device that is capable of making separate successive measurements is usually adaptable, at least in principle, to measuring directly changes or differences in the measured quantity. The method of taking successive measurements to find the difference of conditions existing at successive epochs is limited by the accuracy achievable by a single measurement. The percentage accuracy of the value of the change so determined diminishes rapidly as the magnitudes of the measured quantity at each epoch approach equality. This is the familiar problem of determining the difference of two large quantities. If the measuring device has an error that is proportional to the magnitude of the measured quantity, it is a much more accurate procedure in determining the values of small changes in the quantity to employ the device, if possible, for the direct measurement of the change than it is to measure the large total values separately and then subtract the one measurement from the other. Similarly, to find the difference of two simultaneous quantities of nearly the same magnitude a more accurate determination results by measuring the difference directly, when a measuring device whose error is proportional to the magnitude of the measured quantity is employed. When the error of the measuring device is fixed in magnitude and independent of the magnitude of the quantity measured, there is generally still a reduction of the error achieved by measuring the difference directly since only one measurement is required.

Changes measured over relatively short time intervals are not so subject to errors that may be introduced by drift of the standards employed in the measurements. The true value of my invention in the matter of accuracy is shown specifically in the results of the calculated comparative error analyses and in the demonstration of models.

In some instances the direct measurement of a geometrical quantity is impractical or it is impossible to employ a desired instrument or technique in the performance of such a measurement, whereas, the measurement of changes, differences or rates of change may be entirely practical or within the scope of the instrument or technique that it may be desired for other reasons to employ.

In some instances the direct measurement of the total value of a geometrical quantity may lack accuracy but, because of the nature of the error producing factors, it may be possible to obtain the difference of two such measurements with great accuracy. Such a condition can obtain if the error producing effect is of the same magnitude in both measurements.

Whereas, taking the difference of two measurements is usually not preferred over the direct measurement of a change or difference, the technique has its practical applications and is not beyond the scope of my invention.

The derivation of changes and differences, either by direct measurement or indirectly by taking the difference of total values, is not restricted to values of the changes or differences that are small compared to the total magnitudes of geometrical quantity being observed. Indeed, it often occurs by reason of the geometry involved that the accuracy of a given system is improved by taking measurements in such a manner that the changes or differences are large; and the accuracies with which such large changes and differences can be found directly and indirectly are of considerable interest.

In addition to the increased accuracy and even the feasibility made possible by the use of these techniques, there is another very practical advantage in the matter of convenience and economy. Some elements necessary to systems performing functions similar to those performed by my system are simply not required in my system. Maintaining exact phase references over considerable distances and bore sighting in the field within the required accuracy and cost limitations are often major stumbling blocks to successful applications of an otherwise sound method. The absence of these items in embodiments of my invention are a great practical advantage.

The methods of my invention enable the determination of the relative positions of each object of a moving group of objects. In this mode of operation the dimensions of the group are small compared to other distances involved, and the position of the group is known. Methods of my invention described elsewhere in this application, conventional radar, or other means may be employed to determine and track the position of the moving group of objects. The measurements performed are those of very small increments of the values of the quantities already discussed in this section. Accordingly, apparatus and methods of measuring very small differences of changes of angles and functions of angles are important in some applications of my invention.

Interference phenomenon is the basis for many methods of measuring the changes of small angles as well as for methods of measuring increments of functions of larger angles and small differences of such increments.

Angular Measurements

Instruments for the measurement of angles are common. The words "transit", "adelade", "direction finder", "interferometer", "theodolite", "sextant", "protractor", and "camera" are frequently employed to denote such angle measuring devices.

The measurement of angles, changes of angles, and differences of angles is somewhat different from the measurement of the similar aspects of trigonometric functions in that the differences or changes of angles are other angles with easily seen geometrical significance. The relationship between the two angles and their difference angle is linear. This relationship does not exist between trigonometric functions. The difference between two cosines is not another cosine possessing an obvious geometrical significance. In angular measure it is generally possible to employ the same device either for the measurement of an angle or for the measurement of the difference between two angles or to measure the change of an angle. In some instances, these operations are distinguished only by the words used to describe them. In general, the most significant aspect of the direct measurement of angles performed in the methods that are the subject of this patent application, is the absence at each place of measurement of a standard of direction or axis relative to which such measurements can be performed. Under these conditions two different stations located at known points on the same reference frame are not able to identify any given direction common to both stations. One station would not be able to identify a direction or a coordinate axis that is identifiable by the other station. However, each station would be able to choose a given direction and establish it in such a manner that the direction would remain invariant relative to the position of the other station and invariant relative to any direction that in like manner might be chosen and established at the other station. Separate systems of orthogonal coordinates may be established at each station in an arbitrary fashion. The orientation of these separate coordinate systems relative to each other may be quite unknown but would be known to be invariant by virtue of the relationship of the stations to the common reference frame upon which they are established.

In some embodiments of my invention it is unnecessary for the position of the stations at which angular measurements are made to be known relative to the reference frame, it being only necessary that these positions be invariant relative to the frame.

It is to be emphasized that these relationships, far from being merely the subjects of esoteric exercises, are of importance in the design and fabrication of the instrumentation and in the operational procedures using this instrumentation for the purposes that are the objects of my invention. For instance, the problem of establishing and maintaining instrumentally a common direction among several separate stations on the Earth's surface is a costly one, and errors occurring in the process of establishing and maintaining such references are reflected in the increased inaccuracy of a system dependent upon the establishment and maintenance of such references. The elimination of the requirement for the establishment and the maintenance of accurate common direction references at separated stations or points is one of the objects and advantages of some embodiments of my invention. It is in relationship to this absence of a common direction reference that the words "change in angle" and "difference of angles" attains its significance.

In some embodiments of my invention the knowledge of one or more directions or axes is common to all of the stations sharing a common reference frame, but there exists an instrumental ignorance of other directions or axes or of some or all of the position coordinates of the station relative to the reference frame. For instance, in one embodiment of my invention the ease with which the vertical axis is determined by stations on the Earth's surface is exploited. Measurements of change of the horizontal angles (azimuth) are performed along with direct measurement of the vertical angles (elevation). My invention includes the use of combination arrangements where the measurements of the changes or differences of one coordinate or dimension are combined with measurement of one or more instantaneous values of coordinates or dimensions to determine the desired data. In similar embodiments of my invention, where there is no knowledge of any direction at any station, a local one axis reference system is arbitrarily established at each station. This axis may be called the vertical axis at the station and then measurements are made of the change in the local vertical angle as well as changes in the local horizontal angle. In some systems employing my invention, not only may the coordinates of the station be determined by such measurements, but the orientation of such local reference axes as well may be determined.

For determining positions of individual objects in a small moving group of objects relative to each other, the measurement of the changes of very small angles is of importance. In this mode of my invention the position of the small moving group of objects is continuously known. Furthermore, tracking equipments common in the sonic, radio and optical art are available for painting a device for measuring small angles and the changes thereof relative to an axis parallel to the direction of propagation of the incident waves. Devices and methods making use of interference phenomenon can thus be pointed at the waves arriving from the group of objects and so arranged as to record the changes of very small angles between the individual objects of the group as seen at the observing point, even as the direction of the group from the observing point changes.

Measurement of Changes and Differences of Cosines

It is a frequent practice to determine the direction of waves arriving at an equipment position by measuring the cosine of the angle between the direction of propagation and a reference direction rather than by measuring the angle itself. In some instances the inverse cosine is computed from the measurement readings of the cosine value, and in others the dial on the instrument performing the measurement is calibrated in a nonlinear fashion so that it effectively performs the computation in process of indicating the reading. A common method of measuring the cosine of the angle between the direction of wave propagation and a local reference direction is to measure the phase difference between two wave receptors a fixed distance apart. This measured phase difference is directly proportional to the cosine of the angle between the direction of propogation of the incident waves and the direction of a line through the two receptors.

The accuracy of this method of determining the cosine of the angle of the incident waves is dependent upon the accuracy with which the phase angle between waves incident upon two receptors may be measured. In practice the accuracy of this phase measurement is often largely dependent upon the phase stability of the electrical system which conducts the signals from the receptors to a common place and performs the actual measurement.

In a preferred embodiment of my invention the direction of propagation of radio waves incident upon two spaced dipole antennas is determined by measuring the change of the phase angle between the signals from the two antennas rather than by measuring the phase angle between these signals. In this manner only the net instrumental phase drift (not phase error) that occurs during the actual measurement is effective in producing error in the final direction determination. At no time is it necessary to determine or be aware of the value of the phase angle between the two signals. As the time interval over which the change in phase angle is measured is shortened, the error of the system owing to instrumental phase drift corresponding to a given value of true phase change is reduced. By taking successive measurements of the change of the phase angle a constant value of instrumental phase drift may be determined and its effect in producing an error in the system eliminated. Other embodiments of my invention also make use of this measurement of the change of the cosine of the angle of incident waves.

Much the same circumstance exists relative to the measurement of the difference of the cosines of the angles between the propagation directions of each of two simultaneous waves incident upon the apparatus and the local direction reference. Another embodiment of my invention uses this circumstance to determine the direction from the apparatus of each of two simultaneous wave sources.

When the measurement at a receiving station of a "-direction cosine" or simply a "cosine" or differences or changes or rates of change thereof is discussed in this application relative to the direction of propagation of a wave, the assumption is presumed that the wave front in the vicinity of the station is a perfect plane as it approaches the apparatus performing the measurement. Equivalently, one may say that the distance to the source from the receiving equipment is very much greater than the dimensions of the apparatus performing the measurement. The same assumption applies in the measurement of a cosine or direction cosine relative to a beacon transmitting station or to changes or rates of change or differences of such cosines. When two wave apertures are employed in the measurement of the cosine of the angle between the line joining the apertures and a line joining the apertures to another source or receiver of waves, or in the measurement of changes or differences of such quantities, the distance from the apertures to the other source or receiver is so many times greater than the distance between the apertures that the measurement error owing to the fact that the ratio of these distances is finite is always negligible in the system under discussion.

When cosine measurements are employed relative to a plurality of separate stations, the dimensions of the individual station equipments is very much smaller than the distance between the stations. When a plurality of apertures is employed at any station, the greatest distance between any of these apertures is small compared to the distances to and between the other stations and other sources and receivers in the system.

Specifically in the employment of my invention, it would be impossible for a station employing a plurality of apertures in performing cosine type measurements to share any of these apertures with any other station in the system.

The measurements of changes, rates of change, and differences of cosines employed in some embodiments of my invention are also distinct from the type of measurement sometimes referred to as a "Loran" or "-hyperbolic" measurement. First, the cone locus corresponding to the cosine is the limiting case of the hyperboloid as the distance between the apertures approaches zero. Second, it is differences, rates of change, or changes of the cosine that are generally measured, rather than the cosine itself. When in certain instances the cosine itself is measured, the first mathematical operation performed in making use of the data is taking the difference between two such measured values of the cosine. In this manner errors or deviations that are constant between the two values are cancelled which, indeed, is a fundamental object of my invention.

In FIG. 1 is a schematic drawing showing the geometrical relationships between two wave apertures 101 and 102, parts of an equipment for performing a measurement, and an incident planar wave. Theta designates the geometrical angle between the direction of wave propagation and the line joining the two apertures. This geometry is representative of a variety of types of measurement and a variety of devices for performing these measurements. A conventional arrangement for finding the cosine of theta is shown in FIG. 2. The two apertures 201 and 202 are connected by transmission lines 203 and 204 to a phase measuring device 205 which measures the phase between the two arriving signals. This measured phase designated by phi is in direct proportion to the cosine of the angle theta. Assuming that the phase measuring device 205 is accurate, the accuracy and stability of the total instrumentation is dependent upon the accuracy and stability of the apertures 201 and 202 and the transmission lines 203 and 204. The art contains a number of methods for calibrating such equipments and for monitoring and enhancing their stability and accuracy. See for example E. N. Dingley, Jr., U.S. Pat. No. 2,454,783 dated Nov. 30, 1948, for a device to establish the zero of a two aperture system. Also see for example F. J. Lundburg, U.S. Pat. No. 2,465,382 issued Mar. 29, 1949.

In the practical embodiments of my invention using this type of measurement, the phase accuracy or phase balance of the transmission lines 203 and 204 and the apertures 201 and 202 are of no consequence, and there need be no zero setting or known zero point of reference. The relative phase change through the two transmission systems need not be known or calibrated. When the arrangement of apparatus represented in FIG. 2 is employed in practical embodiments of my invention, it is always employed to perform a plurality of successive measurements. Each measurement includes an unknown that is common to each of the other measurements. It is true that such a measurement is a complete measurement in that its resultant or reading can be expressed numerically.

In an alternative method the zero of the scale of the phase measuring device 205 is set at the value indicated as the result of the first measurement in the preceeding paragraph. Successive measurements are then performed directly with reference to this zero setting, and each constitutes a primary measurement. This primary measurement is that of the difference of two direction cosines. Although the measurements cannot be simultaneous, the measured phenomenon may be simultaneous since the waves upon which the measurements are performed may be from different simultaneous sources with different frequencies or identifiable modulation, etc. On the other hand, the measurements may be performed relative to successive positions of the same wave source. The typical geometrical relationships involved in this type of primary measurement is indicated in FIG. 3. As in FIG. 1, the thetas represent the geometrical angles between the direction of propagation of the waves incident upon the apparatus and the line joining the phase centers of the two apertures.

The same principles apply to transmitting apparatus arranged so as to provide a directional beacon. Such an apparatus is shown schematically in FIG. 4. In this instance the angles whose cosines are to be measured are at the site of the transmitter rather than at the receiver. The receiver, which may be aboard a moving vehicle, has only a single aperture. The transmitter has two apertures 401 and 402. It is necessary for the receiver to be able to identify the waves coming from each of the two transmitting apertures so in this example the identification is provided by a pair of modulators 403 and 404, each of which modulates the signal from the oscillator 405 in such a manner as to identify the signal fed to the corresponding transmitting aperture. As with the equipment represented in FIG. 2, the phase delay through the modulators 403 and 404, the transmission lines 406 and 407, and the apertures 401 and 402 must be stable and accurate if the apparatus is to provide an accurate measurement of the cosine of the angle between the line to the distant receiver and the line between the apertures. However, as in the receiving apparatus, the problem of accurate phasing in this equipment does not exist since the primary measurement consists of the measurement of the difference of two cosines. These two cosines result from the same receiver being first at one place for a first reading or zero set and then at another place for the termination of the measurement. In some instances two separated receivers perform the reading function at separated points and the resultant data communicated to a common point the one element of data being there subtracted from the other to provide a synthesized element of primary data. In the manner described, the knowledge of or balancing of the relative phase shift through the two arms of the equipment is not required. The principles of my invention are the same whether applied to beacons or to direction finders or other systems.

Another embodiment of my invention employs measurements of the time differential of the cosine of the wave incident upon an apparatus represented by FIG. 5 containing two wave apertures 501 and 502, transmission lines 503 and 504 and a phase measuring device 505 identical to that shown in FIG. 2. However, in this embodiment the output of the phase-sensitive device 505 is differentiated with respect to time in differentiator 506. As the direction of the source of waves changes, the cosine of the angle theta also changes as a function of time, and the measured value of this quantity is the primary measurement of the system. Since this is a differential measurement, any constant unbalance of the phase shift through the two arms of the apparatus does not influence the value of the measurement.

Another embodiment of my invention, shown in FIG. 6, employs the same type of fundamental measurement as that performed with the apparatus shown in FIG. 5, but differs in the process of performing the measurement. As before, the phase delay in the two arms consisting of apertures 601 and 602 and the transmission lines 603 and 604, respectively, are not necessarily balanced or known. The transmission lines 603 and 604 feed a mixer 605. The frequency of the signal at the output of the mixer 605 is that of the difference between the frequencies of the signals at the two apertures 601 and 602 and is the result of variation of the angle theta as described. Another viewpoint is to say that the rate of change of range between the source and one of the apertures is not equal to the rate of change of range between the source and the other aperture with a consequent unbalance doppler effect. To be practical, the apertures of this apparatus should be separated by many wavelengths of the received signal or else frequency multipliers must be inserted prior to mixing. The signal from the mixer 605 is fed into frequency discriminator 606 where a voltage proportional to the frequency is developed for indicating purposes.

FIG. 7 shows an apparatus similar to that shown in FIG. 6. The apertures 701 and 702, the transmission lines 703 and 704, and the mixer 705 may be identical with those shown in FIG. 6. However, there is a substantial difference in the fundamental nature of the primary measurement performed by the apparatus shown in FIG. 7. The discriminator 606 is replaced by a counter 706. Thus the primary measurement is that of the net difference in phase shift occurring in a time interval governed by the on-off signal controlling the operation of the counter. This net change in phase between the two signals fed to the mixer 705 is owing to a finite increment in the angle between the line joining the apparatus and the distant source of waves and the line joining the two apertures. From the doppler viewpoint, one may say that the measurement is the result of unequal changes in the ranges from the apertures to the source of waves. The quantity measured is the difference in the two direction cosines corresponding to the epochs of the "on" and "off" signals to the counter.

FIG. 8 shows an apparatus for the simultaneous measurement of the difference in the cosines of the two angles $\theta_1$ and $\theta_2$ indicated in FIG. 3. The measurement essentially is that of taking the difference of two simultaneous measurements of the cosines of an angle as described relative to FIG. 2. The means of separation of the two separate simultaneous signals is not included in the diagram. The phase shifts in the apertures 801 and 802 and the transmission lines 803 and 804 must be equal for the signals corresponding to the two incident waves. Furthermore, the response of the two phase measuring devices 805 and 806 should be alike. The difference between the outputs of the phase measuring devices 805 and 806 is formed in subtractor 807, the output of which is the primary measurement. Inequality in the phase shifts through the two arms formed by apertures 801 and 802 and transmission lines 803 and 804 do not affect the measurement.

FIGS. 2 through 8 are simplifications of the actual apparatus and are only presented to indicate the underlying principles of the various measurements which are operative in some of the embodiments of my invention. It is to be noted that under certain conditions ambiguity can arise in measurements of instantaneous phase difference as described for FIGS. 2 and 8. This ambiguity can result from the separation of the apertures by distances greater than one wavelength. Methods of resolving this ambiguity by the use of additional apertures with smaller separation in the additional pairs of apertures are common. Such an arrangement is employed in the "Azusa" system, In measurements of the time derivative of the phase difference, there is no problem of ambiguity regardless of the separation of the two apertures. Similarly, the type of measurement in which a continuous recording of the net change in the difference of phase between the apertures is performed, as indicated in FIG. 7, there is no problem of ambiguity regardless of the separa-tion of the apertures relative to the wavelength.

The variety of techniques and apparatus for measuring functions of the cosine described are employed in both simple and more complicated embodiments of my invention. In some embodiments there are a plurality of pairs of apertures all fixed in position relative to each other. In some embodiments the plurality of pairs of apertures are located at the same site. In other embodiments the different pairs of apertures are located at separate sites, and in still other embodiments there is a plurality of pairs of apertures at each of several sites. In some embodiments the pairs of apertures are in motion, in translation or in revolution. Thus the change in cosine or the rate of change of cosine measured may be the result of motion of the measuring apparatus instead of or in addition to motion of the other end of the wave communication means.

There are other methods of measuring the various functions of cosines in addition to the use of paired apertures. Such methods include the well known phased array. In at least one equipment of this type there are many apertures arranged in a straight line. These apertures may be connected by elements possessing a controllable phase shift. By measuring the phase shift required to receive or transmit waves in a given direction, one is able to measure the cosine of the angle associated with that direction. Another method of measuring the direction cosines and the functions thereof is the use of an aperture that provides a signal proportional to the amount of energy or power intercepted by it. The intercepted energy is the product of the wave or field times the cosine of the angle between the direction of propagation and the perpendicular to the aperture face, in the manner shown in FIG. 1. The field strength must be known or otherwise eliminated as an unknown in the system. The field need not necessarily be a field of radio waves. Radiant heat would be suitable for such an application. Light waves can be used, either coherent or noncoherent. The list of such devices known to the art is great and this application cannot list them all. The apertures shown in FIGS. 2 and 8 inclusive may be directional or nondirectional. Use of light waves as with lazers provides apertures affording a very high ratio of width of aperture or separation of apertures to wavelength.

Included in the measurement techniques employed in the various embodiments of my invention are techniques for measuring cosine functions relative to one or more clusters of sources of waves or other field sources. These clusters of sources may of themselves be stationary or moving, the embodiments of my invention measuring position dimensions of units of the cluster relative to each other.

In instances where the cluster is composed of sources of the same source frequency, or is composed of reflecting targets, the doppler phenomenon provides a means of separating the signals of the various sources when they are in motion relative to the detecting equipment.

In those embodiments of my invention dependent upon the measurement of variation of cosine of the angle of coincidence of a plane wave wherein the signals from two apertures are mixed to obtain the measured signal, there is a relationship between the distance of separation of the apertures, the length of the wave, and the signal-to-noise ratio and the accuracy with which the measurement may be performed. For a given signal-to-noise ratio and a given wavelength, the accuracy of the measurement is increased as the distance between the apertures is made larger. This condition obtains until the distance between the apertures is made so large that the wave front may no longer be considered to be a plane. This is the condition in which the distance between the apertures becomes appreciable in comparison with the distance from the stations to the source of the waves. In a multiple station system we may add that the distance between the apertures can no longer be regarded as negligible compared to the distance between the stations. The measurement of the variation of the cosine of the incident wave front and the line between the apertures is effectively frustrated when the distance between the two apertures becomes appreciable in comparison to the other distances involved in the geometry of the system. With a given signal-to-noise ratio and a given wavelength it is of advantage to make the distance between the apertures used for a given measurement as large as one can without introducing the above described geometrical consideration. The cosine type measurement is admittedly an approximation based on the assumption of a distant source of waves. However, this condition is very closely approximated in my invention. Depending on the particular geometry of a given system configuration, the allowable separation of the apertures can be determined by calculations. One may then select the wavelength and the source power so as to achieve the necessary measurement accuracy. The necessary measurement accuracy is also dependent upon the geometrical considerations of the system, but in a different manner from the considerations that determine the aperture separation. If sufficient signal-to-noise ratio is available, or if the wavelength is sufficiently short, there is no practical geometrical limitation of the system on the minimum separation of the apertures. In fact, the smaller the aperture separation, the smaller is the geometrical error in the cosine measurement. One may improve the accuracy of the system then by increasing the frequency and the signal-to-noise ratio and reducing the aperture separation. Within the limits of the cosine approximation (the assumption of a planar wave across the entire diameter of the station) the aperture separation in no way affects the accuracy or the performance of the system as far as geometrical considerations are concerned. The only item affected by the aperture separation, once the cosine approximation (flat wave front) is achieved, is the effect of noise on the actual measurement itself, and there are no geometrical error considerations of the system associated with this separation distance.

Geometry and Calculations

My invention may be employed to determine the direction of waves transmitted or received by a station, and to determine relative position of sources, receivers and reflectors of waves. Each determination of desired data employing my invention involves the application of a geometric principle and an apparatus or technique for measuring or otherwise knowing one or more differences, changes, or rates of change of one or more geometrical quantities. Some of the advantages of my method stem directly from the cancellation or balancing of error effects generally inherent in measurements of change, rate of change, and difference. Similarly, my invention in some instance makes possible the use of measurements of quantities containing an unknown component which is cancelled in taking the difference of two such measurements.

In using my invention to determine the desired geometrical quantity from measurements of change, difference, or rate of change, it is often necessary to perform some mathematical calculation based on some geometrical principle or principles. There is a calculable ratio of the errors in the final determination of the magnitudes of the computed quantities and the errors in the measurements which determine, describe, specify or bound the position of a point. This fact is true even though the computations themselves are performed with perfect accuracy. This phenomenon may be expressed as an error ratio. It is one of the advantages of my methods that this ratio may be kept within reasonable bounds and in some embodiments this ratio may be reduced to extraordinarily low values. The word "ratio" is used here in an extended sense to include the mathematically descriptive matrix of partial derivatives which relates a multiplicity of minute measurement variations to a corresponding multiplicity of minute variations in the determined quantities.

In some embodiments of my invention the geometrical relationships that are applied to the solution for desired quantities are very simple, in other embodiments these relationships are somewhat subtle and sometimes even complicated. Similarly, the mathematical procedures necessary for determination of the unknown quantities based upon the applications of these geometrical principles vary greatly in complexity. In some instances a slide rule or a calibrated nonlinear scale is adequate; in other applications a high speed digital computer is employed to provide solutions in reasonable time. Furthermore, there are embodiments of my invention that incorporate a number of more simple embodiments of this same invention. A general description of these underlying geometrical principles and the mathematical procedures necessary for their exploitation is provided in this section of my application.

Although measurements relative to angles and cosines of angles are the types of measurements described most frequently in this application, it is quite possible to apply the principles of my invention to embodiments involving the measurement of other transcendental functions.

One of the simplest measurements to perform is that of the change of cosine of a changing angle. This measurement provides an equation:

$$M = \cos\theta_2 - \cos\theta_1$$

where $M$ is the reading of the measurement and theta sub one and theta sub two are the angles at the initiation and at the termination of the measurement, respectively. Since there are two unknowns and only one equation, another equation is needed in order to determine the two angles. Another equation can be obtained in a number of ways, two of which are remarkably simple. The first is to perform a similar measurement simultaneously but employing a different axis or orientation. To keep the mathematics simple, one may choose an axis at the same position and at right angles to the first measurement. In this manner the difference of the sines of the two angles is measured and the second equation is made available:

$$M_2 = \sin\theta_2 - \sin\theta_1$$

Solution of these two simultaneous equations for the unknown equation is obvious.

Another method of obtaining the second equation is to measure or establish the difference between the two angles. This relationship may be effected by measuring the difference in angles simultaneously with the measurement of the difference in cosines. The resulting equation is then $$M_2 = \theta_2 - \theta_1$$

Where $M_2$ is the reading of the measurement. The equation may also be derived by rotating the cosine measuring device through a known and fixed angle relative to the base leg or standard direction of the instrument. Making the angular difference $M_2$ equal to ninety degrees simplifies the mathematical procedures.

Similar statements hold for infinitesimal or differential variations, and one may write:

$$M_1 = \cos\theta d\theta \text{ and } M_2 = d\theta$$

The equations can be solved for $\theta$ and $d\theta$.

Using these same types of measurement, directions may be determined in three dimensional space. If the angular motion of the source or receiver relative to the station cannot be measured or controlled (as by rotation of the instrument at the station) the directions may be determined by measuring the changes of the direction cosines relative to three separate noncoplanar axes through the station. The axes need not be orthogonal, but, as before, the mathematics is simplified when the axes are made orthogonal to each other. Two consecutive or overlapping measurements are performed simultaneously relative to all three axes. The geometry associated with two overlapping measurements is shown in FIG. 9. There are shown two rectangular boxes. The lengths of the edges of each box represents the changes in direction cosines corresponding to each set of simultaneous measurements. These edges also have a polarity or sense as indicated by the measurement. The three points A, B and C are unit distance from the origin. A represents the direction of the target at the initiation of both the first and second measurements. B represents the direction of the target source or receiver at the termination of the first measurement, and C represents the direction at the termination of the second measurement. The use of overlapping measurements is a matter of convention, and sequential measurements would provide the identical results. The dimensions of the boxes and their position relative to each other is known by the measurements. The edges of the boxes are of course parallel with the axes of the system as determined by the axes of the three measuring devices. Thus the three points A, B and C are located relative to each other. The translational orientation of the boxes and the points is determined by the three unit radii from the origin to the points A, B and C.

A simple method of solution of the problem is to express the geometrical relationships in terms of cartesian coordinates, solve for the cartesian coordinates of the points A, B and C on the unit sphere, and then convert the data thus acquired into whatever angular dimensions are desired, or employ the direction cosines thus determined directly.

If the direction cosines relative to the points A, B and C of FIG. 9 are respectively $$X_0, Y_0, Z_0 ; X_1, Y_1, Z_1 ; \text{ and } X_2, Y_2, Z_2$$

the following equations may be written: where M, N and P are measured values:

from geometry $$X_0^2 + Y_0^2 + Z_0^2 = 1$$

$$X_1^2 + Y_1^2 + Z_1^2 = 1$$

$$X_2^2 + Y_2^2 + Z_2^2 = 1$$

from measurement $$X_1 - X_0 = M_1$$

$$Y_1 - Y_0 = N_1$$

$$Z_1 - Z_0 = P_1$$

$$X_2 - X_0 = M_2$$

$$Y_2 - Y_0 = N_2$$

$$Z_2 - Z_0 = P_2$$

from which are obtained the equations:

$$2M_1 X_0 + 2N_1 Y_0 + 2P_1 Y_0 + (M_2 + N_{12} + P_{12}) = 0$$

$$2M_2 X_0 + 2N_2 Y_0 + 2P_2 Z_0 + (M_{22} + N_{22} + P_{22}) = 0$$

These latter two linear equations can be solved for $X_0$ and $Y_0$ in terms of $Z_0$. Substitution of these results in the first equation provides the value of $Z_0$ with a sign ambiguity that must be resolved from the mechanics of the particular system involved.

It is of interest to note that the direction determination by this method cannot be accomplished in three dimensions without two contiguous sets of measurements. This point is graphically illustrated, as shown in FIG. 9, by the requirement for three known distances from three separate points to locate a fourth point relative to the three points. Furthermore, no matter how many measurements are performed, measurements relative to three noncoplanar axes are necessary.

Rotation of an aperture array may be substituted for motion of target for the determination of bearings of the target relative to axes of the array. The array can be distributed in one, two, or three space dimensions; and the rotation can be about a single axis or may be of a more complicated nature involving two or three axes of rotation. Examples of the more simple versions of these rotating arrays are described herein to illustrate the principle, and it is not intended to limit my invention to these forms.

The rotation of a planar array comprising two axes of apertures disposed at right angles to each other in a plane about an axis of rotation perpendicular to the plane provides a method of obtaining the direction of a target lying in the plane, or of determining the direction of the target when it does not lie in the plane. Furthermore, it is possible employing my methods to determine the rotation of the array relative to the direction of the target. An array having only a single axis of apertures and rotating about an axis of rotation perpendicular to the axis of apertures can be employed to determine the direction of the target, both when the target is in the plane of rotation and when the target is outside the plane of rotation.

In FIGS. 10 and 10A is shown the unit sphere geometry of a rotating system comprising a pair of orthogonally spaced axes rotating in the horizontal plane about the vertical axis. The horizontal plane shown in FIG. 10 corresponds to the x–y plane of FIG. 9. The axis of rotation corresponds to the z axis in FIG. 9. The Greek letters represent the angles indicated and the letters M and N indicate the measured values of the changes of the direction cosines relative to the two orthogonal axes of apertures of the array.

FIGS. 10 and 10A are orthogonal projections. FIG. 10 is a full view of the plane in which the array is rotated. The array is considered for the purpose of this explanation to be confined to the plane of the rotation. FIG. 10A is a diagonal projection in which the y–z plane is projected as a vertical line. The points marked S in both figures correspond to the starting point, the point where the measurement of the changes of direction cosines is initiated. The points marked T in both figures correspond to the point where the measurement of the changes of direction cosines is terminated. The changes of direction cosines are measured relative to the x axis and the y axis and are designated M and N, respectively. The angles of the actual direction cosines are not shown in the figures in order to reduce confusion of the drawings. The angles marked theta are confined to the x–y plane. The angle theta sub one corresponds to the initiation of the measurements of changes of direction cosines. The angle theta sub two corresponds to the termination of the measurements of direction cosines. The angle phi is the elevation angle, and this angle remains essentially constant during the measurement. The angle phi is the angle between the radius from the array to the target and the x–y plane. The angle psi is the difference between the angles theta sub two and theta sub one and is similarly confined to the x–y plane. In the FIGS. 10 and 10A the initiation of the measurements is indicated to occur in the fourth quadrant of the x–y plane and direction is counterclockwise. Thus, the angle theta sub one has a negative value numerically. In this explanation the x–y plane, the plane of rotation of the array, is assumed to be horizontal as shown in the FIGS. 10 and 10A. It is seen that when the angle psi through which the array is rotated is known, there are enough equations to determine the horizontal angles corresponding to the initiation and termination of the simultaneous measurements of the change of direction cosine M and the change of direction cosine N. It is also seen that the elevation angle which is constant during the simultaneous measurements is also determined and can be computed from the measurements.

If the angle through which the array is rotated is not known, it is still possible to derive useful information relative to the horizontal angles. This information is simply the average of the two horizontal angles. Under these conditions it is not possible to derive the vertical angle phi or either of the horizontal angles corresponding to the initiation or termination of the simultaneous measurements, but it is possible to determine the value of the horizontal bearing lying half way between the bearing corresponding to the initiation of the simultaneous measurements and the termination of the simultaneous measurements. This midway horizontal bearing is of particular usefulness when the measurement corresponds to a very small angle of rotation. There are two benefits derived from the shortness of the measurement in this case. The angle between the known center horizontal bearing and the horizontal bearing corresponding to the termination of the measurement is not so large. The target elevation and azimuth angles have less opportunity to change significantly.

If the target lies in the plane of the array and in the plane of rotation the angle phi is equal to zero, and it is not necessary to measure or otherwise know the angle psi through which the array is rotated. Rather, the angles of measurement initiation and termination may both be determined from the measured values of the changes of direction cosines by solution of the equations shown in FIG. 13.

Employing a single pair of apertures and knowing, by measurement or control, the angles of rotation of their axis corresponding to the series of measurements, the same measurements may be performed as may be performed using an array of more apertures, and the same results are obtained. It is to be emphasized that the angles of rotation must be known relative to the target direction. Such operation is identical geometrically to the method wherein two aperture axes are employed and the two measurements are performed simultaneously through a known angle of rotation. A particularly simple method employs overlapping measurement, each corresponding to a rotation of the two-aperture array of 180°. The two measurements are performed over rotation intervals ninety degrees apart. The full values of the direction cosines of the target bearings relative to the axes corresponding to the initiations and terminations of the measurements are determined simply by dividing the measured values by two.

In practical applications it is sometimes desired to determine the angle of rotation of target about the axis of rotation of the array, or equivalently to determine the rotation of the array about its own axis of rotation relative to the target employing only the measured values of the changes of direction cosine for this purpose. It may also be desired to determine the elevation angle phi simultaneously. These objectives may be achieved, provided the bearing of the target relative to the axis of rotation remains substantially unchanged, by performing a series of measurements during the rotation of the array comprising two axes of apertures. With reference to FIG. 9, if the array lies entirely in the x–y plane and rotation of the array is about the Z axis, the points A, B and C will all have the same z coordinate and lie in a circle in a horizontal plane. This condition is the result of the rotation of the array about the z axis.

With reference to FIG. 9, if the array lies entirely in the x–y plane and the z axis is the axis of rotation of the array, the points A, B and C lie on a circle concentric with the z axis and in a plane parallel with the x–y axis. The determination of the sides of the rectangles defined by the coordinate axes, and the measurements of the changes in the direction cosines as the rotation occurs, establishes the size of the circle and hence the position of the three points on it. Thus, the elevation angle is determined, or equivalently, the constant value of the z axis direction cosine is determined.

If the three points A, B and C in FIG. 9 have the direction cosines, as indicted previously, the direction cosines may be determined through the measurement of the changes in their values as follows:

from geometry $$X_0^2 + Y_0^2 + Z_0^2 = 1$$

$$X_1^2 + Y_1^2 + Z_1^2 = 1$$

$$X_2^2 + Y_2^2 + Z_2^2 = 1$$

from measurement $$X_1 - X_0 = M_1$$

$$X_2 - X_0 = M_2$$

$$Y_1 - Y_0 = N_1$$

$$Y_1 - Y_0 = N_2$$

from rotation $$Z_2 = Z_1 = Z_0$$

We derive the two linear equations $$2M_1 X_0 + 2N_1 Y_0 + M_1^2 + N_1^2 = 0$$

$$2M_2 X_0 + 2N_2 Y_0 + M_2^2 + N_2^2 = 0$$

The direction cosines of the point A relative to the $x$ and $y$ axes are at once determined by the simultaneous solution of these two equations and the remaining direction cosines are determined from the equations above. The fortunate advent of the two linear equations without the necessity of introducing an additional measurement point is to be noted.

Each of these various configurations of cosine change measuring devices applied to angle determination may also be employed using measurements of rate of change of cosine and higher derivatives. In this case measurement is made of the derivative of the cosine or other function with respect to time or with respect to rotation. Apparatus for measuring the derivatives of the cosine are indicated in FIGS. 5 and 6. In a nonrotating arrangement employing cosine measurements relative to a pair of orthogonal axes, the tangent of the angle between the target and one of the axes is the ratio of the two derivatives. In extending this configuration to three axis operation with the addition of a third axis, it is necessary to measure the second derivatives of the direction cosines as well as the first derivatives just as it was necessary to measure two contiguous increments of the cosine in order to define a direction employing incremental measurements.

The appropriate differential equations relative to this mode of operation are $$X^2 + Y^2 + Z^2 = 1$$

$$XdX + YdY + ZdZ = 0$$

$$Xd^2X + Yd^2Y + Zd^2Z = 0$$

Where $X$, $Y$ and $Z$ are the direction cosines that it is desired to determine and the differential quantities are all known as a result of the measurement. There are thus three equations in three unknowns. The equations are not homogeneous and are independent and can be solved simultaneously. The second derivatives may be obtained by including a differentiator at the output of the apparatus shown in either FIG. 5 or FIG. 6. The second derivative may also be approximated by use of either of these equipments to perform two measurements of rate of change over a very small interval, taking the difference of the two measurements and dividing by the interval. The first and second derivatives may also be approximated in a very practical sense by use of the apparatus shown in FIG. 7. A first and a contiguous second measurement are taken over equally very small intervals. Either of these readings may be employed to represent the first derivative. The difference between the two may be employed for the second derivative.

The first and second readings may also be employed in separate equations. This is a simpler approach. The resulting set of simultaneous equations is then:

$$X^2 + Y^2 + Z^2 = 1$$

$$X \Delta X_1 + Y \Delta Y_1 + Z \Delta Z_1 = 0$$

$$X \Delta X_2 + Y \Delta Y_2 + Z \Delta Z_2 = 0$$

Where $\Delta X_1$, $\Delta Y_1$, $\Delta Z_1$, $\Delta X_2$, $\Delta Y_2$, $\Delta Z_2$ are the measured small increments in the values of the direction cosines.

A further insight into the differential operation of the three axis system may be obtained by referring to FIG. 9. If the two measurements are taken over ever smaller intervals, the incremental values of cosine similarly become ever smaller. The edges of the boxes also become ever smaller. The three points A, B and C remain on the surface of the sphere and define a plane. As the increments become smaller, the three points converge on a single point and the radials from the origin become nearly parallel. At this condition the perpendicular to the plane of the three points is the desired direction. Equations derives from this approach are the same as those shown immediately above.

In rotating systems the derivatives are taken with respect to the angular rotation. The extension of apparatus and mathematics to cover this mode of operation is ordinary.

Having the capability of determining the direction of an object one can locate the position on a reference frame of the object by determining its direction from two points on the same reference frame. If only one directional dimension, an angle or a direction cosine, is available at each station, the position of the object can be determined relative to three stations. If two dimensions of direction are available at one station and only one dimension of direction are determined at another station, the position of the object is determined. The systems discussed so far in this section may be combined into larger systems for determining position, and the synthesis of such larger systems is a matter of routine.

In addition to these obvious system arrangements there are other embodiments of my invention in which the data derivable relative to any individual station has little or no usable characteristic or dimension in itself. However, in combination with the data derived relative to other stations such data can be used to derive position coordinates. These embodiments of my invention do not require the use of rotating instrumentation.

The general method is simple. Enough measurements of the right kind are performed relative to the motion or position of the object or objects that no other position or motion of the object could result in the same set of measurements; and the desired data is computed using the resultant readings of these measurements. The art lies in the selection of a usable and convenient set of measurements and in the synthesis of usable and convenient methods of processing the data. These two functions of measurement and computation are interrelated in the manner in which their characteristics affect the character and efficacy of the overall system to which they are applied.

In synthesizing a nonredundant system, the number of measurements that are performed equals the number of unknowns that it is desired to determine. In general, there is one equation derived from each measurement; and there results an equal number of equations and unknowns. This simple rule appears obvious. However, the questions of the independence of the measurements and the equations and even the unknowns provides considerable of interest to the mathematician. The rules for independence in formal mathematics are sufficiently complicated that no general method is offered. Rather, it appears necessary to examine each new application of my invention by whatever techniques are available, algebraic, graphic, computational, mechanical. Some of these techniques are of a trial and error nature. One can obtain solutions using given data repeatedly and if only one solution is obtained for given data, then one has a workable system.

In some embodiments of my invention the relationships between measured data and the desired unknown data are not even intuitively obvious. Even more obscure sometimes are the mathematical relationships and the methods of solution. In some instances mechanical analogs can provide solutions, whereas, the achievable algebraic solutions are weird and possessed of extraneous roots. The introduction of obtain high speed given computer with trial and correction techniques has is the most powerful of the tools brought to bear in these applications. With it one can determine not only sufficiency of a given set of measurements but also the accuracy of the system. Furthermore, such digital methods can be used directly in the computational process of operation of the system, and even for simulating a test operation of the system.

In many of the embodiments of my invention presented in this application, the primary measurements are either measurement of angular difference or angular rate or measurements of the difference or change of cosines. In event that angular type measurements are performed, the Cosine Law is readily applicable in forming a set of simultaneous equations. The law may be written in terms of the cartesian coordinates of the system. This equation is nonlinear and often must be solved by trial and correction methods. The equation appropriate for use when measurements of cosine differences and changes is simply the expression of the difference of the two cosines expressed in cartesian coordinates of the system. Again the equations are nonlinear and the trial and correction procedure is recommended.

These various station arrangements may be employed using measurements of the rates of change of angles or functions of angles. The rates of change may be measured with respect to time or with respect to some other quantity. The measurement of very small increments of differences of angle or functions of angle may be employed. The mathematics of this mode of operation is somewhat more complicated than the mathematics associated with the measurement of displacements or differences of appreciable magnitude. The reason for this additional complexity is that the differential of a variable has qualities or characteristics that distinguish it from the variable itself. The equations written for finite increments or differences will contain variables of a certain sort. The equations written for measurements of differential quantities or infinitesimal quantities not only involve these quantities but also the types of variables employed in the equations written for finite increments and differences. More types of variables tend to appear in the differential equations than with equations expressing finite differences. This additional complexity of the differential equations relative to equations of finite differences is compounded when the trial and correction procedures are used for solution of the set of differential equations. In these processes the differentials or derivatives then become ordinary variables in the equation set. The partial derivatives of these variables are obtained in the same manner as they would be for systems employing measurement of finite differences. While these mathematical exercises are not included in this application, the prospective user of my invention is encouraged toward their performance as the results are definitive and practical.

Samples of the types of differential measurements performed are: The use of a camera at each of several stations to simultaneously photograph a closely spaced group of objects or points from a plurality of widely spaced positions. If the group were composed of three objects each station photographing the group can measure the three angles subtended by pairs of the group at the camera station. Three such stations provide a total of nine measurements, and nine differential equations result. Simultaneous solution of these equations provides the coordinates of the group and the spacing of the objects within the group. Of course, the photographic method is also usable for measuring the distances between more widely spaced objects in conjunction with the equations of finite differences. The apparatuses indicated in FIGS. 5 and 6 are suitable for this differential type of operation in a distributed system. In general, it may be said that any of the systems that operates with a single simultaneous system measurement for a position determination is capable of being adapted to the use of differential or infinitesimal measurements. This relationship does not extend conveniently to the systems of multiple contiguous, consecutive or overlapping measurement of finite distances relative to each station. In systems employing a single system measurement of finite differences the limit approached by the system as the measured differences become ever smaller is the differential type of system. However, in the multiple system reading mode of operation, higher order derivatives are approximated as the measurements become ever smaller. Care must be exercised in setting functions of these small measurements equal to the various higher order derivatives. The higher order derivatives do provide additional equations, however, that are valid in position determination; and practical systems for position determination result when the measurements may be performed with sufficient accuracy.

The simultaneous photography of three points on an airplane by each of three separate stations provides the necessary data not only for the position of the aircraft, but also the position of the three points relative to each other. The pointing data of the cameras is not required. All that is required is the picture, the focal length of the lens, and the coordinates of the station. Using my method nine elements of data are collected from the three films. Nine equations are written and solved simultaneously for the required data. If the configuration of the observed points on the aircraft is known in shape, or in both size and shape, additional information is available that may be introduced redundantly for improvement of accuracy.

A separate mode of differential operation exists in which the coordinates of a moving group of targets are continuously known and it is desired to determine the relative position of each of the members of the group relative to each of the other members of the group. The position of the group may be known as the result of embodiments of my invention described in this application, or it may be known through other means or methods. It is, of course, obvious that if the angles between two members of the group are measured simultaneously and instantaneously at each of two separately located stations whose positions are known, then the relative position of the two targets is defined. There are other geometrical conditions that are not so obvious which similarly define the relative positions of the members of the group by a plurality of measurements of the changes of the small angles between the individual targets or changes in the differences of the cosines of the angles between each of the members of the moving group and a reference direction. This embodiment of my invention would be particularly useful under circumstances in which it is not possible to measure directly the small angles subtended at the measuring station by pairs of members of the moving group of targets. Measurements of changes of function of angles other than the cosines and differences thereof may be employed as well.

In one embodiment of my invention the distances between the number of objects composing a group of moving objects is determined by observing the motion of the objects relative to each other. In this embodiment the objects remain in a small cluster, and the cluster of objects is removed from the observing stations by distances that are many times the largest dimension of the cluster. The distance from the cluster to each of the observing stations is sufficiently great that all of the objects of the cluster may be assumed to be at the same range from the station for the purposes of certain of the computations. At the cluster the lines joining the several objects to each of the observing stations may be assumed to be parallel; and, for the purpose of computing the distances between these lines at the cluster, the distances between the several objects and the observing station may be assumed to be equal. After an initial determination of position by the complete system the solution may be refined by using the initial values of relative position to determine separate values of the individual distances from each of the several targets to each of the observing stations.

In this embodiment of my invention the cluster or group of objects need not be in motion, but it is necessary for there to be relative motion between the individual objects comprising the cluster. The fundamental measurement may consist of measurements of the changes of the angles subtended by the several objects as viewed by the observing station. The fundamental measurement may also consist of measurement of changes of the differences of the cosines or other functions of the angles between the lines joining the objects to the observing stations and a reference direction. Furthermore, the reference direction need not necessarily be constant. The reference direction may be turned or adjusted in some modification to follow the movement of the target cluster. For the purposes of the following explanation, the measurement taken for example is that of the change of the subtended angle between each pair of targets of the target cluster as viewed at the measuring station.

Though there are several procedures for determining the relative positions of the objects of the cluster only one of these will be cited as an example. In this example the change in the distances at the cluster between the lines joining the several objects to the measuring station is computed for each station by multiplying the known distance from the station to the cluster by each of the measured changes of angle subtended by each target pair using all combinations of targets in forming the pairs. The next step of the computation is to determine the distances at the cluster between these radials, or equivalently the angles between them at the observing station. For the purposes of this step of the calculations all of the target objects may be assumed to lie in a plane perpendicular to the line joining the target cluster to the observing station. This line may or may not possess the same direction during the primary measurement but its direction is of course known. Furthermore, the length of this line may or may not remain constant during the primary measurement but it is known. The changes of angles may be measured once or two or more times in succession. The relative positions of the objects on the plane described correspond to the epoch of the initiation of the change measurement sequence and to the epochs of each of the readings thereafter. Thus the distances at the cluster of the lines joining the objects to the observing station are determined for two or more epochs simultaneously by a single procedure of measurement and calculation.

Having determined the distances at the cluster between the essentially parallel lines from the objects of the cluster to the observing station at each epoch relative to two observing stations simultaneously the solution from the derived data for the relative positions of the objects within the cluster can be computed separately for each of the epochs for which the data has been derived relative to the two stations and is simple. The determination of the distances between the parallel lines, or equivalently the positions of the targets on the planes perpendicular to the observing stations, is not so obvious and is therefore described below in some detail.

For the purposes of this explanation it may be assumed that there are a multiplicity of points moving about in a plane. This is the plane described above as being perpendicular to the line between the cluster and the observing station. However, for this part of the explanation one need not concern oneself about the station or lines outside the plane. Through the processes of measurement and calculation the changes of the distances between the several points has been determined for two or more epochs. The number of unknowns corresponding to each epoch is twice the number of points less three. The reduction in the number of unknowns by three results from the fact that one of the points may be regarded as being the origin and one of the points may be regarded as determining one of the coordinate axes. Cartesian coordinates may be used conveniently, in which case one of the coordinates of the second reference point may be assumed to be zero. The number of equations available for the determination of these unknowns is determined by the number of changes of distances between points made known by the previous procedures. There is a variety of possible combinations of numbers of points and numbers of measurements that may be employed. In general, the number of points required for a solution is reduced as the number of consecutive system measurements is increased. In the event that a given number of system readings produces more equations than are required for defining the positions of the several points at each of the several epochs one or more of the measurements and the associated equations may be dropped from the solution.

A separation equation is derived for each determination of change of distance between a pair of points. This equation is simply the difference between the distance between the two points before and after the change set equal to the magnitude of the change as previously determined. The general equation is as follows $$\sqrt{(X_{ik}-Y_{jk})^2+(Y_{ik}-Y_{jk})^2} - \sqrt{(X_{io}-X_{jo})^2+(Y_{io}-Y_{jo})^2} = M_{ijk}$$

Where:
  $M_{ijk}$ is the value of the change in distance as determined by the measurements and calculation,
  $X_{io}$, $Y_{io}$, $X_{jo}$, $Y_{jo}$ are the coordinates of the $i$the and the $i$the objects at the epoch at which the measurement procedure was initiated.
  $X_{ik}$, $Y_{ik}$, $X_{jk}$, $Y_{jk}$ are the coordinates of the ith and jth objects at the epoch at which the $k$th measurement was terminated.

It is noted that an overlapping measurement procedure is indicated. That is, all measurements are initiated at the same time. This is strictly a matter of convention and contiguous measurements could as easily be employed.

The angular orientation of the cartesian coordinate system on the plane is not defined in this part of the procedure. Only the positions of the various objects relative to each other is defined. It remains for that part of the procedure involving the second station to determine the angular orientation of the coordinate system of the plane relative to each of the stations. At the conclusion of this first part of the procedure the information having been derived is the approximation described by a beam of parallel rays or lines from each station passing through the target cluster. Each ray passes through one of the objects of the target cluster. Two lines, one from each station, pass through each object. The rotational orientation of each beam about its own axis has not yet been determined. This rotational orientation of each of the intersecting beams about its own axis is physically defined by the geometrical requirement of the intersection of the separate pairs of rays described. Once the rotational orientation of the two beams about their respective axes is determined, the resolution of the spacing of the objects in three dimensions within the target cluster is simple.

The rotational orientation of the two beams of lines intersecting in the target cluster is accomplished by a correlation procedure. This is a mathematical procedure in which one of the beams is held in successive fixed positions and the other beam is rotated about its axis until there is a coincidence between each line from the first beam and a separate line of the second beam. In order to achieve coincidence, it is generally necessary to displace one of the beams in translation along both axes in the process of the correlation scanning. This scanning process is not as difficult as it may first appear and only a number of positions need be examined. For the purposes of the correlation operation a true set of coordinates may be established by considering the two beams to be enclosed within a geometrical prism whose parallel ends are parallel to the axes of both of the beams. One of the cartesian axes, say the y axis, is chosen to be perpendicular to the two parallel ends of the prism. When proper orientation of the two beams is achieved, the top and bottom parallel ends of the prism will each contain one of the points of the target cluster and each will also contain a pair of lines, one corresponding to each station intersecting in the point of the cluster contained by the beam. The prism has a varying length along the y axis between the parallel ends as the two beams are rotated on their respective axes. One might be inclined to call the distance between the parallel surfaces the "thickness" of the prism; however, "length" appears to be the correct designation for this dimension. The centroid of each beam of rays would generally not lie on the center line between the two surfaces and would rise and fall as the beam is rotated if one of the surfaces were to remain fixed. The centroid of the beam here is defined as that point in the plane perpendicular to the beam that is so located that the sum of the distances to the intersections of the various rays of the beam with the plane is a minimum. When the beams are properly oriented, the rays of the centroid of the two beams must intersect and the upper and lower planes of their bounding prisms must coincide. To avoid the necessity of scanning in translation the beams may be rotated about their respective centroids. To avoid scanning in two dimensions, the 2° of freedom provided by the rotation of two beams, one of the beams may be rotated independently while the other is made to rotate in such a manner that either the upper or the lower pairs of prism planes are coincident. Rotation of the independent beam then continues until the opposite pair of prism planes are coincident. At this point generally the coincidence of the rays of the two beams is complete. Should by unusual chance the coincidence not be complete the rotation can be continued to find the true point of complete coincidence.

Alternatively, one of the beams may be rotated independently about any parallel axis within it and the other beam so rotated that both its upper and its lower prism planes coincide with those of the independently rotated beam. Rotation may be continued until coincidence is achieved.

When the targets of the group may be separately identified by both stations, each station being separately able to identify any target selected by the other station, orientation of the beams is greatly simplified.

When changes in the differences of the direction cosines are measured relative to a group or cluster of targets the problems of rotational orientation do not appear as the orientation is established in the process of the primary measurements. In one embodiment of my invention, the cluster of targets is tracked by a device which maintains four separate apertures in a plane perpendicular to the line between the tracking station and the cluster of targets. The apertures are disposed at the corners of a square in the plane whose center is on the line to the targets. The apertures in diagonally opposite corners operate in conjunction with each other so that there are two sets of measuring circuits each associated with a pair of apertures. In this system the orientation of the apertures in the system coordinate frame must be known. It is convenient for one pair of the apertures to lie in the plane of the vertical axis of the mount. The other pair of axes will then always be horizontal. This type of arrangement is conventional for holding and directing the apertures of tracking systems. In the arrangement described here the signals from the apertures need not be employed to direct or point the amount as their main purpose is separate and distinct from that function.

The circuit arrangement relative to two of the apertures is shown in part in FIG. 8. However, instead of the phase difference being indicated at the output of the subtractor 807, shown as M, the output of the subtractor 807 is fed into a counter which records the change in the difference between phases of the phase responsive devices 805 and 806. Alternatively, two counters may be employed, one at the output of phase measuring device 805 and one at the output of phase measuring device 806, the difference in the readings of the two counters being recorded.

As in the angle change measuring system just described, two stations are employed; there must be relative motion of the targets as viewed from each of the stations, the target cluster may or may not be in motion, and the largest dimension of the target cluster is negligible compared to the distance from the cluster to either of the stations. Also as before, the orientations and positions of the stations are known. It is not necessary to assume that the mounts holding the apertures always point exactly at one point of the target cluster. Motion of the pointing of the amounts about the target cluster does not appreciably affect the operation of the system.

When several points are located on the same frame and the change of angle of a point moving relative to the frame is measured simultaneously relative to each of the points on the frame, the resultant data has considerable significance in locating the moving object relative to the frame. Such data may be employed not only to determine the angular disposition of the moving object relative to the points on the frame, but may be employed also to determine the angular disposition of the points on the frame relative to each other. Similarly, it can be shown that if the angles between a number of points can be measured simultaneously at each of a number of points, whose positions are otherwise unknown, it is possible to determine the relative angular disposition of all of the points. Geometrically, the two situations are identical. In the first instance, the changes of angle are measured sequentially and relative to the frame of the points at which the measurements are made. In the second instance, at least three points are involved in each measurement, the point at which the measurement is made and the points between which the angle is measured.

When the positions of the observation stations are known, the mathematical processes for the determination of the coordinates of unknown points observed by the stations is somewhat simpler than the mathematical processes that must be employed when positions of the observation stations are unknown. This situation is a direct consequence of the fact that a greater number of unknowns appears in the set of simultaneous equations that must be solved when the positions of any of the stations is unknown. The unknown coordinates of the stations form only a part of the total increase in the number of unknowns, as it is generally necessary to increase the number of stations taking measurements or to increase the number of measurements taken by each station. In either case, there is usually an increase in the number of equations that must be solved simultaneously. The increase in the number of equations does not require a change of the general technique but does require more work. In order to maintain the mathematical process as simple as possible during critical operational periods, the positions of the stations may be determined in advance with the more extensive set of measurements and the larger set of simultaneous equations. Subsequently, in determining only the positions of the unknown points, the shorter procedure may be employed using the station coordinates already determined in the previous procedure. In some instances, only a portion of the total number of coordinates of the system may be unknown. In each case, the number of equations employed in the procedure would depend upon the number of unknowns and the number of measurements performed.

Hybrid Systems

It is possible to reduce the number of stations used in the method of my invention by combining measurements of distance distance variation, or difference of distance with measurement of angle or functions of angle or variations thereof. The word "distance" here is used to include the case of linear combinations of ranges. If each station not only measures an angular change or difference in addition to measuring, say, the doppler effect, one has both the equations resultant from the angular measurement and the equations resultant from the doppler measurement to obtain cartesian coordinates. It should be pointed out that the workable system is designed so that the total number of angle type and distance type measurements defines the positions of each of the several A points. A points designate objects of unknown position or points of unknown position along the path of a moving object, or along the path of each of several moving objects. The distance type measurement can be performed in a variety of ways and doppler methods are only one way such measurements may be made; radar ranging is another.

In my copending patent application, Ser. No. 278,191, it was shown how by employing some knowledge of the physical or mechanical constraints necessarily imposed on a moving body it is possible to reduce the number of stations of a polystation doppler system or other such system. This same concept extends to my invention herein described. One may employ motion equations relating significant points along the path of a moving vehicle together with the angle type measurements to bound or determine the coordinates of one or more of these points. Similarly, motion equations expressed as time derivatives of the coordinate displacement may be employed. These extra equations make it possible to reduce the number of equations that must be obtained from angle type measurements. Reference to my application, Ser. No. 278,191 will provide a discussion of the motion relationships and the equations that may be derived therefrom. Use of these relationships may also be made in hybrid systems.

Coastal Observation of Ships

Under certain conditions it is not always possible for a coastal station observing the movement of ships at sea to orient itself with sufficient accuracy relative to other stations of the system. The stations of the system may have an accurate knowledge of their positions on the map but may not know their accurate compass orientation. Such a situation is the more likely when the stations are set up under battle conditions in which a landing party must set up a system for accurately determining the positions of ships off shore. My invention makes it possible to determine the positions of ships from angular readings taken from four shore stations without the necessity of the stations being in sight of each other or otherwise knowing their compass orientations relative to each other. There are two methods. The first method is that in which the changes of the bearing of a moving ship is observed relative to each of the four stations. The second method is that in which the angle between two ships is measured at each of the four stations. A typical geographical situation is shown in F. 11 indicating the geometrical relationship between the four stations on the shore and the two points at sea whose positions are otherwise completely unknown. The two points at sea may be the two positions of the same ship, or i may be two separate ships. A simple angle measuring device, for instance a surveyor's transit, is employed for either type of measurement. The transit is set up and leveled in the usual manner at a known place on the map. The required measurement at each station may be taken by locking the scale in place, taking two readings, one for each of the points at sea, and subtracting the difference. Alternatively, a single reading method is achieved by setting the scale of the transit at zero, slewing the transit to bear on one point, locking the scale at that point, slewing the transit to the other point and then reading the scale. Either method of making the measurement may be employed for performing the measurement on either the case of one ship, whose motion be observed, or on two ships, either or both of which may be stationary.

THE mathematical process is that of solving simultaneously the four equations derived from the cosine law applied to each of the measured angles. A typical equation is shown in FIG. 11 for one of the stations. An analog device which simulates mechanically the geographical geometry of the system is used to determine the unknown positions from the measured data. Such an analog device is shown in FIG. 12. The stations are represented by station pivots 121 which are located on a map at the points corresponding to the geographical locations of the stations. The measured angle at each station is represented by the angle between two arms 122 and 123 that pivot at the station pivot. The angle between the arms is adjustable to correspond with the angle measured at each station. Other than when being adjusted, the angle between the arms is normally fixed. The two arms pivot together about the station point. Each arm is slidable in a slide 124 which represents one of the points at sea. There are two sliders 124, one for each of the sea points. Each slider 124 is equipped with a pin 125 which represents the exact target position. The pin 125 is held perpendicular to the plane of the map and runs through one slider 124 of one arm of each station. The other pin 125 runs through the slider 124 of the other arms. In operation it is merely necessary to adjust the angle of each pair of arms to the value of the measurement at the corresponding station and observe the positions of the two points corresponding to the pins 125. In general, there is only one pair of positions of the points for each set of measurements. As one adjusts one or more of the arms, the points move by sliding along the arms. The readings of the angles between the points are taken from the protractor dials 126 located one at each station. These angles between the arms always correspond to the positions of the points. Each Protractor dial 126 is provided with a brake 127 which aids in setting the angle and locking the dial after adjustment.

Construction and use of the analog device is recommended to any who would like to achieve a comprehension of the principles of my invention by other than mathematical analysis or as an impirical augmentation of the mathematical analysis.

Angle Trackers

A modification of my invention employs measurements of change of angle in three dimensional space performed simultaneously at separate sites to determine the position of a moving target in three dimensional space. Another modification provides for measurement of the rate of change of angle at separate sites to determine the position of a moving target. This modification is designed for operation with a tracking telescope using light waves or a tracking radio antenna using radio waves, or a directional microphone employing sonic waves. Actually, any sensing device that is capable of indicating when the tracking device is pointed at the object being tracked is suitable if it will indicate the sense and magnitude of small deviations of the device from the axis of the tracking device. Tracking error is employed to actuate a servo system which drives the mechanism holding the tracking device is such a manner as to adjust the direction of the axis of point to reduce the error. Such systems are common in the radar and missile tracking art. For the purposes of my invention an appropriate sensor, servo, and carriage or supporting structure may be selected from the wide variety of mechanisms on the market. Most of the marketed devices of this type also are provided with scale or readout mechanisms for indicating the angular attitude of the axis of the sensing element relative to the earth fixed base. These ordinary scales or readout devices continuously indicate the pointing direction relative to one or more axes. One or more of these axes may be variable. The common radar antenna employs a vertical fixed axis and a horizontal axis passing through the vertical axis confined to a horizontal plane in which it rotates about the vertical axis. Generally, these devices provide a readout of angle relative to the axes. Through computation this data may be employed to derive the change in angle or angular differences employed in the method of my invention.

In one modification of my invention gyroscopic means are mounted on the directional sensor. This means comprises a simple gyroscope whose axis is parallel to the direction of pointing of the directional self tracking sensor. As the sensor turns itself, the gyro exerts a force on its mount proportional to the rate of turning of the sensor. This force is easily measured by displacement or strain sensing elements. The amount of displacement of the axis of the gyro relative to the frame of the sensor is so small as to be negligible as far as influencing the gyroscopic forces. This condition is obtained by employing sufficiently high amplification of the detected angle rate signals. The detected angle rate signals can be transmitted to the stationary parts of the station through slip rings in the mount holding the self tracking sensor or they may be communicated by radio or other means. The advantage of using the gyroscope is that the mechanical relationship between the position rate measuring device and the sensor frame is more rigidly fixed and more easily adjusted.

In another modification of my invention, the indicated angular rate of the sensor is integrated and readout at each reading point or significant epoch of the system operation.

In another modification of my invention a gyroscopically stabilized "platform" is mounted on the frame of the self tracking wave sensor. The gyroscopes and associated servo mechanism hold the "platform" fixed relative to three orthogonal axes through the station point. The displacement of the sensor relative to these axis is detected and readout by means of disc encoders mounted so as to indicate the motion between the stabilized "platform" and the frame of the self tracking wave sensor.

In another embodiment of my invention employing a stabilized "platform" mounted on the frame of the self tracking sensor the platform provides only a single axis relative to which the change in the pointing direction of the self tracking sensor is detected. At the start of a given measurement of angular displacement the "platform" is set so that this reference axis lies along the direction of pointing of the self tracking sensor. As the point direction of the self tracking sensor changes from this direction, the axis of the platform is maintained in the direction set at the outset of the measurement. The angle sensing device mounted between the stabilized platform axis and the sensor pointing axis continuously indicates the net angular change from the initial pointing direction of the sensor.

Angle trackers may be employed in systems for position determination in either two or three dimensions. FIG. 11 indicates the geometrical relationships of a two dimensional system. In this system there are four stations and the system operates in two dimensions. Only a single measurement is performed by each station, and all of the measurements are performed simultaneously. In this instance the positions of the stations are known. The angle tracker determines the angular change as a ship moves from a first position $X_0 Y_0$ to a second position $X_1 Y_1$. The angular variation of the stations are designated $\theta_1$, $\theta_2$, $\theta_3$ and $\theta_4$ respectively. These four readings completely determine the position of both points, the point at the start of the measurement, and the point at the termination of the measurement. Should it be desired to transform to an orthogonal system of coordinates, one may write the cosine law relative to the three angles in terms of XY coordinates. Solving the resulting four equations simultaneously gives the positions in these coordinates.

The number of stations may be reduced to three by performing two measurements in succession so that there are three significant positions of the ship. These positions may be called A points. The measurements of the angles between these points at each of the stations are measured by the angle tracker as the ship moves from one significant point to the other. A significant point or epoch is that point or epoch where a measurement of angular or other displacement is either started or terminated. If two measurements are performed by each station, six corresponding equations may be derived therefrom through use of the cosine law. This equation set relates the nonorthogonal coordinates of the three positions to the orthogonal cartesian coordinates of the three points.

Another modification of my invention employs only two stations, and each station performs only a single measurement of angular variation. However, each station simultaneously performs a doppler measurement to determine the change in range as the vessel moves from the point marked A, to the point marked $A_2$. Thus four measurements completely determine the two significant positions of the vessel. If it is desired to obtain the positions of the two significant points in terms of cartesian coordinates, the transformation equations are the two expressions of the cosine law and two expressions of the change of range, all four of which are expressed in terms of the cartesian coordinates.

Three dimensional systems are other modifications of my invention and are the same in principle, both as purely angle systems and as hybrid systems combining use of both angle measurement and distance change measurement.

Determination of Station Position

In utilizing my method to determine the relative angular relationships of stations whose positions are unknown it is necessary to establish points in the sky visible from several of the stations simultaneously. The positions of these points need not be known to any usable accuracy. One method of establishing a point in the sky is to photograph the explosion of a shell projected to a sufficient height above the station complex. Several such shells launched within reasonable time of each other serve to establish the points in the sky. At each of the stations a camera is set up and left in a fixed position relative to a platform substantially set in the earth's surface. The camera has a lens geometry permitting the photography of several of the shell flashes without the necessity of reorienting the camera between each flash. The images of all of the photographed flashes are recorded on the same film. In my method the cameras need not be oriented precisely with respect to the platforms on which they are mounted, nor with respect to any other reference element of the earth frame of reference. The cameras need only be operated to open and close the shutters for each burst in the event that the bursts are separated by such long time intervals that stray light from other sources than the burst might fog the film. No adjustment of the orientation of the camera is necessary.

By well known techniques and means, the photographic plate exposed at each station containing the images of a number of sky flashes may be examined to determine the angles between the bursts as seen by that station.

The mathematical procedure of determining the angular relationships between the stations is simply the simultaneous solution of a number of simultaneous equations. The procedure may be adjusted to yield also the angular relationships between the points of the flashes and between the flashes and the ground stations. Implicitly the entire geometrical relationship, except for the size of the total configuration, including both station points and sky points is determined. The size of the total geometry may be made known by knowing or measuring the distance between any two of the points forming the geometrical configuration. Conveniently one may employ the Cosine Law written about the measured angle with the opposite side being a line between two flash points and the ranges from the camera to the two flash points being the arms of the angle.

In order to determine all of the angles of the configuration it is only necessary to solve simultaneously an appropriate set of independent equations. The only known quantities in these equations are the measured angles. All the other elements of the equation are unknowns. It is further noted that both the geometry and the equations indicate that it is not possible to determine the size of the configuration, but that the angles and the ratios of the linear distances may be determined. A convenient method of establishing the equation set is to divide all of the equations through by the square of the distance between two of the sky points. All of the distance elements will then be expressed as ratios relative to the one length, which length can be taken as unity. The equations may then be organized into a set of independent simultaneous equations of the ratios of the distances of the configuration with respect to the single selected distance. More equations than needed can often be written relative to give configuration. It is necessary to employ only relationships and measurements that lead to a set of independent equations. However, if one wishes to improve the practical accuracy of the technique through "least squares" procedures, he may employ the redundant readings accordingly.

The well known techniques of Newton and Raphson are adequate for the solution of the equation set. It should also be remembered that the positions of the sky points relative to each other and the station complex are determined in this method. Explicit solution for these items is merely a matter of adjustment of the computation procedure. Thus the method may be employed for determining the track of a missile simply by causing a light to flash at intervals on board the moving missile in such a manner that it may be photographed simultaneously at the separate stations, the data from the photographic plates being employed to determine not only the positions of the stations relative to each other, but also the positions of the missile at the various flash points relative to the stations.

Any method capable of measuring the angle between the separate sky points may be employed in my method and it is inconsequential whether or not the measurements are made simultaneously or sequentially or even whether the several sky points exist simultaneously or sequentially. My method would find use in surveying, where it would make possible the determination of the relative angles between three points, at each of which it would be possible to set up an angle measuring device, by measuring at each station the angles between four points whose positions are unknown but which can be seen by each of the three instrument stations. As before, the angles between all seven points can be determined.

Pairs of Apertures used for Direction Finding and for Beaconing

FIG. 13 indicates a direction finding equipment embracing four antennas disposed in a plane and located on the vertices of a square. This system is designed to operate with emitters that lie in the plane of the array of antennas. The antennas may be arranged in other planar configurations as well, and the axes of the pairs of antennas need not be perpendicular to each other. The arrangement shown is convenient mechanically, and when the sides of the square are parallel with the axes of the coordinate system the explanation of the system is simplified. The antennas of antenna pair 131 are separated by many wavelengths of the propagated signal being received by the system. The signals from the antennas of each antenna pair 131 are combined in mixer 132. The output of the mixer 132 is fed into counter 133 associated with that particular antenna pair 131.

As the target emitter moves from one angular position to another, the phase between the antennas of a single antenna pair 131 changes. The output of the mixer 132 connected to each antenna pair 131 is the beat of phase difference signal between the signals received by the two antennas. The number of beats or periods of the output of the mixer occuring in a given interval of time indicates the number of cycles by which the phase angle between the signals from the two antennas has shifted during that interval. The duration of the time interval is determined by turning the counters 133 on and then off. The magnitude of the measurement made by the counter 133 corresponding to an antenna pair 131 lying along one of the coordinate axes is divided by the number of wavelengths by which the antennas are separated to obtain the amount of change of the cosine of the angle between the direction of propagation of the received wave and said axis. In similar manner the other counter 133 indicates the change in the sine of the same angle. If the distance of separation between the two antennas of each antenna pair 131 is the same as the distance between the antennas of the other antenna pair 131 it is unnecessary to divide the two counter readings by this distance in order to find direction as will be shown.

The apparatus whose block diagram is shown in FIG. 13 does not comprise a method of indicating the sense of the change of the sine and the sense of the change of the cosine. The necessary circuits for indicating such direction of change is shown in FIG. 14 using reversible counters.

Another variation of my method is obtained by employing superheterodyne amplification of the signal from each antenna before the signals are combined at the output of the intermediate frequency amplifiers in a synchronous detector whose output is fed to the counter. For this purpose the first detectors are fed mixing signals from a common source so as to assure identical mixing frequencies being fed to the mixers associated with each antenna of the antenna pair 131. This method would not provide sense information in the determination of the sine and cosine.

Another variation of my invention is obtained by arranging the antennas of the antenna pair 131 so that they are separated by a distance of the order of magnitude of the wavelength of the received waves. The actual separation may be greater or less than actual wavelength but need not be very much greater or very much less. Furthermore, this embodiment of my invention is capable of operating with antenna spacings that equal or are very much greater or very much less than the received wavelength. This embodiment of my invention indicates the sense of the measurement. It is also capable of indicating incremental change or the time rate of change of the cosine of the angle between the incident wave front and the axis of the antenna pair.

A block diagram of this embodiment of my invention is shown in FIG. 13A. It is seen that there are two amplification channels associated with one of the antennas. The use of the two channels provides a means of attaining a quadrature relationship between the signals for the purpose of preserving sense in the indicated measurement output. The antennas 13A1 and 13A2 form an antenna pair such as antenna pair 131 in FIG. 13. The antenna 13A1 feeds a signal to first detector 13A3, and antenna 13A2 feeds a signal to both first detectors 13A4 and 13A5. A mixing signal is fed from local oscillator 13A6 directly into first detector 13A3. The same mixing signal is fed into phase shifters 13A7 and 13A8. Phase shifter 13A7 shifts the phase of the mixing signal 45° ahead, and phase shifter 13A8 shifts the phase of the mixing signal forty-five degrees behind the mixing signal fed to first detector 13A3. The output signal from phase shifter 13A7 is fed to first detector 13A4 and the output of phase shifter 13A8 is fed to first detector 13A5. The outputs of the first detectors 13A3, 13A4, and 13A5 are amplified in intermediate frequency amplifiers 13A9, 13A10, and 13A11, respectively. The outputs of the amplifiers 13A9 and 13A10 are fed to synchronous detector 13A12. The outputs of amplifiers 13A9 and 13A11 are fed to synchronous detector 13A13. Since phase is preserved in the mixing process the output signals of the two synchronous detectors 13A12 and 13A13 are 90° out of phase. The sense of the lead or lag of the phase between the output of the synchronous detectors 13A12 and 13A13 is determined by the phase difference between the signals from the two antennas 13A1 and 13A2. The output signals of the synchronous detectors 13A12 and 13A13 are fed respectively to the quadrature stator coils of a two-phase synchronous motor 13A14 whose magnet rotor drives the odometer 13A15 and the shaft rotation rate indicator 13A17 through mechanical coupling 13A17. Thus the incremental change in the cosine is indicated on the odometer 13A15 and the rate of this change is indicated on the rate indicator 13A17. The values of the shaft rotation or rate of rotation must, of course, be multiplied by a factor determined by the separation of the antennas 13A1 and 13A2 in order to indicate true change or rate of change of the cosine. The difference between two readings of the odometer indicates the increment of the cosine occurring in the interval of time between the readings.

The method indicated in FIG. 13A may be employed in any embodiment of my invention where such measurement is required.

If the direction of rotation of the vector from the station to the emitter is counter-clockwise the indicated signs of the measurements are shown in FIG. 13. If the direction of this rotation is clockwise all of the signs are reversed. This reversal of the signs with reversal of direction of rotation of the vector from station to emitter causes the ambiguity between diagonally opposite quadrants. If the ambiguity is resolved by directional characteristics of the antennas the direction of rotation is directly indicated by the sign of either cosine or sine variation measurement.

Directional antennas may be employed for quadrant determination without sense indication of the sine and cosine measurements.

FIG. 13 indicates the geometrical relationships and shows how two independent equations in the two unknown angles are obtained. Solution of this simple equation set for the two unknowns may be accomplished algebraically or graphically or by iterative digital methods. The center angle, the average of the two angles is shown to be a simple function of the ratio of the two counter readings. The characteristic is particularly valuable when short measurements are taken and the difference between the two outer angles is not great.

If sense of each measurement is determined as by the apparatus shown in FIG. 13A then the pair of opposing quadrants containing the emitter is indicated by the signs of the measurement. There remains an ambiguity relative to which of the two diagonally opposite quadrants contain the emitter. This is the familiar sense ambiguity present in many direction finders.

A method of determining the angles that involves only the solution of a linear set of equations in solving for the trigonometric functions of the angles is to make two simultaneous measurements of the changes of these functions. The second measurement set may start at the termination of the first measurement set or it may start at the same time as the first measurement set starts, but continue for a longer interval of time. Since the sum of the squares of the sine and cosine of any angle is equal to unity, it is possible to write two independent linear equations in terms of the unknown sine and cosine of that angle that is common to the two measurements, as follows:

$$\sin^2\theta_o + \cos^2\theta_o = 1$$

$$\sin^2\theta_1 + \cos^2\theta_1 = 1$$

$$\sin^2\theta_2 + \cos^2\theta_2 = 1 \quad \sin\theta_1 - \sin\theta_o = N_1$$

$$\sin\theta_2 - \sin\theta_o = N_2$$

$$\cos\theta_1 - \sin\theta_o = M_1$$

$$\cos\theta_2 - \cos\theta_o = M_2$$

$$(N_1 + \sin\theta_o)^2 + (M_1 + \cos\theta_o)^2 = 1$$

$$(N_2 + \sin\theta_o)^2 + (M_2 + \cos\theta_o)^2 = 1$$

$$2N_1\sin\theta_o + 2M_1\cos\theta_o = -N_1^2 - M_1^2$$

$$2N_2\sin\theta_o + 2M_2\cos\theta_o = -N_2^2 - M_2^2$$

Having determined the sine or cosine of one of the angles, the solution for other quantities of interest follows directly.

These principles apply equally well to operation in three dimensions. A third antenna pair 131 may be arranged along an axis perpendicular to the plane of the first two antenna pairs 131. In this method two sets of measurements are required for a nonlinear solution for the trigonometric functions and three measurement sets are required for a linear solution for the trigonometric functions, remembering that the sum of the squares of the direction cosines is equal to unity.

In both the planar and the three dimensional systems each pair of antennas may share one of its antennas with any or all of the other antenna pairs 131. Thus a system capable of finding direction in two dimensions can be obtained using three antennas. A system capable of finding direction in three dimensions can be obtained using four antennas all of which must not lie in the same plane.

The principle of my invention is not altered if the equipment is so designed that signals are radiated from the antennas at the station rather than being received at the station. In this case, the station becomes a beacon rather than a direction finder. The same cosines of the same angles are measured but a part of the equipment for making the measurement is carried along with the moving receiver of the transmitted waves, the position of which receiver it is desired to determine. The direction of the moving receiving equipment from the transmitter may actually be derived and indicated at the position of the receiving equipment. Several moving receiving equipments may be operated simultaneously employing the same beacon station. Each of the antennas (apertures) of the ground station emits a separately identifiable signal. The signal may be continuous wave, in which case its frequency assignment serves to identify it. The signal may be modulated or time shared to attain identification. The signals from all of the antennas are received simultaneously on a single antenna mounted on the vehicle conveying the receiving equipment. The receiving equipment then measures the beat or the accumulated phase shift in the carrier signals from the several antennas and so obtains a measure of the change in the cosines of the angles between a line from the station to the vehicle and each of the two or three station axes. If the carrier or center frequency is not the same for each antenna, it may be necessary to correct for this constant displacement in the receiving equipment which is a simple procedure.

Although the use of pairs of apertures for direction finding has been illustrated here using incremental measurements of interference or beat phenomenon, my invention is equally applicable to rate or differential measurements. A frequency discriminator may be employed in place of the counter 133 for such a purpose. The readings M and N are then measurements of time derivatives or infinitesimals. The ratio of M to N then provides the tangent of the angle as indicated in FIG. 13.

Direction Finding by Measuring the Ratio of Changes of Direction Cosines Relative to Two Axes.

The operation of the direction finding system, such as shown in FIG. 14, is simplified by reducing the number of simultaneous readings that must be taken for a complete measurement set. The duration of a preset count on one counter may be employed to determine the interval of counting on the other counter, thus obtaining a reading on a single counter proportional to the tangent of the center angle. A constant of proportionality will be introduced that is dependent upon the value of the preset count on the timing counter. In order to retain the counts to reasonable values, both counters are employed as timers, the first counter to reach a predetermined value shuts off both counters. Indicator lights 140 indicate which counter acted as the timing counter and thereby indicates whether it is the tangent or the cotangent of the center angle that was measured.

The system is capable of operating on the signals of small amplitude as obtained on antennas receiving signals from a distant transmitter. The signal from each antenna 141 is fed into its own mixer 142. The injection signal, large in amplitude compared to the antenna signals, is the same for all of the mixers 142 and is obtained from the same local oscillator 143. The outputs of the mixers 142 are amplified in IF amplifiers 144.

A dual conversion system using two consecutive IF amplifiers in each channel may be employed if necessary for higher gain and improved image rejection. The simple system is shown here illustration and is perfectly practical. If double conversion is employed, the injection signal of the second mixer in each channel should be obtained from a source common to the other two channels.

The output of the IF amplifier 144 is squared in squarers 145. The signals from the squarers 145 are differentiated in differentiators 146. At this point the center channel is doubled as shown in FIG. 14 of the drawing, so that its signal may be employed independently in cooperation with the other two channels, thereby effecting two independent pairs of channels. Each channel pair corresponds to one pair of antennas, one antenna of each pair of antennas being effectively shared with the other pair of antennas in performing the measurement. The signal from the differentiator 146 is fed into the gate 147 which is controlled by a signal derived from the squarer of the opposite channel of the same channel pair. The output of the gates 147 from either channel pair is then composed of pulses. The pulses of one channel indicate a positive change while the pulses from the other channel indicate a negative change. These pulses are fed into reversible counters 148.

To initiate a measurement, a signal is supplied over line 148a to the two counters simultaneously which resets the counters and initiates their simultaneous counting.

This method is readily adapted to three dimensional operation by the addition of another channel and another antenna not located in the plane of the first three. The system is particularly useful for measurements over small changes of angle. The method of measuring the change of phase in terms of whole cycles shown is only presented as an example. Any method of measuring the change of phase between the antennas is applicable and there is of course no restriction limiting the system to the counting of integral cycles of phase change.

Rotating Cosine Arrays

The system shown in FIG. 13 may be employed to determine direction of incident waves in three dimensional space by rotating the entire antenna system. In this method the planar antenna system 131 is rotated about an axis perpendicular to the plane of the antennas. The rotation is continuous in one direction and is sufficiently fast that the position of the emitter of the waves has not changed appreciably relative to the direction finding system during one rotation of the antenna array. The counters are turned on for a portion of one cycle of revolution of the antenna supporting structure. A measurement rotation angle of ninety degrees is convenient, although the apparatus will operate employing other angular variations as well. The apparatus responds as if the antenna array were standing still and the wave emitter were traveling in a circle whose plane is parallel to that of the rotation of the antenna assembly. Thus, the angle between the radius from the apparatus to the emitter and the plane of the revolving antenna array is constant. It is of course assumed in the use of the apparatus that the source of the waves whose direction of propagation is to be determined by the apparatus is sufficiently removed from the apparatus that the wave front is essentially planar across the entire apparatus. Conversely, the apparatus is so constructed that the distance between the antenna apertures is sufficiently small that the wave front may be regarded as planar between the two apertures for practical purposes.

The geometrical relationships and the mathematics pertinent to the operation of the apparatus is shown in FIGS. 10 and 10A. This geometry and mathematics show the method of determining the pertinent angles relative to the aperture axes. Included in FIG. 10A is the equation for determining the elevation angle from the measured values of changes of the direction cosines. There is no ambiguity of direction in the plane of rotation in the operation of this apparatus since the direction of rotation of the aperture assembly is known and provided that the signs of the measured values are indicated. The circuitry shown in FIG. 13 is abbreviated in order to clearly indicate geometrical properties. The bidirectional capability of the mixer-counter combination is not shown. Also, for clarity the diagram shows four apertures. The apparatus of course may be constructed employing one aperture common to both pairs of apertures and in a variety of configurations. The circuit shown in FIG. 13A is capable of providing both rate and displacement types of variation of the direction cosine and such a circuit can be used between the outputs of apertures of each of the pairs of apertures in the apparatus under discussion. FIG. 14 indicates a circuit for use with three apertures deployed along two axes and employing bidirectional counters and associated apparatus necessary for indicating the signs of the measurements of variations of the direction cosines.

An alternative method of operation of this apparatus is to perform two sets of measurements, either successive or overlapping, to remove the requirement for measuring, or otherwise knowing as by controlling, the angle through which the array is rotated relative to the direction of the target from the array.

A two dimensional direction finder (one capable of finding a single angle such as azimuth) employing a single rotating pair of apertures is a simple embodiment of my invention. The apparatus consists of two apertures sensitive to the incident plane wave whose direction it is desired to determine, mounted on a rotating assembly so that the axis of the rotation is perpendicular to a plane including the wave source and the two apertures. In typical use the equipment would be oriented so that the axis of rotation is vertical with respect to the surface of the earth. The axis between the apertures remains horizontal. The source of the waves is similarly in the horizontal plane and at such a great distance from the apparatus that the wave front incident upon the entire apparatus is planar. The two apertures are conveniently located at equal distances on opposite sides of the vertical axis of rotation.

In this embodiment of my invention the variation of phase difference between the output signals of the two apertures is measured as the rotation occurs. Simultaneously the variation of the angular orientation about the axis of rotation is measured. The variation of angle and phase may be either incremental or differential.

A suitable equipment for the measurement of the variation of phase difference between the output of the two apertures is shown in FIG. 13A and described elsewhere in this application. The two wave sensitive apertures may be radio antennas. Other apertures would be employed for other types of waves.

The variation of the difference in phase between the signals from the apertures is immediately interpretable in terms of the variation of the cosine of the angle between the propagation direction and the axis of the apertures knowing the distance between the apertures and the free space length of the wave whose direction is being determined. The method of computing the bearing of the wave propagation direction relative to the axis of the apertures is indicated in an earlier section of this application.

In this device, as with the device described using two aperture axes in space quadrature in a rotating assembly, direction of propagation of the wave is determined relative to the axis of the aperture pair. Whereas, in the embodiment employing two aperture axes, it is not necessary to know the variation in bearing of the aperture axes relative to the direction of wave propagation. It is necessary to know this variation in the use of an array comprising only a single axis of apertures. If the source of the waves and the apparatus are both located on the same reference frame, say the earth's surface, there is no particular problem in measuring the angular variation of the aperture axis corresponding to the variation of the direction cosine of the bearing of the source relative to aperture axis. The measurement of the two variations is simply performed simultaneously. Switches mounted on the pedestal of the apparatus can perform this synchronizing function. However, if the apparatus is mounted on a craft which is itself rotating on its own axis at an unknown rate, it is impossible to determine exactly this variation of the bearing of the aperture axis relative to the direction of propagation of the wave. For such an application the apparatus employing two aperture axes mounted in space quadrature would be preferred. If the speed of rotation of the aperture axis is made sufficiently great that other angular variations may be neglected, the two-aperture apparatus is adequate.

In either the one-aperture axis or the two-aperture axis types of apparatus, separate and distinct from the requirement for measuring the variation of the angular orientation about the axis of rotation relative to the direction of propagation of the wave is the requirement for monitoring, measuring or controlling the angular relationship between the rotating aperture assembly and the craft, or other reference frame relative to which the direction of propagation of the wave is ultimately desired. The art of measuring and controlling shaft position is too well known to warrant further discussion here except to state that such means must be provided so that the angular position of the aperture axis is known relative to the particular reference frame relative to which it is desired to know the direction of propagation of the wave. It is a simple matter then knowing the wave propagation direction relative to the aperture axis to find the wave propagation direction relative to the base reference frame.

Whereas, only embodiments of my invention in which an array of receiving apertures have been discussed, it is obvious that the principles of my invention extend to embodiments in which the wave apertures are transmitting apertures and the receiver is remote from the transmitter and has a simple aperture. Similarly, the principles of my invention are included in embodiments in which waves are both transmitted and received by the same array of rotating apertures, said waves being reflected to the transmitting-receiving apparatus from a distant object. One familiar with the art would have no difficulty in arriving at practical apparatus employing the principles of my invention in these various applications.

It is further obvious that the principles of my invention may be incorporated without change in systems that involve an airborne rotating array and a ground cooperative equipment. Alternatively, both ends of the system may be mounted on moving vehicles. Also, transmission may be in either or both directions to or from the rotating array. Thus, my invention may be employed as a beacon system or as a direction finding system, either apparatus operating through separately spaced cooperative equipments or employing reflection of waves.

In FIG. 15 is shown a diagram of an apparatus for performing the measurement of a trigonometric function of a propagating group of waves relative to an axis at the receiver, which axis traverses the pair of transmitting apertures shown in the figure. The receiving equipment includes all of the actual phase measuring equipment. It is a simple matter to incorporate as many such equipments as are desired to operate with a plurality of aperture axes.

The rotating aperture array may be mounted in an aircraft or missile to indicate to the ground station the attitude of the vehicle with respect to the line between the ground receiver and vehicle. Using a plurality of such receivers, the attitude of the vehicle relative to the reference frame holding the receivers can be determined.

The three dimensions of angular orientation of a missile can be determined by arranging a four-aperture array containing two aperture axes so that it can be rotated on an axis parallel to the length of the missile and so that the apertures remain in a plane perpendicular to the length of the missile. The rotation of array must be fast relative to the yaw or pitch of the missile. Such an array presenting such motion may be achieved by employing a synthetic array electronically controlled. If the missile rotates sufficiently fast about its longitudinal axis, rotation of the array about this same axis relative to the missile may not be required. By performing successive or overlapping sets of measurements variation of the direction cosines relative to the axes of apertures, the angles through which the array is rotated, is not required to be measured directly or controlled or otherwise known but may be determined from the measurements made relative to the separate aperture axes.

In another embodiment of my invention the array of apertures comprises three or more axes of apertures mounted on missile or other vehicle. As the vehicle tumbles, its attitude is continuously determined by measurements of the variations of the direction cosines relative to the three axes relative to one or more ground stations. The axes are mounted in such a manner that there is a component of at least one axis along each of three orthogonally disposed axes.

The reference between the missile body and the aperture array can be indicated to the receiving station by simply switching on the radiation from the transmitter at a known point of the rotation of the aperture array relative to the body of the missile. The duration of the measurement can be similarly controlled by turning the radiation on at one point of rotational orientation of the aperture array relative to one part of the body of the missile and turning the radiation off at another point of rotational orientation.

As with other embodiments of my invention, the embodiment employing the rotating array of apertures may be employed using measurements of incremental variations or measurements of differential variations and it is not intended to restrict my invention to either of these two types of variations.

Also, as with other embodiments of my invention, it is not necessary to employ continuous waves in performing the necessary measurements of time delay or phase difference. Pulses or modulated waves may do as well and one skilled in the art will have no difficulty in adopting the principles of my invention to such modulation forms. When the difference of the phases of the signals at certain terminals is discussed, such difference in phase actually is a measure of the time delay between the two signals. Thus, the geometrical measurements are the same regardless of the nature of the signals employed to perform the measurement.

Once the principle of establishing direction relative to the rotating array of apertures is employed, there are any number of methods by which such information may be referred to other reference frames. Some of such frames may include the support of the array mount. Other reference frames do not include the pedestal of the array. In some embodiments of my invention gyroscopic means may be employed to establish the orientation of a rotating assembly to some selected frame of reference which may or may not include the other terminal of the system or a wave reflector.

Two-Station Position Finding System Measuring Changes of Direction Cosines

In this system there are two stations, each of which is capable of measuring the change in the cosine of the angle between each of three orthogonal axes and a moving source of electromagnetic waves whose position it is desired to determine. Each station contains three antenna pairs whose three axes are in space quadrature with each other. Each pair of antennas shares one of its antennas with the other two antenna pairs. The shared antenna will be called the control antenna. Each of the other antennas is located an equal distance from the origin along one of the three orthogonal axes of a cartesian coordinate system with the central antenna located at the origin. Each pair of antennas is connected to equipment described earlier for measuring the beat or the phase difference accumulated between the signals received on each of the two antennas of the pair of antennas as the emitter moves from a first unknown point to a second unknown point.

Two modes of operation are available with this system. In the first mode of operation a single system reading is taken. That is, all of the counters are activated simultaneously at which time of occurence the moving emitter is located at the first point of unknown position. All of the counters measure the accumulated phase change until the measurement is terminated by turning off all of the counters simultaneously and reading them. There are then six separate measurements accomplished in one system measurement. There are six elements of unknown and desired information, the three cartesian coordinates of each of the two significant positions of the moving emitter. The moving emitter may take any path in moving from the first position to the second position. Six independent simultaneous equations may be written, one for each of the counter readings. These equations are simply the equating of the value of the reading to the difference of the two cosines relative to each counter measurement expressed in terms of the counter measurement. The simultaneous solution of these equations provides the desired cartesian coordinates of the unknown positions of the emitter. Since the equations are nonlinear, it is convenient to employ iterative techniques in the solution of the equation set.

In the second mode of operation, two system measurements are taken successively. The counters are turned on and then read after a first interval without stopping them. After a second interval the counters are read again. The direction of the emitter from each station is calculated for that station independently of the magnitudes of the readings of the other station. The directions of the three significant positions of the moving emitter are thus found. This data combined with similar data for simultaneous readings by the other station relative to the same three positions of the emitter are sufficient to define the three positions of the emitter in all three cartesian axes.

Two-Station System Measuring Change of Direction Cosines and Change of Range:

The simultaneous measurement at each of two stations of the change of direction cosines relative to two orthogonal axes combined with the simultaneous measurement at each of the two stations of the change in range from the emitter to that station provides an improved method of determining the position of a moving emitter. This system has an advantage in not requiring the antennas of the stations to be disposed along three noncoplanar axes. All of the antennas at each station may be located in the same plane which is a convenience for large installations. There are a total of six measurements for every system reading. All measurements are made simultaneously. The emitter may move along any path from a first unknown position to a second unknown position. The first position is occupied by the emitter at the instant the counting equipments are turned on, the second position is occupied by the emitter when all of the counters are simultaneously read.

There are six independent equations in six unknowns resultant from the six measurements. The six unknowns are the three cartesian coordinates of each significant position of the moving emitter. There are three equations developed for each station. Four of the equations are the equating of the measured values of the changes in direction cosines to the expression in cartesian coordinates of the differences between the direction cosines corresponding to the two significant positions of the moving emitter. The other equation is the equating of the measured magnitude of the change in range to the difference in the expression in terms of cartesian coordinates of the ranges from the station to the two significant positions of the moving emitter.

The measurement of the change of range performed at each station is accomplished by simple doppler equipment that is described in my patent application, Ser. No. 86,770, filed Feb. 2, 1961. There is, however, an option in the choice of the doppler equipment to be employed with this system. In the first equipment two very stable oscillators are employed, one to regulate the frequency of the moving emitter and moving with the emitter, the other oscillator is employed to establish a comparison between the frequency of the signal received at the station and the frequency of the transmission from the moving emitter. The nominal frequencies of the two oscillators are made the same for convenience.

In the second equipment there is only one standard of frequency and that is located at the station. A signal whose frequency is controlled by the standard is transmitted by the station to the vehicle carrying the emitter. This vehicle also carries a receiver which receives the signal from the station and employs it to govern the frequency of the emitted signal. Either equipment is satisfactory and each has its advantages in particular applications of my invention.

The principle of my invention may be employed as a method of determining the position of an aircraft by detecting aboard the aircraft signals transmitted from two fixed ground stations. The antenna arrangement of the ground station is the same as for the system in which the cosine change measuring equipment is located at the station. The cosines measured and the doppler measurements performed are exactly the same as those made in the case where the counters are located at the ground stations. In this method of navigation there is no change in the geometry, but there is a change in the placement of the various items of equipment and some change in the equipment itself.

In this method of navigation each of the antennas of the ground station emits a separately identifiable signal. The signal may be continuous wave, in which case its frequency assignment serves to identify it. The signal may be modulated or time shared to attain identification. The receiving equipment in the aircraft then measures the beat or the accumulated phase shift in the signals from the several antennas and so obtains a measure of the change in the cosines of the angles between the range line to the aircraft and each of the two station axes. The doppler equipment is the same as before. It may operate with two standard frequency oscillators, one in the aircraft and one on the ground, in which case there is transmission only to the aircraft and the aircraft need contain no transmitter.

Another modification of use of my invention results when directional tracking antennas are employed at the ground stations to measure the changes in the angles described rather than employing the space separated antenna pairs to measure the cosines of these angles.

Determining Position by Distributed Pairs of Antennas

The following is the description of a system of navigation wherein a radio receiving device is carried aboard the navigating craft and several transmitting equipments are located at separate points on a stationary reference frame. The system is designed to be operative in three dimensions and it could, of course, be simplified to be operative in two dimensions. The antennas and circuitry of the equipments on board the navigating vehicle and at each of the several stations is such as to permit the measurement of the change in the direction cosine of a line joining the station with the navigating vehicle relative to a fixed axis at the station.

The direction of the axis at each station is that of a line joining two simple apertures or antennas. In this modification of my invention the antennas are simple vertical dipoles, and the distance between them is equal to many wavelengths. In the operation of this system the navigating vehicle is at great distance from each station. Specifically, the distance from the station to the moving vehicle is a great many times the distance between the two antennas of the station. The stations may be scattered in a three dimensional volume or they may be in a plane. The direction of the axes of the antennas at the various stations must be known but need not have any particular orientation. A preferred embodiment of my invention has the stations more or less uniformly distributed as the terrain permits, and the axis of each station oriented along one of the major common coordinate axes of the system.

In this preferred embodiment there are six stations, and a single measurement is made relative to each station simultaneously with similar measurements performed relative to the other five stations. There are six unknowns to be determined; these cartesian coordinates of the navigating (moving) vehicle at the time the measurements are commenced, and three cartesian coordinates of the vehicle at the instant when the measurements are terminated. There are thus obtained six independent equations for determining the six unknowns. The equations are simply the measurement values equated to the difference in the appropriate direction cosines, the direction cosines being expressed as functions of the unknowns. The set of simultaneous equations thus developed are solved by machine computation to determine the desired positional data.

In another preferred embodiment of my invention, only four stations are required. In this embodiment three sets of simultaneous measurements are performed. The simultaneous sets of measurements may be performed consecutively or they may be overlapping. A convenient method is to have the three measurements start simultaneously and terminating them successively at a constant interval. In this method there are twelve unknown cartesian coordinates and twelve measurements. A soluble set of independent equations results as before. Similarly, five stations may be employed with two measurements performed relative to each station. In this instance there is an extra equation that may be dropped from the set or employed for improving accuracy through statistical methods. There are other combinations suitable for a wide variety of special purposes.

FIG. 15 shows the fundamental block diagram of one of the stations suitable for operation in my invention and a similar diagram of one channel of the receiving equipment carried aboard the moving vehicle. One such channel of receiving equipment must be carried in the vehicle for each of the stations of the system. It is possible to combine the functions of certain elements of the various channels of the receiving equipment to make the equipment more economical and compact. However, the use of separate channels is thoroughly practical and permits of greater clarity in the explanation. Each station is assigned a separate pair of frequencies that are closely spaced in the spectrum. One of the antennas of the station transmits a continuous wave on one of the antennas of the station, and the other antenna transmits a continuous wave on the other frequency. The frequency and location of each antenna are of course known.

In the upper right corner of FIG. 15 is the block diagram of one of the transmitter stations. The station is provided with a standard frequency oscillator 1500 which drives RF amplifier 1501 directly and also drives frequency multiplier 1502. The RF amplifier 1501 drives one of the antennas 1503 so that the frequency of the radiations from that particular antenna is that of the standard frequency oscillator 1500. The frequency multiplier 1502 multiplies the frequency of the standard frequency oscillator by a rational fraction that is close to unity but of course not equal to unity. The exact value of the multiplication is determined by frequency assignments. The output of the frequency multiplier 1502 is employed to drive the RF amplifier 1504, which in turn drives antenna 1505.

The block diagram of the receiving equipment for operation in conjunction with each transmitting station is shown in the bottom part of FIG. 15. This equipment contains two channels, one each for detecting the signals from each of the two antennas of the transmitter, which are received over the single antenna 1506. There is provided a standard frequency oscillator 1507 which drives mixer 1508 directly and mixer 1509 through frequency multiplier 1510. The multiplication of frequency multiplier 1510 is the same as that of frequency multiplier 1502 provided at the transmitter. The frequency of standard frequency oscillator 1507 is removed from the frequency of standard frequency oscillator 1500 by an amount equal to the intermediate frequency to which the IF amplifiers 1511 and 1512 are tuned.

The output of the IF amplifier 1511 in the upper channel is fed to frequency multiplier 1513. The multiplication accomplished in multiplier 1513 is the same as the accomplished in frequency multiplier 1502. This channel is the one receiving its injection frequency directly from the standard frequency oscillator 1507, rather than through a frequency multiplier. It is the channel that is responsive to signals from antenna 1503 whose frequency of emission is that of the standard frequency oscillator 1500. The multiplication factor of the frequency multipliers must be sufficiently different from unity and the passbands of the IF amplifiers must be sufficiently narrow that separation of the signals from the two transmitting antennas is assured in the two channels of the receiving equipment. The nominal frequency at the output of the frequency multiplier 1513 is the same as the nominal frequency at the output of the IF amplifier 1512. A synchronous detector 1514 is driven by the outputs of the two channels. Synchronous detector 1515 is driven through a pulse shifter 1516 by the upper channel and directly by the lower channel. The outputs of the two synchronous detectors 1514 and 1515 are then fed to the two windings of a two phase synchronous motor which in turn drives an odometer 1518. A reversible step motor may be employed instead of the motor and odometer combination. Also, a direction sensitive device employing a reversible binary counter such as described by H. W. Kohler, U. S. Pat. No. 2,911,641 may be substituted for the synchronous motor and odometer.

Provision for turning the device on and off in order to initiate and terminate the measurement must also be included but is not shown.

The principle of my invention is not affected by placing the transmitter in the aircraft and employing receiving equipment at the ground stations. In this instance, the measured quantities remain the same. The number and placement of the antennas remains the same. Equipment for measuring the change in the direction cosine at each of the stations is described as a part of other equipment in this application. It is only necessary to add to the system a communication means for collecting the data derived at each of the receiving stations to a central point where the solution of the set of simultaneous equations resultant from the measurements may be performed.

Navigation System Employing Beacons with Two Axes:

A system employing stations which each possess two separate and intersecting axes can make a complete determination in three dimensions of the position of a moving vehicle with a single measurement made simultaneously relative to each of two axes of each of three stations. The number of stations can be reduced to two for a complete determination of the position of the moving vehicle if there are three contiguous sets of simultaneous measurements performed by three stations.

In a preferred embodiment of my invention, the intersecting axes at each station are othogonal, and corresponding axes of the separate stations are parallel. A typical arrangement of stations and their orientation is shown in FIG. 16. The measurements that are performed at each of the stations and the two equations that are derived therefrom are also indicated.

The purpose of this preferred embodiment of my invention is to provide a method of determining the position of a moving vehicle by placing aboard that vehicle equipment which receives signals from three transmitting stations. Each transmitting station includes three simple apertures or dipole antennas. The distance between the antennas or apertures is many times the wavelength of the transmitted radiation. One of the antennas is fed a pure continuous wave signal of a specified frequency. This antenna forms a base and the signals from it received by the receiving equipment on the moving vehicle operate in conjunction separately with each of the signals received from the other two antennas of the fixed transmitting station. Each of the other antennas is positioned a known distance from the base antenna along one of the axes of the station. Unmodulated continuous waves are transmitted by the base antenna while each of the other two antennas are excited by modulated signals of the same center frequency as the base antenna. The frequency of the modulation of each antenna is different from that of the other providing an instrumental means of identifying the two axes of the station. The base antenna and one of the modulated antennas determines one of the axes and the base antenna and the other modulated antenna defines the other axis.

FIG. 17 shows a block diagram of one of the transmitting stations in the upper left corner. A standard frequency oscillator 1700 determines the station frequency. The signal from this oscillator is amplified by RF amplifier 1701 and fed directly to transmitting antenna 1702, which is the base antenna. The signal from the standard frequency oscillator 1700 is also fed to balanced modulators 1703 and 1706 where balance amplitude modulation is performed and the center frequency greatly attenuated. The modulation signal in each case is a simple sine wave of a specified frequency. The apparatus for determining and controlling the two modulating frequencies is not shown and is quite conventional. The outputs of the modulators are amplified in RF amplifiers 1704 and 1707 and the resultant signals excite the transmitting antennas 1705 and 1708.

The remainder of FIG. 17 shows the block diagram of the cooperative receiving equipment carried aboard the navigating vehicle. Receiving antenna 1709, RF amplifier 1710, mixer 1711, local oscillator 1712, and IF amplifier 1713 constitute a conventional superheterodyne circuit. In the place of the customary second detector circuit at the output of the IF amplifier 1713, there are shown two separate channels of equipment, each responsive to the signals from one of the pairs of antennas of the transmitter defining an axis of the transmitting station. A pair of such channels is required for each of the ground transmitting stations with which the vehicle is to operate simultaneously. Separation of the simultaneous signals from the several stations may be accomplished in several ways. In the preferred embodiment the selection of station is accomplished by the local oscillator 1712. Each pair of counting channels has its own local oscillator 1712, mixer 1711, and IF amplifier 1713. These equipments are all identical as are the pairs of counting channels. The receiving antenna 1709 and the RF amplifier 1710 are common to all of the several equipments operating with the signals from the various transmitters. Thus the two modulating frequencies employed in the transmitters are the same and designate the same axes in the several transmitters. Only the frequency of the standard frequency oscillator 1700 differentiates the individual transmitting station.

Since the counting channels are identical except for the tuning of two of the filters, only one of the channels is numbered and described here. The signal from the IF amplifier 1713 is fed to the two mixers 1714 and 1715 and the outputs of the mixers are amplified in amplifiers 1716 and 1718. AT the outputs of these amplifiers, the signals are introduced to two separate circuits. It is the purpose of one of these circuits to track the center frequency of the modulation sidebands of one of the modulated antennas. It is the purpose of the other circuit to measure the change in the phase between this tracked center frequency and the signal received from the base transmitting antenna. These two signals are of exactly the same frequency if the station and the vehicle are stationary. There is then no change in phase during any interval in which there is no relative motion between vehicle and station. For reference, we defined frequency as the first time derivative of phase. When relative motion occurs between the vehicle and the station axis relative to which the channel is operating, there occurs a change in the phase of the center frequency of the modulated signal and the signal from the base transmitting antenna 1702. During the interval in which the change of position occurs, and while it is occurring, it may be said that there is a difference between the center frequency of the modulated signal and the base signal. There is no reason to conclude that this frequency difference is constant; in fact, it would be constant only under very special conditions of motion which are not assumed. However, the net change of phase between the two signals that occurs during the interval in which the motion occurs is a conveniently measured and defined quantity.

The tracking signal derived from the two sideband frequencies from the antennas transmitting the modulated signals is separated out through filters 1719 and 1720. These filters are narrow band pass filters whose pass band is centered on the modulation frequency of the balanced modulator 1703. The signals from the two filters 1719 and 1720 are fed to synchronous detector 1721. The output of the synchronous detector passes through low pass filter 1722 to control the frequency of voltage controlled oscillator 1723. The signal from the voltage controlled oscillator is the injection signal for mixer 1714 and, after being shifted ninety degrees in phase by phase shifter 1724, is the injection signal of mixer 1715. This operation of tracking the absent center frequency of a pair of sideband signals is described by Costas in the Proceedings of the IRE, November 1957 issue. The use of narrow band filtering in this circuit for identification of the transmitter and for improvement of the signal to noise ratio is described in my copending application for U.S. Letters Patent, Ser. No. 86,770.

The circuit for measuring the change in phase between the center frequency of the modulation side bands and the base frequency is provided with low pass filters 1725 and 1726. Though the rate of change of phase is not in general constant and the frequency of the signal output of the filters is not generally constant, it may simplify explanation of the fundamental operation of the circuit to assume that for a brief moment the rate of change of phase between the center frequency and the base frequency is constant. In other words, it is assumed that the target is moving about the station in such a manner that there is a constant rate of change of the direction cosine relative to the antenna axis of the station corresponding to the particular channel under analysis. For the purpose of analysis, let it also be assumed that some of the base frequency signal is allowed to pass through the balanced modulator 1703. Since the modulation equipment in the transmitter and the sideband tracking equipment in the receiver are only for the purpose of enabling one to separate and identify the signal from the transmitting antenna 1705, and the operation of this portion of the equipment is amply described elsewhere, attention is directed to the center frequency of the signal transmitted from transmitting antenna 1705 and the modulation is ignored for the moment. Whether or not a signal of the center frequency is actually transmitted is of no consequence as the voltage controlled oscillator 1723 provides a signal of the same frequency and of much larger amplitude to the mixers 1714 and 1715. Furthermore, the phase of the injection signal is effectively caused to track the phase of this center frequency signal so that its presence is of no consequence in the operation of the circuit.

It has been assumed that the rate of change of the phase of the signal from transmitting antenna 1705 and the transmitting antenna 1702 is constant. It may then be said that the two signals coming from the two antennas are of different frequency. Since the injection frequency signal of the mixers 1714 and 1715 is tracking the signal from transmitting antenna 1705, the signal from transmitting antenna 1702 causes a beat frequency signal at the output of both of the mixers 1714 and 1715. The modulation frequency of the balanced modulator 1703 is chosen to be substantially higher than the highest operational value of the frequency of this beat signal so that the low pass filters 1725 and 1726 and the band pass filters 1719 and 1720 can easily separate the two signals into separate circuits. Since the injection signals into the two mixers 1714 and 1715 are in phase quadrature, the two signals of the beat frequency at the outputs of those mixers are similarly in phase quadrature. The low pass filters 1725 and 1726 pass the beat frequency signal from d.c. to the highest operational beat frequency but rejects the modulation frequency. The two beat frequencies, ninety degrees out of phase with each other, are transmitted directly from the low pass filters 1725 and 1726 to reversible counting circuit 1727. The operation of this type of circuit is described by H. W. Kohler in U.S. Pat. No. 2,911,641. A control signal circuit is shown at the bottom of the FIG. 17 for initiating and terminating the measurement of both channels simultaneously. The counting circuit is thus sensitive to the sense of the change in phase between the signals received from the two transmitting antenna. There is nothing in the operation of the circuit requiring that the operational rate of change of phase should be constant and, in fact, it would not be expected that it would be constant.

There are several modifications of this system that are at once obvious. The antennas may be replaced by loudspeakers or underwater transducers so that sonic waves may be generated and transmitted instead of electromagnetic waves. In this case, a microphone or hydrophone would replace the receiving antenna. Thus a submarine could navigate under water using my invention as a method of determining its position continuously.

It is further obvious that the principles of my invention are not changed if the signals reaching receiving antenna 1709 are not processed aboard the moving vehicle but are simply amplified and retransmitted perhaps on a different frequency spectrum by a transponder on board the vehicle to some other point, either on another moving vehicle or on the ground. The processing of the signals would be accomplished at this remote point. Similarly, the signals might merely be reflected from the moving object to the aforementioned remote point on the ground or on another moving vehicle where they would be received and detected by suitable radio or hydrophonic equipment and processed in the manner described. In reflecting or transponding systems, whether employing electromagnetic or sonic or other waves, the analysis and principles of my invention remain the same and are equally applicable. The linear transference of the process of reception and detection from the primary reflecting or transponding moving vehicle to some other moving or stationary point does not alter the essential geometrical relationships of my invention.

The system shown in FIG. 17 is sensitive to the direction or sense of the change of phase between the base and the modulated signals and is capable of following a reversal of the rate of this change in phase. There are practical limits to the slowness with which the rate of phase can go through zero, however. At zero beat there is no difference between the unmodulated base frequency and the center frequency of the modulated signal. How close the zero beat condition of operation can be approached is dependent upon the stability and the noise of the circuit. A method that permits operation through the zero beat condition at any rate of change is obtained by modulating the signal from the base antenna as well as the signals from the two axis antennas. Modulation of the transmitting antenna 1702 is attained by introducing a balanced modulator similar to the balanced modulators 1703 and 1706 between the standard frequency oscillator and the antenna. The modulation frequency is assigned to be other than the modulation frequencies of the balanced modulators 1703 and 1706. In the counting channel of the receiving equipment the low pass filters 1725 and 1726 are replaced by narrow band pass filters. The outputs of the band pass filters may then each be fed to one of the quadrature stator windings of a synchronous motor coupled to an odometer similar to the arrangement shown in FIG. 15. Such a motor may be of the kind commonly known under the name Selsyn. Since it is only the change of phase that is to be measured, it is not necessary to maintain any particular polarization of the rotor other than that induced by the stator. It is of course necessary that the rotor have a shape that permits a torque to be developed by the induced polarization and that it be suitably laminated to permit the easy conduction of magnetic flux at the modulation frequency of the base antenna. A conventional bar-shaped rotor would be satisfactory for a two-pole motor. Should closer control be desired the rotor may be of the wound variety excited by a signal obtained by adding the outputs of the two narrow band pass filter.

An electronic counting circuit may be employed instead of the motor and odometer equipment described in the last paragraph. In this electronic direction sensitive counting circuit there are employed two synchronous detectors, one at the output of each of the narrow pass band filters that replace the low pass filters 1725 and 1726. A common synchronizing signal for the two synchronous detectors is obtained by adding the two signals from the outputs of the narrow pass band filters. The signals from the outputs of the synchronous detectors may then be applied to a circuit such as that described by H. W. Kohler in U.S. Pat. No. 2,911,641.

A combination of measurement of change of cosines and change of range results in a system operable with a single system measurement and employing only two stations, each having two axes. The doppler change of range measurement is easily added to the equipment shown in FIG. 17. Stable frequency standards are required at the transmitting stations and at the receiving stations, and a mixing and beat counting means must be provided at the receiver to operate with each transmitting station. Six measurements are performed simultaneously, three relative to each station.

Single Station Hybrid

A modification of my invention employs a single receiving station at which measurements of angular variation are performed simultaneously with measurements of variation of wave propagation path length. In one form of this modification an angle tracker is employed at the station to track the waves from a moving transmitter whose range from the station it is desired to determine. Simultaneously, the doppler effect caused by the motion of the moving transmitter relative to the receiver is observed and measured. Employing the two types of measurements, angle variation and doppler, together with suitable assumptions relative to possible motion of the transmitter, the range from the station to the transmitter is computed.

The target being tracked may be a moving reflector of waves rather than a transmitter as described above. The illumination of the moving reflector may be accomplished at the receiving station where the angle tracking and doppler measurement are accomplished or the illuminating transmitter may be at some other point. Monochromatic continuous wave radiation may be employed in the systems described above. Pulsed or otherwise modulated waves may also be employed.

The system may also employ multiple aperture receivers at the station. In this case the variation of a trigonometric function of the angular coordinates of the moving target relative to the station are measured simultaneously with the doppler measurement.

When an angle tracker is employed to measure the angular variation, the data may be collected by means of an inertial device mounted directly on the direction sensing element, such as the parabolic reflector of a microwave angle tracker. In this method the errors of the gimbal angle indicators is not reflected into the measurement of angular variation. The gimbal angle indicators may be read if it is also desired to obtain the direction of target from the station, but it is not necessary to read the gimbal angle indicators for the determination of the range by the hybrid system involving angular variation and doppler measurements. The inertial device mounted directly on the antenna is similar to the devices employed for inertial navigation. Gyroscopic means can be employed to indicate the variation of the pointing angle of the angle sensing element, parabolic reflector in the case of a microwave angle tracker.

The measurements of the doppler phenomenon and the angular measurements may be either incremental or they may be the rate type of measurement capable of determining the various derivatives.

It is obvious that the methods described above are easily applied to multiple targets simultaneously. A station employing multiple apertures can discriminate between the targets by the separate doppler frequencies of each target.

Three-Station System Using Ballistic Cameras

In one modification of my invention three stations whose positions on the earth are known are employed to determine the positions of three points in the sky by photographic means at each station. The well-known ballistic camera is employed. All three cameras are pointed so that they cover a common volume of the surveillance sky space. The exact angular orientation of the cameras need not be known exactly since the determination of position is not dependent upon this knowledge. It is only necessary that the three sky points are visible to each camera.

The three sky points may be three simultaneous points such as three aircraft. In such operation the shutters of the cameras must be synchronized by appropriate timing means between the stations. The cameras may also be employed with a flashing light operating from a single aircraft.

The angles between the three sky points are determined by measurements of the photographic films. Thus, there are three measurements derived for each of the three stations, making a total of nine measurements. From these nine measurements the nine cartesian coordinates of the three sky points are determined using the methods of computation described elsewhere in this application.

By photographing more than three sky points redundant data may be obtained. Such data may be employed for statistical improvement of accuracy and may also be employed for flash identification when the flashing light method is employed using a single film plate. Changing film for each flash is an alternative method of flash identification.

Attitude Determination

To one skilled in the art it is readily apparent that several of the embodiments of my invention described in this application may be easily adapted to the purpose of determining the attitude of an aircraft or missile. To determine the attitude of a vehicle relative to some reference frame it is only necessary to establish on the reference frame a plurality of points relative to which bearings at the vehicle may be determined simultaneously. To determine these bearings the moving vehicle can be equipped with a plurality of wave apertures the variation of the direction of waves incident upon the vehicle can be employed as described herein to determine the bearings. Alternatively, the transmitter and the apertures may be in the vehicle. Emissions from the plural apertures of the vehicle must be instrumentally identifiable by the ground station. A system for providing this identification and performing the desired measurement is shown in FIG. 15. It is only necessary to consider the equipment of the type shown as "ground transmitting equipment" to be mounted in the vehicle and the equipment shown as "receiving equipment in moving vehicle" to be mounted on the ground reference frame at each reference point.

Doppler Range Determination

Range may be determined from doppler incremental measurements as described in my copending patent application, Ser. No. 278,191, when reasonable assumptions can be made relative to the path of a moving object.

When range increments are measured between a moving point and a fixed point, or between two moving points and when it is possible to assume that the path is well behaved (continuous, no reversals), one may write the equation $$\sum_{j=0}^{j=n} \alpha_j r_j^2 = 0$$

where the terms are coefficients determined by the timing of the measurements. In particular, these terms are the binomial coefficients when the time intervals between the terminations of the measurements are equal. The convention of referring all measurement of a series of measurement to the same starting point being employed here. From this equation, one finds the range to the starting point to be $$r_0 = \frac{\sum_{j=1}^{j=n} \alpha_j M_j^2}{-2 \sum_{j=1}^{j=n} \alpha_j M_j}$$

where:

$j$ is the number of the measurement $M_j$ is the value of the $j$th measurement of change of range $n$ is the number of measurements in the range sequence.

Alternatively, one may write $$r = -\frac{1}{2} \frac{\sum_{j=0}^{j=n} \alpha_j M_j^2}{\sum_{j=0}^{j=n} \alpha_j M_j}$$

where $r$ is any range to which all the measurements of range change are referred but which reference range is not included in the series of range squares indicated above.

This method of range determination may be employed in any of the hybrid systems described in this application as an aid in position determination. However, doppler and other similar measurements may be used in other ways in such hybrid systems as an aid in position determination. Furthermore, range difference measurements may be performed using range tones, pulses and other methods.

I claim:

1. A method of determining the direction of a continuous plane wave incident upon an apparatus, said apparatus containing two apertures sensitive to said wave comprising:
   Action 1. Mounting said two apertures on an axis sufficiently close together to assure the validity of the assumption that said wave is planar;
   Action 2. Rotating the axis through said apertures about an axis of rotation that is nonparallel with said axis joining said apertures;
   Action 3. Measuring increment of a trigonometric function resultant from said rotation by measuring increment of the difference of the phases of the signals from said apertures occurring during said rotation;
   Action 4. Concurrently with Action 3 measuring increment of the angular orientation of said aperture axis about said axis of rotation relative to the direction of propagation of said wave, said increment of angular orientation being associated with said increment of the difference of the phases;
   Action 5. Determining from the results obtained in Action 3 and Action 4 the direction of propagation of said wave relative to said aperture axis.

2. A method of determining the direction of a plane wave incident upon an apparatus, said apparatus comprising a reference frame relative to which the variation of the direction of said wave is unknown and relative to which the direction of said wave is to be determined, said apparatus containing at least two apertures sensitive to said wave comprising:
   Action 1. Mounting two of said apertures on an axis sufficiently close together to assure the validity of the assumption that said wave is planar;
   Action 2. Rotating the axis through said apertures about an axis of rotation that is nonparallel with said axis joining said apertures;
   Action 3. Determining the variation of trigonometric function resultant from said rotation by measuring the variation of the difference of the phases of the signals from said apertures occurring during said rotation;
   Action 4. Concurrently with Action 3 measuring the variation of the angular orientation of said aperture axis about said axis of rotation relative to the direction of propagation of said wave, said variation of angular orientation of said aperture axis being associated with said variation of the difference of the phases;
   Action 5. Concurrently with Action 3 and Action 4 the further and separate action of measuring the angular orientation of the aperture axis about the axis of revolution relative to said reference frame, said angular orientation of the aperture axis associated with the occurrence of said variation of difference of phases;
   Action 6. Employing the results obtained in Action 3, Action 4 and Action 5 determining the direction of propagation of said wave relative to said reference frame.

3. A method of determining the direction of a plane wave as recited in claim 2 further limited by:
   In Action 3; said variation of a trigonometric function being an increment of a trigonometric function;
   In Action 4: said variation of the angular orientation being an increment of the angular orientation.

4. A method of determining the direction of a plane wave as recited in claim 2 further limited by:
   In Action 3: said variation of a trigonometric function being a rate of change of a trigonometric function;
   In Action 4: said variation of the angular orientation being a rate of change of the angular orientation.

5. A method of determining the direction of a plane wave as recited in claim 2 further limited by:
   In Action 3: performing said measuring during a fractional part of a complete revolution of said aperture axis;
   In Action 6: determining said direction relative to said fractional part of a complete revolution of said axis.

6. A method of determining the direction of plane waves incident upon an apparatus comprising a plurality of apertures sensitive to said waves comprising the following actions;
   Action 1. Mounting a first pair of said apertures on a first aperture axis sufficiently close together to assure the validity of the assumption that said waves are planar;
   Action 2. Mounting a second pair of said apertures on a second aperture axis sufficiently close together to assure the validity of the assumption that said waves are planar, one of which apertures of said second pair of apertures may be common to said first pair of apertures;
   Action 3. Mounting said pairs of apertures in an array such that said first aperture axis is nonparallel to said second aperture axis and so that the array may be rotated about an axis of rotation that is nonparallel to two parallel planes, each said plane containing one of said aperture axes and which planes may be coincident;
   Action 4. Rotating said array about said axis of rotation;
   Action 5. Measuring relative to each of said aperture pairs the variation of a trigonometric function of the bearing of the direction of propagation of said waves relative to said each aperture pair by measuring, relative to each said pair of apertures, the variation of the difference of the phases of the signals from the apertures of each said pair of apertures;
   Action 6. Determining from the results obtained in Action 5 a bearing of the direction of wave propagation relative to one of said aperture axes, said last-mentioned bearing lying in a plane perpendicular to said axis of rotation.

7. A method of determining direction data relative to a plurality of separate simultaneous plane waves incident upon an apparatus comprising a plurality of apertures sensitive to said waves comprising the following actions:

Action 1. Mounting one pair of said apertures on an axis sufficiently close together to assure the validity of the assumption that said waves are planar;

Action 2. Mounting another pair of said apertures on a second axis sufficiently close together to assure the validity of the assumption that said waves are planar, one of which apertures of said second pair of apertures may be common to said first pair of apertures;

Action 3. Mounting said two pairs of apertures in an array such that said first aperture axis is non-parallel to said second aperture axis;

Action 4. Measuring relative to each of said aperture pairs the difference between trigonometric functions of the bearings of the directions of propagation of said waves relative to said each aperture pair by measuring the difference between the difference of the phases of the signals from the apertures of each said pair of apertures;

Action 5. Determining from the results obtained in Action 4 a bearing of the direction of propagation of at least one of said plane waves relative to at least one said aperture axes.

8. A method as in claim 7 further defined in that said direction data comprises the direction of at least one of said waves.

9. A method as in claim 7 further defined in that said direction data comprises the angular relationship between two of said plane waves.

10. A method of determining the direction of plane waves incident upon an apparatus comprising a plurality of apertures sensitive to said waves comprising the following actions;

Action 1. Mounting a first pair of apertures on a first axis sufficiently close together to assure the validity of the assumption that said waves are planar;

Action 2. Mounting a second pair of apertures on a second axis sufficiently close together to assure the validity of the assumption that said waves are planar, one of which apertures of said second pair of apertures may be common to said first pair of apertures;

Action 3. Mounting said first pair of apertures and said second pair of apertures in an array such that said first axis is non-parallel to said second axis and so that the array may be rotated about an axis of rotation that is non-parallel to two parallel planes, each said plane containing one of said aperture axes, and which planes may be coincident;

Action 4. Rotating said array about said axis of rotation;

Action 5. Measuring relative to said first pair of apertures and said second pair of apertures the variation of trigonometric function of the bearing of the direction of propagation of said waves relative to said each aperture pair by measuring the variation of the difference of the phases of the signals from the apertures of each said pair of apertures;

Action 6. Determining from the results of Action 5 the bearing of the direction of propagation of said wave relative to the axis of rotation of said aperture array.

11. A method as in claim 10 further defined in that said measurements are rate measurements.

12. A method as in claim 10 further defined in that said measurements are measurements of incremental variations.

13. A method of determining the direction of a receiving equipment from a transmitting equipment and relative to at least one axis determined by said transmitting equipment, said receiving equipment being sufficiently remote from said transmitting equipment that all wave fronts arriving at said receiver from said transmitter may be regarded for practical purposes as being planar and parallel with each other, comprising the following actions:

Action 1. At said transmitting equipment transmitting waves from a plurality of wave apertures;

Action 2. Arranging said apertures in an array of at least two pairs of apertures, at least one of said pairs of apertures being mounted on a separate axis, which axis is non-parallel to the axis of any other of said aperture pairs, and holding the array of said apertures in fixed form so that the positions of any of said apertures with respect to the rest of said apertures is fixed;

Action 3. Rotating said array of apertures about an axis that is non-parallel with the axis of any of said pairs of apertures;

Action 4. Measuring the variation of a trigonometric function of the bearing of said receiver from said transmitting equipment by measuring the variation of the difference between arrival times of waves arriving at the receiver from each aperture of each of said pairs of apertures;

Action 5. Determining from the results obtained in Action 4 the bearing of said receiver relative to at least one of said axes.

14. A method of determining the direction of a receiving equipment from a transmitting equipment and relative to at least one axis determined by said transmitting equipment, said receiving equipment being sufficiently remote from said transmitting equipment that all wave fronts arriving at said receiver from said transmitter may be regarded for practical purposes as being planar and parallel with each other, comprising the following actions;

Action 1. At said transmitting equipment transmitting waves from a plurality of waves apertures;

Action 2. Arranging at least three apertures in an array of at least two pairs of apertures, each of said pairs of apertures being mounted on a separate axis, which axis is nonparallel to the axis of any other of said pairs of aperture, and holding the array of apertures in fixed form so that the positions of any of said apertures with respect to the rest of said apertures is fixed;

Action 3. Rotating said array of apertures about an axis that is nonparallel to the axis of any of said pairs of apertures;

Action 4. Measuring the variation of a trigonometric function of the bearing of said receiver from said transmitting equipment by measuring the variation of the difference between arrival times of waves arriving at the receiver from each aperture of each of said pairs of apertures;

Action 5. Determining the angular orientation of said array of apertures relative to a reference frame.

Action 6. Employing the results of Action 4 and Action 5, determining the direction of said receiving apparatus relative to said reference frame.

15. A method of determining the direction of a propagated plane wave or wave group relative to an array of at least three wave apertures coupled to the propagation environment of said wave, said array of apertures being of sufficiently small dimensions that the assumption of a planar wave at pertinent points of the environment is valid, comprising the following actions:

Action 1. Arranging said apertures in an array of apertures, said array being arranged in at lease two pairs of said apertures, each of said pairs of apertures being mounted on a separate axis, which axis is nonparallel to the axis of any other of said aperture pairs, and holding the array of said apertures in fixed form so that the positions of any of said apertures with respect to the rest of said apertures is fixed;

Action 2. Rotating said array of apertures about an axis that is non-parallel with the axis of any of said pairs of apertures;

Action 3. Measuring the variation of a trigonometric function of the bearing of the direction of propagation of said wave or wave group relative to the axis of each aperture pair by measuring the variation of the difference between the phases of signals, which signals are phase dependent upon said rotation;

Action 4. Determining from the results obtained in Action 3 the direction of propagation of said waves relative to at least one of said axes.

16. A method of determining the direction of a propagated plane wave or wave group relative to a plurality of wave apertures coupled to the propagation environment of said wave, the distances between said apertures being sufficiently small that the assumption of a planar wave at pertinent points of the environment is valid, comprising the following actions:

Action 1. Arranging in an array at least one pair of said apertures, each pair of apertures being mounted on a separate axis, which axis is non-parallel to the axis of any other of said aperture pairs, and holding the array of said apertures in fixed form so that the positions of any of said apertures with respect to the rest of said apertures is fixed;

Action 2. Rotating said array of apertures about an axis that is non-parallel with the axis of any of said pairs of apertures;

Action 3. Measuring the variation of a trigonometric function of the bearing of the direction of propagation of said wave or wave group relative to the axis of each aperture pair by measuring the variation of the difference between the phases of signals, which signals are phase dependent upon said rotation;

Action 4. Determining the angular orientation of the array relative to a reference frame;

Action 5. Employing the results of Action 3 and Action 4, determining the direction of the propagation of said wave relative to said reference frame.

17. In an apparatus for determining the at least one dimension of the directional characteristic of a plane wave whose direction is varying, said characteristic comprising direction and variation of direction, said plane wave being incident upon said apparatus, said direction being relative to at least one axis through said apparatus, the combination comprising a first pair of apertures mounted on a first axis and a second pair of apertures mounted on a second axis, separate mixing means connected between the apertures of each pair of said apertures, the output of said mixing means being dependent upon the variation of direction of the incident plane wave, each of said mixing means mixing signals derived from said apertures connected thereto to obtain a difference frequency signal therefrom, separate cycle counting means connected to the output of each of said mixing means counting the cycles of the difference frequency signal derived from said mixing means, means controlling the time during which all of said counting means operate simultaneously, said counting means having means indicating the data determining at least one dimension of said directional characteristic of the incident plane wave.

18. An apparatus as set forth in claim 17 further characterized in that an aperture of said first pair of apertures is common to said second pair of apertures.

19. In an apparatus as in claim 18 further defined in that said directional characteristic comprises at least one bearing between the direction of propagation of said wave and an axis of said apparatus.

20. In an apparatus as in claim 18 further defined in that said directional characteristic comprises the variation of at least one bearing between the direction of propagation of said wave and an axis of said apparatus.

21. An apparatus as set forth in claim 17 further characterized in that there is provided a third pair of apertures mounted on a third axis, and mixing and counting means connected to said last mentioned apertures, said axes so arranged that direction of the said wave is determined in three-dimensional space.

22. An apparatus as set forth in claim 21, further characterized in that an aperture of each of said pairs of apertures is common to the other of said pairs of apertures.

23. In an apparatus for determining at least one dimension of the directional characteristic of a plane wave whose direction is varying, said characteristic comprising direction and variation of directions, said plane wave incident upon said apparatus, the combination comprising a first pair of apertures mounted on a first axis and a second pair of apertures mounted on a second axis, said apertures mounted sufficiently close together to insure that the approximation of a plane wave front across the entire group of apertures is valid, separate means sensitive only to variation of the phase difference between the output terminals of the apertures of each pair of said apertures connected thereto, said last mentioned means including means for producing output signals resulting only from the variation of direction of the incident plane wave, means controlling the duration of operation of said last mentioned means, and means associated with said signal producing means indicating data determining at least one dimension of said directional characteristic of the incident plane wave.

24. In an apparatus as in claim 23 further defined in that said directional characteristic comprises at least one bearing between the direction of propagation of said wave and an axis of said apparatus.

25. In an apparatus as in claim 23 further defined in that said directional characteristic comprises the variation of at least one bearing between the direction of propagation of said wave and an axis of said apparatus.

26. An apparatus as set forth in claim 23, further characterized in that an aperture of said first pair of apertures is common to said second pair of apertures.

27. An apparatus as set forth in claim 23, further characterized in that there is provided a third pair of apertures mounted on a third axis and connected thereto similar sensitive and indicating means, said third axis lying at an angle to parallel planes, each said plane containing one of said axes and which planes may be coincident, said third pair of apertures similarly closely spaced to all other of said apertures, said third axis so arranged that the direction of said wave is determined in three-dimensional space.

28. An apparatus as set forth in claim 27, further characterized in that an aperture of each of said pairs of apertures is common to the other two of said pairs of apertures.

29. An apparatus for determining the rate of change of a transcendental function of the angle between the direction of propagation of a plane wave incident on said apparatus, comprising in combination: two separate antenna means held rigidly a fixed distance apart from each other and remote from any point source of said wave, phase measuring means measuring the phase difference between signals separately derived from said two antennas, the signal level of the instantaneous output of said phase measuring means being linearly related to said phase difference, differentiating means connected to said phase sensitive means, signal amplitude measuring means connected to the output of said differentiating means, all of said means being so arranged that the output indication of the said measuring means indicates the rate of change of a transcendental function of the angle between the line between the phase centers of said two antenna means and the direction of propagation of waves impinging upon said antennas.

30. In a system of apparatus for determining the variation of a trigonometric function of the bearing of a receiver from a transmitter relative to at least one axis through said transmitter, a plurality of transmitting apertures mounted on each of a plurality of axes through said transmitter, means for altering the character of the signal radiated from individual apertures so that the radiation of each aperture may be separately identified at the receiver, means at said receiver determining the variation of the relative times of arrival at said receiver of the signals from the said transmitting apertures as said bearings vary.

31. An apparatus as set forth in claim 30, further characterized in that at least two of said axes of apertures intersect each other and one of said transmitting apertures is located at the point of this intersection.

32. In a system of apparatus for determining the variation of trigonometric function of the bearing of a receiver from a transmitter relative to an axis through said transmitter, a pair of transmitting apertures mounted on said axis, means transmitting waves from said apertures at frequencies different from each other, plural detecting means at said receiver, each said detecting means separately detecting the signals from a separate one of said transmitting apertures, measuring means connected to said detecting means measuring the variation with respect to time of the relative phase between said detected signals as said bearing varies.

33. In a system of apparatus as in claim 32, further defined in that said measuring means comprises cycle counting means.

34. In a system of apparatus as in claim 32 defined in that all of said variations are incremental type variations.

35. In a system of apparatus as in claim 32 further defined in that said array comprises only two apertures.

36. In an apparatus for measuring the change of the cosine of the angle between a plane wave incident upon said apparatus and a selected axis, two wave apertures sensitive to said incident wave mounted on said axis, means for supporting said apertures on said axis, mixing means connected between said apertures, cycle counting means connected to said mixing means for counting the cycles of the difference frequency signal from said apertures, and timing means associated with said counting means for regulating the period over which said counting means performs its counting operation.

37. In an apparatus for finding the direction of plane waves incident upon said apparatus, a plurality of aperture means sensitive to said waves, said apertures forming an array of apertures, means rotating said array relative to a reference frame which reference frame is fixed relative to the direction of propogation of said plane wave, and means connected to said apertures measuring the increment type variation of the differences of the arrival times of identical points on said waves at said apertures, said variations resulting from the rotation of said array.

38. An apparatus as described in claim 37, further comprising angle measuring means indicating angular orientation of said array relative to said reference frame.

39. An apparatus as described in claim 37, further comprising means indicating the variation of the angular orientation of said array relative to said reference frame.

40. In an apparatus for finding the direction of plane waves incident upon said apparatus, a plurality of spaced aperture means sensitive to said waves, said apertures forming an array of apertures, said direction being found relative to said array, measuring means connected to said apertures measuring the variation of difference of arrival times of identical points on said waves at said apertures, said variations resulting the rotating of said array.

41. In an apparatus as recited in claim 40, further comprising: means for determining the angular variation of said array relative to the direction of said waves occurring during said variation of differences.

42. In an apparatus as recited in claim 40 further defined in that said apparatus is an omnidirectional apparatus.

43. In an apparatus as recited in claim 40 further defined in that said variation of differences of arrival times is change of differences of arrival times.

44. In an apparatus as recited in claim 43 further comprising: means for determining the angular change of said array relative to the direction of said waves occurring during said change of differences.

45. In an apparatus for finding the direction of plane waves incident upon said apparatus, a plurality of aperture means sensitive to said waves mounted upon a plurality of separate aperture axes, means for rotating said axes, means connected to said apertures measuring the variation of the differences of the arrival times of identical points on said waves at pairs of said apertures, said variations resulting from said rotating.

46. In an apparatus for beaconing and attitude indication, a multidimensional array of wave transmitting apertures; means for energizing said apertures, means for modifying the signals transmitted from at least some of said apertures so that said signals may be separately identified, and means for rotating said array.

47. An apparatus as described in claim 46, further comprising means for indicating the angular orientation of said array relative to a known reference frame.

48. In a system for beaconing and navigating, a beaconing apparatus located at a known point on a known reference frame, a receiving apparatus located in a navigating craft, said beaconing apparatus comprising at least three wave transmitting apertures disposed in at least two dimensions, means for energizing said apertures, means modifying the signals transmitted from at least some of said apertures so that said signals may be separately identified, means rotating said apertures about a selected point, said receiving apparatus comprising means detecting the signals radiated from said apertures, and means connected to said detecting means determining variations of the differences of the times of arrival at said detecting means of waves transmitted from said apertures, which variations are resultant from the rotation of said array.

49. An omnidirectional system for determining at least one dimension of the otherwise unknown varying directional relationship between apparatus at a first point and apparatus at a second point remote from said first point said relationship comprising unknown angular motion, said system comprising elements as follows:

Element 1. At one of said points wave generating apparatus and at the other of said points wave detecting apparatus responsive to waves generated by said wave generating apparatus;

Element 2. Connected to the apparatus at said first point an array of apertures functional with respect to the waves generated by said wave generating apparatus, the maximum dimension of said array being made negligible relative to the distance between said points;

Element 3. Connected to said detecting apparatus measuring apparatus receiving signals from said detecting apparatus and measuring the variation of at least one trignometric function of the direction of said second point relative to said array and insensitive to any particular direction of said second point relative to said array;

Element 4. Connected to said measuring apparatus recited in Element 3 and receiving information therefrom third apparatus for determining from said information the direction of said second point relative to said array.

50. A system as recited in claim 49 further defined in that said variation is an incremental variation.

51. A system as recited in claim 50 further defined in that said measuring apparatus comprises cycle counting means.

52. A system as recited in claim 49 further defined in that said array is a multidimensional array comprising at least three apertures.

53. A system as recited in claim 49 further defined in said array comprising at least three apertures and at least two aperture axes.

54. A system as recited in claim 49 for determining the directional relationship between apparatus at a first point and apparatus at a second point remote from said first point further defined in that apparatus at said first point is wave receiving apparatus and apparatus at said second point is wave transmitting apparatus.

55. A system as recited in claim 49 for determining the directional relationship between apparatus at a first point and apparatus at a second point remote from said first point further defined in that apparatus at said first point is wave transmitting apparatus and apparatus at said second point is wave receiving apparatus.

56. A system as recited in claim 49 further comprising: means
for rotating said array.

57. An omnidirectional method of determining at least one dimension of the otherwise unknown directional relationship between first apparatus at a first point and second apparatus at a second point remote from said first point, said method comprising the following elements:

Element 1. Establishing at the first one of said points an array of apertures comprising at least two axes of apertures functional with respect to waves transmitted in at least one direction between said first point and said second point, the maximum dimension of said array being negligible relative to the distance between said points;

Element 2. Using signals from said array, measuring the variation of at least one trigonometric function of the angle between said array and said waves and non-responsive to any particular direction of said second point relative to said array;

Element 3. By processing said signals determining at least one dimension of the directional relationship between said second point and said array located at said first point.

58. A method as recited in claim 57 further defined in that said variation is an incremental type variation.

59. A method as recited in claim 58 further defined in Element 2 by using cycle counting means in measuring said incremental type variation.

60. A method as recited in claim 57 further defined in using a multidimensional array comprising at least three apertures.

61. A method as recited in claim 57 further defined in using an array comprising at least three apertures and at least two aperture axes.

62. The method as recited in claim 57 wherein apparatus at said first point is wave receiving apparatus and apparatus at said second point is wave transmitting apparatus.

63. The method as recited in claim 57 wherein the apparatus at said first point is wave transmitting apparatus and the apparatus at said second point is wave receiving apparatus.

64. The method as recited in claim 57 wherein the geographical position of said first point is known and the geographical position of said second point is unknown.

65. The method as recited in claim 57 wherein the geographical position of said second point is known and the geographical position of said first point is unknown.

66. The method as recited in claim 57 further comprising rotating said array to achieve said angular motion.

67. The method as recited in claim 57 further comprising:

Element 4. Rotating said array,

Element 5. Measuring precisely the direction of said array relative to a reference frame.

Element 6. Using the information resulting from Element 3 and Element 5 determining the direction of said second point from said first point relative to said reference frame.

* * * * *